(12) United States Patent
Kimura et al.

(10) Patent No.: US 6,754,393 B2
(45) Date of Patent: Jun. 22, 2004

(54) ENCODING APPARATUS, DECODING APPARATUS, ENCODING METHOD, AND DECODING METHOD

(75) Inventors: Tomohiro Kimura, Tokyo (JP); Ikuro Ueno, Tokyo (JP); Taich Nagiya, Tokyo (JP); Masayuki Yoshida, Tokyo (JP); Fumitaka Ono, Tokyo (JP); Narihiro Matoba, Tokyo (JP); Kunio Ueda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/419,962

(22) Filed: Apr. 22, 2003

(65) Prior Publication Data

US 2003/0194140 A1 Oct. 16, 2003

Related U.S. Application Data

(62) Division of application No. 09/458,061, filed on Dec. 10, 1999, now Pat. No. 6,636,641, which is a division of application No. 08/952,723, filed as application No. PCT/JP97/00768 on Mar. 12, 1997, now Pat. No. 6,188,793.

(30) Foreign Application Priority Data

Mar. 19, 1996 (JP) ............................................... 8-63117
Dec. 5, 1996 (WO) ................................ PCT/JP96/03568

(51) Int. Cl.[7] ................................................. G06K 9/00
(52) U.S. Cl. ...................................... 382/238; 382/246
(58) Field of Search ......................... 382/232, 236–239, 382/244–247; 358/426.01, 426.02, 426.07; 341/51, 107

(56) References Cited

U.S. PATENT DOCUMENTS 4,028,731 A  6/1977  Arps et al. .................. 358/3.29

(List continued on next page.)

FOREIGN PATENT DOCUMENTS

JP          1251403      8/1978
JP          53-98719     8/1978

(List continued on next page.)

OTHER PUBLICATIONS

Glen Langdon et al. "On the JPEG Model for Lossless Image Compression", 1992 IEEE.

ITU–T Recommendation T.81, CCITT Rec. T81 (1992E).

"Run Length Encoding Method According To Start Patterns of Prediction Transformation Signals", Onishi et al., General National Assembly of the Institute of Electronics and Communication Engineers held in 1977.

*Primary Examiner*—Leo Boudreau
*Assistant Examiner*—Duy M. Dang
(74) *Attorney, Agent, or Firm*—Birch, Stewart, Kolasch & Birch, LLP

(57) ABSTRACT

Encoding efficiency is enhanced by actively combining a plurality of encoding methods. A picture element memory receives and stores picture elements within a predetermined range. A mode determinator selects an encoding mode based upon a reference picture element. A first encoding section and a second encoding section predicts the value of the encoded picture element, determines whether the prediction is correct, and then encodes the value of the encoding picture element based on the determination result and outputs a codeword for the encoding picture element. An encoding controller selectively operates the first encoding section and the second encoding section based upon one of the specific encoding modes and the other encoding mode other than the specific encoding mode selected by the mode determinator.

6 Claims, 58 Drawing Sheets

U.S. PATENT DOCUMENTS

| | | | |
|---|---|---|---|
| 4,191,974 A | 3/1980 | Ono et al. | 382/238 |
| 4,213,154 A | 7/1980 | Ono et al. | 358/3.29 |
| 4,542,411 A | 9/1985 | Imanaka et al. | 382/238 |
| 4,939,583 A | 7/1990 | Tsuboi et al. | 358/426.12 |
| 4,942,467 A | 7/1990 | Waldman et al. | 375/240.14 |
| 5,059,976 A | 10/1991 | Ono et al. | 341/51 |
| 5,297,220 A | 3/1994 | Nomizu | 382/247 |
| 5,307,062 A | 4/1994 | Ono et al. | 341/107 |
| 5,313,204 A | 5/1994 | Semasa et al. | 341/107 |
| 5,404,140 A | 4/1995 | Ono et al. | 341/107 |
| 5,680,507 A | 10/1997 | Chen | 704/223 |
| 5,805,762 A | 9/1998 | Boyce et al. | 386/68 |
| 5,991,449 A | 11/1999 | Kimura et al. | 382/238 |

FOREIGN PATENT DOCUMENTS

| | | |
|---|---|---|
| JP | 53-98720 | 8/1978 |
| JP | 57-147325 A | 9/1982 |
| JP | 57-147346 A | 9/1982 |
| JP | 58-94274 A | 6/1983 |
| JP | 58-94275 A | 6/1983 |
| JP | 59-30366 A | 2/1984 |
| JP | 59-30367 A | 2/1984 |
| JP | 59-182670 | 10/1984 |
| JP | 61-65573 A | 4/1986 |
| JP | 6165573 | 4/1986 |
| JP | 62-108663 A | 5/1987 |
| JP | 62-108663 | 5/1987 |
| JP | 64-65980 | 3/1989 |
| JP | 2-305225 A | 12/1990 |
| JP | 4-122174 A | 4/1992 |
| JP | 591459 A | 4/1993 |
| JP | 591460 A | 4/1993 |
| JP | 5-64007 | 5/1993 |
| JP | 5-176171 A | 7/1993 |
| JP | 5-191770 A | 7/1993 |
| JP | 6-98176 | 4/1994 |
| JP | 6-121174 | 4/1994 |
| JP | 6121175 | 4/1994 |
| JP | 6-121175 | 4/1994 |
| JP | 6-164940 A | 6/1994 |
| JP | 6-181523 A | 6/1994 |
| JP | 8-9167 | 1/1996 |
| JP | 89167 | 1/1996 |

Fig.8

| PREDICTION ERROR | BINARY SYMBOL |
|---|---|
| − 1 | 1 |
| + 1 | 0 1 |
| − 2 | 0 0 1 |
| + 2 | 0 0 0 1 |
| − 3 | 0 0 0 0 1 |
| . . . | . . . . |
| − 255 | 0 0 . . . . . 1 |
| + 255 | 0 0 . . . . . . 1 |
| IN THE CASE OF 8 BIT/PEL (PICTURE ELEMENT VALUE:0∼255) | |

Fig.9

| PREDICTION ERROR | BINARY SYMBOL |
|---|---|
| 0 | 1 |
| − 1 | 0 1 |
| + 1 | 0 0 1 |
| − 2 | 0 0 0 1 |
| + 2 | 0 0 0 0 1 |
| . . . | . . . . |
| − 255 | 0 0 . . . . . 1 |
| + 255 | 0 0 . . . . . . 1 |
| IN THE CASE OF 8 BIT/PEL (PICTURE ELEMENT VALUE:0∼255) | |

Fig.11

| ENC. PIC. ELE. | REF. PIC. ELE. | ZERO DETERMIN. | PRED. ERR. |
|---|---|---|---|
| X1 | (a = b = c) | 0 | 0 |
| X2 | (a = b = c) | 0 | 0 |
| X3 | not (a = b = c) | 1 | +1 |
| X4 | not (a = b = c) | 1 | +1 |
| X5 | (a = b = c) | 0 | 0 |
| X6 | (a = b = c) | 1 | -2 |
| ⋮ | ⋮ | ⋮ | ⋮ |

Fig.67

CODE ORDER $2^n$

| SYMBOL SEQ. | CODEWORD EX. | CODEWORD LENGTH |
|---|---|---|
| $\overset{2^n}{\longleftrightarrow}$ 0 0 ··· ··· ··· 0 | 0 | 1 |
| 1 | 1 0 ··· ··· 0 0 | n+1 |
| 0 1 | 1 0 ··· ··· 0 1 | n+1 |
| $\overset{i}{\longleftrightarrow}$ : 0 ··· ··· 0 1 | BINARY NOTATION OF i (n BITS) $\overset{\longleftrightarrow}{1 x ··· ··· x x}$ | : n+1 |
| $\overset{2^n-1}{\longleftrightarrow}$ : 0 ··· ··· ··· 0 1 | : 1 1 ··· ··· 1 1 | : n+1 |

0 : M P S
1 : L P S (EXAMPLE)
CODE ORDER 4

| SYMBOL SEQ. | CODEWORD |
|---|---|
| 0 0 0 0 | 0 |
| 1 | 1 0 0 |
| 0 1 | 1 0 1 |
| 0 0 1 | 1 1 0 |
| 0 0 0 1 | 1 1 1 |

(EXAMPLE)
CODE ORDER TWO

| SYMBOL SEQ. | CODEWORD |
|---|---|
| 0 0 | 0 |
| 1 | 1 0 |
| 0 1 | 1 1 |

| STATE | STATE NUMBER | CODE ORDER |
|---|---|---|
| $S_0$ | 0 | 1 |
| $S_1$ | 1 | 2 |
| $S_2$ | 2 | 4 |
| $S_3$ | 3 | 8 |
| $S_4$ | 4 | 16 |
| $S_5$ | 5 | 32 |
| $S_6$ | 6 | 64 |
| $S_7$ | 7 | 128 |
| $S_8$ | 8 | 256 |
| $S_9$ | 9 | 512 |
| $S_{10}$ | 10 | 1024 |
| $S_{11}$ | 11 | 2048 |
| $S_{12}$ | 12 | 4096 |
| $S_{13}$ | 13 | 8192 |
| $S_{14}$ | 14 | 16384 |
| $S_{15}$ | 15 | 32768 |

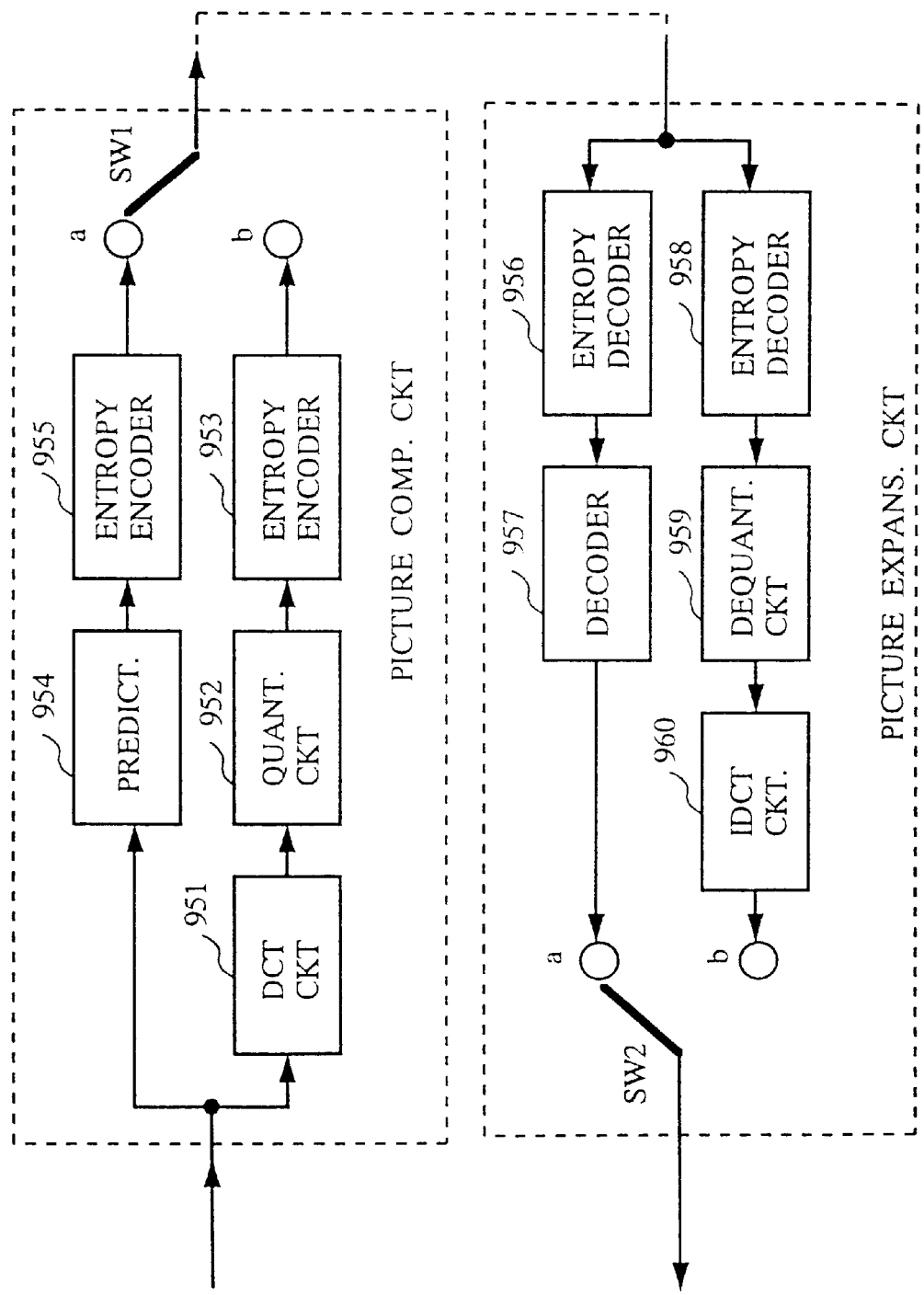

ENCODING APPARATUS, DECODING APPARATUS, ENCODING METHOD, AND DECODING METHOD

This application is a divisional of pending prior application Ser. No. 09/458,061 filed on Dec. 10, 1999, U.S. Pat. No. 6,636,641, which is a divisional of application Ser. No. 08/952,723 filed on Nov. 19, 1997 and issued as U.S. Pat. No. 6,188,793 on Feb. 13, 2001which is a 371 of PCT/JP97/00768 filed Mar. 12, 1997.

TECHNICAL FIELD

The present invention relates to an encoding apparatus, a decoding apparatus and their methods for encoding and decoding picture information generated by and used in a facsimile machine, a scanner, and a computer. More specifically, the present invention relates to an encoding apparatus and a decoding apparatus having two types of encoding and decoding systems for efficiently encoding and decoding picture information by switching between the two types of encoding and decoding systems. Further, the present invention relates to an encoding method and a decoding method for encoding and decoding picture information efficiently. The present invention also relates to a picture processing apparatus having an encoding apparatus and a decoding apparatus according to the present invention. The present invention also relates to a picture processing apparatus for implementing an encoding method and a decoding method according to the present invention.

BACKGROUND ART

Related Art 1.

FIG. 66 is a block diagram showing a conventional encoding apparatus.

In FIG. 66, reference numeral 901 indicates a picture element memory for receiving, storing, and outputting the value of a picture element to be encoded (which will be referred to as an encoding picture element, or simply as a picture element) and for outputting the value of at least one encoded picture element already stored in the picture element memory and adjacent to the encoding picture element as the value of a reference picture element.

Reference numeral 907 indicates a predictor for calculating the prediction value for the encoding picture element by referring to the value of the at least one reference picture element.

Reference numeral 931 indicates a prediction error calculator for determining the prediction error by subtracting the prediction value calculated by the predictor 907 from the value of the encoding picture element.

Reference numeral 908 indicates an encoder for encoding the prediction error between the value of the encoding picture element and the prediction value calculated by the predictor 907, and for outputting codewords.

Reference numeral 910 indicates a code buffer for receiving the codewords supplied from the encoder 908 and for outputting a sequence of the codewords as a code in order of the received codewords.

Next, an operation of the conventional encoding apparatus is explained.

The predictor 907 calculates the prediction value from the value of the at least one reference picture element. The calculation method may be implemented in accordance with a predetermined prediction function or by referring to a reference table. The encoder 908 encodes the prediction error (−255+255, inclusive of zero, in the case of one picture element being represented by eight bits) which has been obtained by subtracting the calculated prediction value from the value of an encoding picture element by using a predetermined codeword table.

Related Art 2.

As another conventional related art, conversion of the prediction errors for encoding picture elements and picture elements to be decoded into binary symbol sequences, and encoding and decoding the binary symbol sequences are known. As one of the encoding and decoding methods for binary symbols, the encoding and decoding method disclosed in Japanese Patent Registered No. 1251403 will be described herein.

According to this encoding and decoding method, as shown in FIG. 67, one codeword is allotted to a binary symbol sequence composed of one binary symbol or a plurality of binary symbols. The term "encoding" is used in this specification to mean an operation for determining and allotting a codeword to a sequence of a certain number (which will be hereinafter referred to as the code order) of binary "0" symbols (More Probable Symbols abbreviated to MPSs) or binary "1" symbols (Less Probable Symbol abbreviated to LPSs) occurred, and for outputting the codeword therefor. At the time of encoding, the number of MPSs consecutively occurred is counted by an MPS counter (not shown) inside (or outside) the encoder. The counted value of MPSs is stored in an MPS memory (not shown), and the state numbers of binary symbol sequences (to be described hereafter) are stored in a state-number memory (not shown). The code order may be an integer greater than zero. However, it is assumed herein that the code order is restricted to $2^n$ (the n-th power of 2). When the number of MPSs consecutively occurred (the count of the MPS counter) has become equal to the code order $2^n$, one-bit codeword "0" is allotted to the MPSs. On the other hand, when an LPS has occurred before the number of MPSs consecutively occurred becomes equal to the code order, the number of the MPSs consecutively occurred after outputting the latest codeword before occurring the LPS is expressed in terms of n-bit binary symbols, and, in order to differentiate from the sequence of the MPSs to which the codeword "0" is allotted, the codeword "1" is added to the beginning of the n-bit binary symbols. Accordingly, a codeword of (n+1) bits is allotted to the sequence of MPSs plus the LPS differentiating from the sequence of MPSs to which a codeword of "0" is allotted. The unit of a binary symbol sequence to which a codeword is allotted is referred to as a message. After the codeword is determined and output, the MPS counter is reset. A sequence of codewords output in this way constitutes a code. On the other hand, when a code is to be decoded, the code is supplied to the decoder and divided into individual codewords. Then, a binary symbol sequence is recreated by the decoder, and picture elements are reproduced. In this way, decoding is implemented.

In the aforementioned encoding and decoding method, the code order is changed so as to represent the appropriate code length in accordance with the occurrence probability of one of binary symbols estimated from past data on binary symbol sequences. For this reason, a further excellent encoding efficiency can be obtained.

A first example of the state transition method of determining the code order will be described now.

When a binary symbol sequence is encoded or decoded by an encoder or a decoder, the binary symbol sequence belongs to one of the sixteen states shown in FIG. 68. The code order is determined according to the state to which each binary symbol sequence belongs. It is assumed herein that the initial value of the state number for the encoder or the decoder is set to 0. It is also assumed herein that the MPS counter of the encoder or the decoder is reset at the beginning of the encoding process or the decoding process. During the encoding process or the decoding process, the encoder or the decoder implements state transition when a codeword has been determined. When the number of MPSs consecutively occurred in a binary symbol sequence has become equal to the code order of the binary symbol sequence, the state number of the sequence is increased by one. When an LPS has occurred in a binary symbol sequence before the number of MPSs consecutively occurred becomes equal to the code order of the binary symbol sequence, the state number of the sequence is decreased by one. However, when the number of MPSs consecutively occurred in a binary symbol sequence having the state number 15 has become equal to the code order of the binary symbol sequence, or when an LPS has occurred in a binary symbol sequence having the state number 0, the encoder or the decoder does not implement state transition, and the state number remains unchanged.

According to a second example of the method of determining the code order, there is shown a method in which the numbers of binary symbols "0" and binary symbols "1" which have occurred in a binary symbol sequence, respectively indicated by N(0) and N(1), are counted on both the transmitting side and the receiving side within the same range (such as, for example, within one line) so as to calculate the code order of the binary symbol sequence, based on the result of the count. The method of determining the code order, for example, is disclosed in Japanese Unexamined Patent Publication No. SHO59-27501 (which corresponds to U.S. Pat. No. 4,191,974). The calculation method is expressed by the relation of $2^{n+1}N(1) > N(0) \exists 2^n N(1)$. In this case, however, the code order $2^n$ which varies with state transition of a binary symbol sequence is not less than a predetermined minimum value, nor more than a predetermined maximum value.

It is known that the encoding method shown in FIG. 67 has the following characteristics. Let us assume that a binary information source whose probability of binary symbol "0" and whose probability of binary symbol "1" are p, 1–p (p ∃½) respectively are encoded in accordance with the encoding method shown in FIG. 67. When the occurrence of the binary symbols to be encoded may be random, the order n rendering a maximum code length in each code order minimum fulfills the following expression:

$$\{2^n/(2^n+1)\} \# p < \{2^{n+1}/(2^{n+1}+1)\}$$

Accordingly, by determining n in accordance with the above expression, a substantially optimum code can be selected.

Assuming that the number of binary symbols "0" is N(0) and the number of binary symbols "1" is N(1), the probability p is expressed as follows:

$$p = N(0)/\{N(0) + N(1)\}$$

Thus the above expression is reduced to as follows:

Among the conventional encoding apparatuses and the conventional decoding apparatuses, there is an encoding apparatus or a decoding apparatus wherein two encoding or decoding modes such as the mode A and the mode B are provided, for example, and encoding or decoding is implemented by switching between the mode A and the mode B according to the decision whether or not a predetermined condition for the value(s) of reference picture element(s) is satisfied. Basically, if the value(s) of reference picture element(s) satisfies a predetermined condition, encoding or decoding is implemented in the mode A. On the other hand, if the value(s) of reference picture element(s) does not satisfy a predetermined condition, encoding or decoding is implemented in the mode B. Mode switching may be accomplished, for example, in accordance with the method described in "The National Assembly 1016 of the Institute of Electronics and Communication Engineers of Japan held in 1977" as the "run length encoding process according to the encoding start patterns". As shown in FIG. 69, a picture element X is assumed herein to be a picture element to be encoded or decoded (which will be hereinafter simply referred to as a picture element). If the values of reference picture elements a, b, and c adjacent to the picture element X satisfy a predetermined condition "a=b=c", the picture element X and the subsequent picture elements are encoded or decoded continuously in the mode A until the picture element X becomes "X a prediction value". When the picture element X occurs that does not coincide with the prediction value, the mode A is switched into the mode B. Then, the picture element X and the subsequent picture elements are encoded or decoded continuously in the mode B. When the values of the reference picture elements a, b, and c satisfy the predetermined condition "a=b=c" again, the mode is switched to the mode A and the subsequent encoding or decoding picture element is encoded or decoded in the mode A.

Related Art 4.

In the following, encoding process and decoding process of a picture in a conventional picture pick-up apparatus is explained referring to drawings. In this related art, encoding process is performed by a picture compression circuit and decoding process is performed by a picture expansion circuit.

FIG. 70 shows a configuration of the picture compression circuit and the picture expansion circuit.

In FIG. 70, the picture compression circuit includes a process for implementing a lossless compression and another process for implementing a lossy compression.

A lossy picture compression means a compressing process where a compressibility of the picture is increased, though a quality of reproduced picture (reproducibility) is decreased.

On the other hand, a lossless picture compression means a compressing process where the quality of reproduced picture (reproducibility) is not decreased, though a compressibility of the picture is less increased than the above lossy picture compression.

A DCT (Discrete Cosine Transform) circuit 951 performs two-dimensional DCT operation on an input picture to divide the picture into two-dimensional spatial frequency components. A quantization circuit 952 quantizes a DCT coefficient. An entropy encoder 953 implements Huffman coding on the quantized DCT coefficient. The lossy picture compression is performed by the DCT circuit 951, the quantization circuit 952 and the entropy encoder 953. A predictor 954 predicts data of a certain picture element by using data of the previous picture element. An entropy encoder 955 implements Huffman coding of a differential between the picture element and the picture element predicted by the predictor 954. In this way, the lossless data compression is implemented by the predictor 954 and the entropy encoder 955. A switch SW1 selects one of the compressing processes: side "a" of the lossless compression; and side "b" of the lossy compression.

The picture expansion circuit includes a process for implementing a lossless expansion and a process for implementing lossy expansion. An entropy decoder 956 and a decoder 957 decode the reversibly compressed data by an inverse operation of the entropy encoder 955 and the predictor 954. An entropy decoder 958, a dequantization circuit 959 and an inverse DCT circuit 960 decode the compressed data by an inverse operation of the DCT circuit 951, the quantization circuit 952 and the entropy encoder 953. A switch SW2 selects one of the expanding processes: side "a" of the lossless expansion; and side "b" of the lossy expansion.

The conventional encoding apparatus which has been described as the related art 1 encodes a prediction error by referring to a predetermined codeword table. Generally, with regard to the picture information, the statistical characteristic of the picture information displayed on a screen varies greatly depending on the part on the screen. In other words, it is known that it occurs that prediction for some part of the picture information displayed on the screen tends to be correct while other part of the picture information displayed on the screen often has great prediction errors. Although the statistical characteristic of the picture information displayed on the screen varies, the encoding apparatus according to the first conventional related art implements encoding by referring to a single codeword table. Thus, it has created a problem in that an encoding efficiency cannot be enhanced.

On the other hand, the encoding method which has been described as the related art 2 is a method of implementing encoding by referring to a plurality of codeword tables and dynamically changing the code order depending on the occurrence probability of the MPS. Consequently, if the statistical characteristic of picture information displayed varies greatly, a more excellent encoding efficiency will be provided with this encoding system than with the encoding apparatus which has been described as the first conventional related art. However, even by using the encoding method according to related art 2, when at least one codeword is allotted to a prediction error for each encoding picture element, at least one-bit code amount is required for each picture element regardless of whether or not the prediction has proved to be correct (or no prediction error has been produced). Allotting a one-bit or more bits of codeword to a prediction error although the prediction probability exceeds ½ means that the actual code amount required is greater than the theoretical minimum code amount (entropy) for the prediction error. In other words, it means that an encoding efficiency is reduced.

According to the aforementioned related art 4, the picture compression circuit (encoding apparatus) and the picture expansion circuit (decoding apparatus) are configured as shown in FIG. 70. The DCT circuit, the quantization circuit and the entropy encoder implement lossy picture compression and lossy picture expansion. On the other hand, the predictor and the entropy encoder implement lossless picture compression and lossless picture expansion. In this way, the conventional picture pick-up apparatus switches the lossless picture compression circuit and the lossy picture compression circuit according to the condition. In the picture pick-up apparatus, it is mostly required to increase the compressibility of the picture without decreasing the quality of the reproduced picture (reproducibility). Particularly, in the art of a digital camera, the above requests have been highly demanded these days so as to store the picked-up signals in the storage medium and to display the picked-up signals on the monitor. Input information of picture has been increasing because of a large number of picture elements of input picture, color input picture, and multiple gradation of input picture. There is a problem that the conventional picture processing apparatus cannot supply enough compressibility of picture in case of storing such information of picture in a limited capacity of the storage medium.

On handling multimedia information, picture information is transmitted, displayed, or stored together with other information such as audio information, or character information. Picture information occupies higher ratio than other information among such multimedia information, and these days it is required that the compressibility of picture is further increased.

OBJECTS OF THE INVENTION

The present invention has been made to solve the above-mentioned problems. It is therefore an object of the present invention to provide an encoding apparatus and a decoding apparatus which can implement encoding and decoding picture information efficiently.

Further, it is another object of the present invention to provide an encoding method and a decoding method for encoding and decoding picture information efficiently by actively switching between different types of encoding systems and decoding systems.

It is a further object of the present invention to provide an encoding apparatus and a decoding apparatus which can be produced in a smaller size and constructed easily even when encoding and decoding picture information are to be efficiently implemented by actively switching between different types of encoding systems and decoding systems.

Further, it is also an object of the present invention to provide a picture processing apparatus having the above-mentioned encoding apparatus and the above-mentioned decoding apparatus.

Still further, it is also an object of the present invention to provide a picture processing apparatus for implementing the above-mentioned encoding method and the above-mentioned decoding method.

It is an object of the present invention to provide an picture processing apparatus for implementing a lossless picture compression with higher compressibility than the lossless picture compression implemented by the conventional picture processing apparatus.

SUMMARY OF THE INVENTION

An encoding apparatus according to the present invention may comprise:

a picture element memory for receiving and storing a picture element having a value within a predetermined range as an encoding picture element, outputting the value of the encoding picture element, and for outputting a value of an encoded picture element adjacent to the encoding picture element as the value of a reference picture element;

a mode determinator for selecting one of a specific encoding mode and an encoding mode other than the specific encoding mode from a plurality of predefined encoding modes for the encoding picture element based on the value of the reference picture element;

a first encoding section for predicting the value of the encoding picture element, determining whether the prediction is correct, encoding the value of the encoding picture element based on a result of the determination, and for outputting a codeword for the encoding picture element;

a second encoding section for predicting the value of the encoding picture element, encoding the value of the encoding picture element without determining whether the prediction is correct, and for outputting a codeword for the encoding picture element; and an encoding controller for selectively operating the first encoding section and the second encoding section based on one of the specific encoding mode and the encoding mode other than the specific encoding mode selected by the mode determinator.

The first encoding section may comprise:

a first predictor for calculating a prediction value of the encoding picture element based on the value of the reference picture element;

a first prediction error calculator for calculating an error between the value of the encoding picture element and the prediction value calculated by the first predictor as a prediction error;

a determinator for determinating whether the prediction error calculated by the first prediction error calculator is a specific value, and for outputting a result of the determination;

a first encoder for receiving and encoding the result of the determination output from the determinator, and for outputting the codeword for the encoding picture element to be encoded in the selected specific encoding mode; and a second encoder for encoding the prediction error calculated by the first prediction error calculator when the prediction error is other than the specific value for the encoding picture element to be encoded in the selected specific encoding mode, and for outputting the codeword for the encoding picture element to be encoded in the selected specific encoding mode.

The second encoding section may comprise:

a second predictor for calculating a prediction value of the encoding picture element based on the value of the reference picture element;

a second prediction error calculator for calculating an error between the value of the encoding picture element and the prediction value calculated by the second predictor as a prediction error; and a third encoder for encoding the prediction error calculated by the second prediction error calculator for the encoding picture element to be encoded in the selected encoding mode other than the specific encoding mode, regardless of whether the prediction error is the specific value, and for outputting the codeword for the encoding picture element to be encoded in the selected encoding mode other than the specific encoding mode.

The first encoder may comprise a first probability estimator for receiving the result of the determination output from the determinator as a sequence of binary symbols and estimating an occurrence probability of one of the binary symbols, and a first codeword allotter for encoding the sequence of binary symbols, and the second encoder may comprise a first error-to-symbol converter for receiving the prediction error and converting the prediction error into a sequence of binary symbols, a second probability estimator for receiving the sequence of binary symbols and estimating an occurrence probability of one of the binary symbols, and a second codeword allotter for encoding the sequence of binary symbols, and the third encoder may comprise a second error-to-symbol converter for receiving the prediction error and converting the prediction error into a sequence of binary symbols, a third probability estimator for receiving the sequence of binary symbols and estimating an occurrence probability of one of the binary symbols, and a third codeword allotter for encoding the sequence of binary symbols.

The encoding controller may have a codeword transmission order controller for changing an order for outputting codewords when a codeword has been determined by at least one of the first encoder, the second encoder, and the third encoder and when a codeword has not been determined by the other encoders.

In the encoding apparatus according to the present invention, at least one of the first error-to-symbol converter and the second error-to-symbol converter successively may generate comparison values starting with a value which would most likely occur as a prediction error to be input to one of the first error-to-symbol converter and the second error-to-symbol converter, may successively compare the generated values with the prediction error input to one of the first error-to-symbol converter and the second error-to-symbol converter one by one, and may generate and output a sequence of binary symbols based on a count of comparison time until one of the generated comparison values coincides with the prediction error.

The mode determinator may select an encoding mode for an encoding picture element based on an encoding mode for an encoded picture element preceding the encoding picture element.

In the encoding apparatus according to the present invention, at least one of the first codeword allotter, the second codeword allotter, and the third codeword allotter may change interpretation as to which one of the binary symbols is a more probable symbol, based on a change in probability estimation for one of the binary symbols respectively implemented by the first probability estimator for the first codeword allotter, the second probability estimator for the second codeword allotter, and the third probability estimator for the third codeword allotter.

The first predictor of the first encoding section and the second predictor of the second encoding section may be combined into a predictor.

At least two encoders of the first encoder, the second encoder, and the third encoder may be combined into an encoder.

In the picture encoding apparatus according to the present invention, based on information as to which one of the binary symbols is a more probable symbol and an estimated occurrence probability of the more probable symbol, at least one of the first codeword allotter, the second codeword allotter, and the third codeword allotter may implement encoding for an enlarged information source of the binary symbols effected by selecting a code most suited to a state of the enlarged information source of the binary symbols assumed from the estimated occurrence probability of the more probable symbol from a Huffman code set prepared systematically for the enlarged information source of the binary symbols.

A decoding apparatus according to the present invention may comprise:

a picture element memory for storing decoded picture elements having values within a predetermined range, and outputting the value of one of the decoded picture elements adjacent to a decoding picture element as a value of a reference picture element;

a mode determinator for selecting one of a specific decoding mode and a decoding mode other than the specific decoding mode from a plurality of predefined decoding modes for the decoding picture element based on the value of the reference picture element;

a first decoding section for receiving a codeword, predicting a value of the decoding picture element, determining whether the prediction is correct, and for decoding the codeword into the value of the decoding picture element based on a result of the determination;

a second decoding section for receiving a codeword for the decoding picture element, predicting the value of the decoding picture element, decoding the codeword into the value of the decoding picture element without determining whether the prediction is correct; and a decoding controller for selectively operating the first decoding section and the second decoding section based on one of the specific decoding mode and the decoding mode other than the specific decoding mode selected by the mode determinator.

The first decoding section may comprise:

a first predictor for calculating a prediction value of the decoding picture element based on the value of the reference picture element;

a first decoder for decoding the codeword for the decoding picture element to be decoded in the selected specific decoding mode into a result of determination indicating whether a prediction error is predetermined value;

a second decoder for decoding the codeword for the decoding picture element to be decoded in the selected specific decoding mode and having the prediction error other than the predetermined value into the prediction error other than the predetermined value;

a first decoding picture element calculator for calculating the value of the decoding picture element based on the prediction value of the decoding picture element calculated by the first predictor, the result of the determination, and the prediction error obtained by the second decoder.

The second decoding section may comprise:

a second predictor for calculating a prediction value of the decoding picture element based on the value of the reference picture element;

a third decoder for decoding the codeword for the decoding picture element to be decoded in the selected decoding mode other than the specific decoding mode into the prediction error regardless of whether the prediction error is the predetermined value;

a second decoding picture element calculator for calculating the value of the decoding picture element to be decoded in the selected decoding mode other than the specific decoding mode based on the prediction value of the decoding picture element calculated by the second predictor and the prediction error obtained by the third decoder.

The first decoder may have a first symbol restoring device for receiving the codeword and decoding the codeword into a sequence of binary symbols and a first probability estimator for estimating an occurrence probability of one of the binary symbols, and wherein the first decoder outputs one of the binary symbols as a result of determination, and the second decoder may have a second symbol restoring device for receiving the codeword and decoding the codeword into a sequence of binary symbols, a second probability estimator for receiving the binary symbols and estimating an occurrence probability of one of the binary symbols, and a first symbol-to-error converter for receiving the sequence of binary symbols and converting the sequence of binary symbols into the prediction error, and the third decoder may have a third symbol restoring device for receiving the codeword and decoding the codeword into a sequence of binary symbols, a third probability estimator for receiving the binary symbols and estimating an occurrence probability of one of the binary symbols, and a second symbol-to-error converter for receiving the sequence of binary symbols and converting the sequence of binary symbols into the prediction error.

The decoding controller may have a binary-symbol sequence using order controller for changing an order of using decoded binary symbols in a case where, before all sequences of binary symbols decoded by at least one of the first decoder, the second decoder, and the third decoder are used up, a sequence of binary symbols is output from the other one of the first decoder, the second decoder, and the third decoder.

In the decoding apparatus according to the present invention, at least one of the first symbol-to-error converter and the second symbol-to-error converter may convert the input sequence of binary symbols into the prediction error based on a value and a number of the binary symbols input.

The mode determinator may select a decoding mode for a decoding picture element based on a decoding mode for a decoded picture element preceding the decoding picture element.

In the decoding apparatus according to the present invention, at least one of the first symbol restoring device, the second symbol restoring device, and the third symbol restoring device may change interpretation as to which one of the binary symbols is a more probable symbol based on a change in probability estimation for the binary symbols respectively implemented by the first probability estimator for the first symbol restoring device, the second probability estimator for the second symbol restoring device and the third probability estimator for the third symbol restoring device.

The first predictor of the first decoding section and the second predictor of the second decoding section may be combined into a predictor.

At least two decoders of the first decoder, the second decoder, and the third decoder may be combined into a decoder.

In the decoding apparatus according to the present invention, based on information as to which one of the binary symbols is a more probable symbol and an estimated occurrence probability of the more probable symbol, at least one of the first symbol restoring device, the second symbol restoring device, and the third symbol restoring device may implement decoding for an enlarged information source of binary symbols effected by selecting a code most suited to a state of the enlarged information source of binary symbols assumed from the estimated occurrence probability of the more probable symbol from a Huffman code set prepared systematically for the enlarged information source of binary symbols.

An encoding method according to the present invention may comprise:

an outputting step of receiving and storing a picture element having a value within a predetermined range as an encoding picture element, outputting the value of the encoding picture element, and outputting a value of an encoded picture element adjacent to the encoding picture element as the value of a reference picture element;

a mode deciding step of selecting one of a specific encoding mode and an encoding mode other than the specific encoding mode from predefined encoding modes for the encoding picture element based on the value of the reference picture element;

a first main encoding step of predicting the value of the encoding picture element, determining whether the prediction is correct, encoding the value of the encoding picture element based on a result of determination, and outputting a codeword for the encoding picture element;

a second main encoding step of predicting the value of the encoding picture element, encoding the value of the encoding picture element without determining whether the prediction is correct, and outputting a codeword for the encoding picture element; and an encoding controlling step of selectively operating the first main encoding step and the second main encoding step based on the specific encoding mode and the encoding mode other than the specific encoding mode selected by the mode deciding step.

The first main encoding step may comprise:

a first predicting step of calculating a prediction value of the encoding picture element based on the value of the reference picture element;

a first prediction error calculating step of calculating an error between the value of the encoding picture element and the prediction value calculated by the first predicting step as a prediction error;

a determination step of determinating whether the prediction error calculated by the first prediction error calculating step is a predetermined value, and outputting a result of the determination;

a first encoding step of receiving and encoding the result of the determination output by the determination step and outputting the codeword for the encoding picture element to be encoded in the selected specific encoding mode; and a second encoding step of encoding the prediction error calculated by the first prediction error calculating step when the prediction error is other than the predetermined value for the encoding picture element to be encoded in the selected specific encoding mode, and outputting the codeword for the encoding picture element to be encoded in the selected specific encoding mode.

The second main encoding step may comprise:

a second predicting step of calculating a prediction value of the encoding picture element based on the value of the reference picture element;

a second prediction error calculating step of calculating an error between the value of the encoding picture element and the prediction value calculated by the second predicting step as a prediction error; and a third encoding step of encoding the prediction error calculated by the second prediction error calculating step for the encoding picture element to be encoded in the selected encoding mode other than the specific encoding mode, regardless of whether the prediction error is the predetermined value, and outputting the codeword for the encoding picture element to be encoded in the selected encoding mode other than the specific encoding mode.

The first encoding step may comprise a first probability estimating step of receiving the result of the determination output by the determination step as a sequence of binary symbols and estimating an occurrence probability of one of the binary symbols and a first codeword allotting step of encoding the sequence of binary symbols, the second encoding step may comprise a first error-to-symbol converting step of receiving the prediction error and converting the prediction error into a sequence of binary symbols, a second probability estimating step of receiving the sequence of binary symbols and estimating an occurrence probability of one of the binary symbols, and a second codeword allotting step of encoding the sequence of binary symbols, and the third encoding step may comprise a second error-to-symbol converting step of receiving the prediction error and converting the prediction error into a sequence of binary symbols, a third probability estimating step of receiving the sequence of binary symbols and estimating an occurrence probability of one of the binary symbols, and a third codeword allotting step of encoding the sequence of binary symbols.

In the encoding method according to the present invention, at least one of the first codeword allotting step, the second codeword allotting step, and the third codeword allotting step may include a step of changing interpretation as to which one of the binary symbols is a more probable symbol based on a change in probability estimation for the binary symbols respectively implemented by the first probability estimating step for the first codeword allotting step, the second probability estimating step for the second codeword allotting step, and the third probability estimating step for the third codeword allotting step.

In the encoding method according to the present invention, based on information as to which one of the binary symbols is a more probable symbol and an estimated occurrence probability of the more probable symbol, at least one of the first codeword allotting step, the second codeword allotting step, and the third codeword allotting step may implement encoding for an enlarged information source of the binary symbols effected by selecting a code most suited to a state of the enlarged information source of the binary symbols assumed from the estimated occurrence probability of the more probable symbol from a Huffman code set prepared systematically for the enlarged information source of the binary symbols.

A decoding method according to the present invention may comprise:

an outputting step of storing decoded picture elements having values within a predetermined range, and outputting the value of one of the decoded picture elements adjacent to a decoding picture element as the value of a reference picture element;

a mode deciding step of selecting one of a specific decoding mode and a decoding mode other than the specific decoding mode from a plurality of predefined decoding modes for the decoding picture element based on the value of the reference picture element;

a first main decoding step of receiving a codeword, predicting a value of the decoding picture element, determining whether the prediction is correct, and decoding the codeword into the value of the decoding picture element based on a result of the determination;

a second main decoding step of receiving a codeword, predicting the value of the decoding picture element, and decoding the codeword into the value of the decoding picture element without determining whether the prediction is correct; and a decoding controlling step of selectively operating the first main decoding step and the second main decoding step based on the specific decoding mode and the decoding mode other than the specific decoding mode selected by the mode deciding step.

The first main decoding step may comprise:
- a first predicting step of calculating a prediction value of the decoding picture element based on the value of the reference picture element;
- a first decoding step of decoding the codeword for the decoding picture element to be decoded in the selected specific decoding mode into a result of determination indicating whether a prediction error is a predetermined value;
- a second decoding step of decoding the codeword for the decoding picture element to be decoded in the selected specific decoding mode and having the prediction error other than the predetermined value into the prediction error other than the predetermined value; and
- a first decoding picture element calculating step of calculating the value of the decoding picture element based on the prediction value for the decoding picture element calculated by the first predicting step, the result of the determination, and the prediction error other than the predetermined value obtained by the second decoding step.

The second main decoding step may comprise:
- a second predicting step of calculating a prediction value of the decoding picture element based on the value of the reference picture element;
- a third decoding step of decoding the codeword for the decoding picture element to be decoded in the selected decoding mode other than the specific decoding mode into a prediction error regardless of whether the prediction error is the predetermined value; and
- a second decoding picture element calculating step of calculating the value of the decoding picture element to be decoded in the selected decoding mode other than the specific decoding mode based on the prediction value calculated by the second predicting step and the prediction error calculated by the third decoding step.

The first decoding step may comprise a first symbol restoring step for receiving the codeword and decoding the codeword into a sequence of binary symbols and a first probability estimating step of estimating an occurrence probability of one of the binary symbols, and a step of outputting one of the binary symbols as a result of the determination, the second decoding step may comprise a second symbol restoring step of receiving the codeword and decoding the codeword into a sequence of binary symbols, a second probability estimating step of estimating an occurrence probability of one of the binary symbols, and a first symbol-to-error converting step of receiving the sequence of binary symbols and converting the sequence of binary symbols into the prediction error, and the third decoding step may comprise a third symbol restoring step of receiving the codeword and decoding the codeword into a sequence of binary symbols, a third probability estimating step of receiving the binary symbols and estimating an occurrence probability of one of the binary symbols, and a second symbol-to-error converting step of receiving the sequence of binary symbols and converting the sequence of binary symbols into the prediction error.

In the decoding method according to the present invention, at least one of the first symbol restoring step, the second symbol restoring step, and the third symbol restoring step may include a step of changing interpretation as to which one of the binary symbols is a more probable symbol based on a change in probability estimation for the binary symbols respectively implemented by the first probability estimating step for the first symbol restoring step, the second probability estimating step for the second symbol restoring step, and the third probability estimating step for the third symbol restoring step.

In the decoding method according to the present invention, based on information as to which one of the binary symbols is a more probable symbol and an estimated occurrence probability of the more probable symbol, at least one of the first symbol restoring step, the second symbol restoring step, and the third symbol restoring step may implement decoding for an enlarged information source of binary symbols effected by selecting a code most suited to a state of the enlarged information source of binary symbols assumed from the estimated occurrence probability of the more probable symbol from a Huffman code set prepared systematically for the enlarged information source of binary symbols.

The encoding apparatus may be provided in a semiconductor chip.

The encoding apparatus may be provided in a circuit board.

A picture encoding apparatus according to the present invention for receiving picture signals representing picture elements, encoding the picture elements represented by the picture signals into codes by using an encoding apparatus therein, and for outputting the codes to a subsequent processing apparatus, the encoding apparatus may comprise:
- a picture element memory for receiving and storing a picture element having a value within a predetermined range as an encoding picture element, outputting the value of the encoding picture element, and for outputting a value of an encoded picture element adjacent to the encoding picture element as the value of a reference picture element;
- a mode determinator for selecting one of a specific encoding mode and an encoding mode other than the specific encoding mode from a plurality of predefined encoding modes for the encoding picture element based on the value of the reference picture element;
- a first encoding section for predicting the value of the encoding picture element, determining whether the prediction is correct, encoding the value of the encoding picture element based on a result of the determination, and for outputting a codeword for the encoding picture element;
- a second encoding section for predicting the value of the encoding picture element, encoding the value of the encoding picture element without determining whether the prediction is correct, and for outputting a codeword for the encoding picture element; and
- an encoding controller for selectively operating the first encoding section and the second encoding section based on one of the specific encoding mode and the encoding mode other than the specific encoding mode selected by the mode determinator.

The picture processing apparatus may be an electronic computer.

The picture processing apparatus may be a scanner.

The picture processing apparatus may be a facsimile machine.

The picture processing apparatus may be a display unit.

The picture processing apparatus may be a storage device.

The decoding apparatus may be provided in a semiconductor chip.

The decoding apparatus may be provided in a circuit board.

A picture processing apparatus according to the present invention for receiving a picture signal representing a code for a picture element, decoding the code into the value of the picture element by a decoding apparatus therein, and for outputting the picture element to a subsequent processing apparatus, the decoding apparatus may comprise:
- a picture element memory for storing decoded picture elements having values within a predetermined range and outputting the value of one of the decoded picture elements adjacent to a decoding picture element as the value of a reference picture element;
- a mode determinator for selecting one of a specific decoding mode and a decoding mode other than the specific decoding mode from a plurality of predefined decoding modes for the decoding picture element based on the value of the reference picture element;
- a first decoding section for receiving a codeword, predicting a value of the decoding picture element, determining whether the prediction is correct, and for decoding the codeword into the value of the decoding picture element based on a result of the determination;
- a second decoding section for receiving a codeword, predicting the value of the decoding picture element, and for decoding the codeword into the value of the decoding picture element without determining whether the prediction is correct; and
- a decoding controller for selectively operating the first decoding section and the second decoding section based on the result of the determination made by the specific decoding mode and the decoding mode other than the specific decoding mode selected by the mode determinator.

The picture processing apparatus may be an electronic computer.

The picture processing apparatus may be a scanner.

The picture processing apparatus may be a facsimile machine.

The picture processing apparatus may be a printer.

The picture processing apparatus may be a display unit.

The picture processing apparatus may be a storage device.

The encoding apparatus according to the present invention may comprise:
- a picture element memory for receiving and storing a picture element having a value within a predetermined range as an encoding picture element, outputting the value of the encoding picture elements and for outputting a value of an encoded picture element adjacent to the encoding picture element as the value of a reference picture element;
- an encoding section for predicting the value of the encoding picture element, determining whether the prediction is correct, encoding the value of the encoding picture element based on a result of the determination, and for outputting a codeword for the encoding picture element; and
- an encoding controller for operating the encoding section based on the result of the prediction made by the encoding section.

The encoding section may comprise:
- a predictor for calculating a prediction value of the encoding picture element based on the value of the reference picture element;
- a prediction error calculator for calculating an error between the value of the encoding picture element and the prediction value calculated by the predictor (3) as a prediction error;
- a determinator for determining whether the prediction error calculated by the prediction error calculator is a specific value and for outputting a result of determination;
- a first encoder for receiving the result of determination output from the determinator, encoding the result of determination, and for outputting the codeword; and
- a second encoder for encoding the prediction error calculated by the prediction error calculator when the prediction error is other than the specific value for the encoding picture element to be encoded and for outputting the codeword for the encoding picture element to be encoded.

A decoding apparatus according to the present invention may comprise:
- a picture element memory for storing decoded picture elements having values within a predetermined range and for outputting the value of one of the decoded picture elements adjacent to a decoding picture element as the value of a reference picture element;
- a decoding section for receiving a codeword, predicting a value of the decoding picture element, determining whether the prediction is correct, and for decoding the codeword into the value of the decoding picture element based on a result of the determination; and
- a decoding controller for operating the decoding section based on the result of the determination made by the decoding section.

The decoding section may comprise:
- a predictor for calculating a prediction value for the decoding picture element based on the value of the reference picture element;
- a first decoder for decoding the codeword into a result of determination whether a prediction error is a predetermined value;
- a second decoder for decoding the codeword for the decoding picture element whose prediction error is not the predetermined value into the prediction error;
- a decoding picture element calculator for calculating the value of the decoding picture element based on the prediction value calculated by the predictor, the result of the determination, and the prediction error obtained by the second decoder.

A picture processing apparatus according to the present invention may comprise:
- a picture pick-up device for picking up a picture composed of a plurality of picture elements;
- a picture compression circuit for compressing the picked-up picture; and
- a memory for storing the compressed picture, and the picture compression circuit may comprise an encoding apparatus comprising:
- a picture element memory for receiving and storing a picture element having a value within a predetermined range as an encoding picture element, outputting the value of the encoding picture element, and for outputting a value of an encoded picture element adjacent to the encoding picture element as the value of a reference picture element;
- a mode determinator for selecting one of a specific encoding mode and an encoding mode other than the specific encoding mode from a plurality of predefined encoding modes for the encoding picture element based on the value of the reference picture element;

a first encoding section for predicting the value of the encoding picture element, determining whether the prediction is correct, encoding the value of the encoding picture element based on a result of the determination, and for outputting a codeword for the encoding picture element;

a second encoding section for predicting the value of the encoding picture element, encoding the value of the encoding picture element without determining whether the prediction is correct, and for outputting a codeword for the encoding picture element; and an encoding controller for selectively operating the first encoding section and the second encoding section based on one of the specific encoding mode and the encoding mode other than the specific encoding mode selected by the mode determinator.

A picture processing apparatus according to the present invention may comprise:

a picture pick-up device for picking up a picture composed of a plurality of picture elements;

a picture compression circuit for compressing the picked-up picture;

a memory for storing the compressed picture; and a picture expansion circuit for expanding the stored picture, and the picture expansion circuit may comprise a decoding apparatus comprising:

a picture element memory for storing decoded picture elements having values within a predetermined range, and outputting the value of one of the decoded picture elements adjacent to a decoding picture element as a value of a reference picture element;

a mode determinator for selecting one of a specific decoding mode and a decoding mode other than the specific decoding mode from a plurality of pre-defined decoding modes for the decoding picture element based on the value of the reference picture element;

a first decoding section for receiving a codeword, predicting a value of the decoding picture element, determining whether the prediction is correct, and for decoding the codeword into the value of the decoding picture element based on a result of the determination;

a second decoding section for receiving a codeword for the decoding picture element, predicting the value of the decoding picture element, decoding the codeword into the value of the decoding picture element without determining whether the prediction is correct; and a decoding controller for selectively operating the first decoding section and the second decoding section based on one of the specific decoding mode and the decoding mode other than the specific decoding mode selected by the mode determinator.

The picture compression circuit may comprise a plurality of the encoding apparatuses for inputting a luminance signal Y and color-difference signals U, V in parallel and for encoding the signals.

The picture compression circuit may comprise a plurality of the encoding apparatuses for inputting color signals R, G, B in parallel and for encoding the signals.

The picture compression circuit may comprise one encoding apparatus for serially inputting a luminance signal Y and color-difference signals U, V by a block unit and for encoding the signals.

The picture compression circuit may comprise one encoding apparatus for serially inputting color signals R, G, B by a block unit and for encoding the signals.

The picture expansion circuit may comprise a plurality of the decoding apparatuses for inputting an encoded luminance signal Y and encoded color-difference signals U, V in parallel and for decoding the signals.

The picture expansion circuit may comprise a plurality of the decoding apparatuses for inputting encoded color signals R, G, B in parallel and for decoding the signals.

The picture expansion circuit may comprise one decoding apparatus for serially inputting an encoded luminance signal Y and encoded color-difference signals U, V by a block unit and for decoding the signals.

The picture expansion circuit may comprise one decoding apparatus for serially inputting encoded color signals R, G, B by a block unit and for decoding the signals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a table showing examples of conversion of prediction errors into binary symbols performed by the second encoder.

FIG. 9 is a table showing examples of conversion of prediction errors into binary symbols performed by the third encoder.

FIG. 11 is a diagram showing examples of encoding conditions for encoding picture elements according to the present invention.

FIG. 67 are tables showing a conventional encoding and decoding method.

FIG. 70 shows a configuration of a conventional picture compression circuit and a conventional picture expansion circuit.

DETAILED DESCRIPTION OF THE PREFERRED EMBODIMENTS

Embodiment 1.

Figure 1:
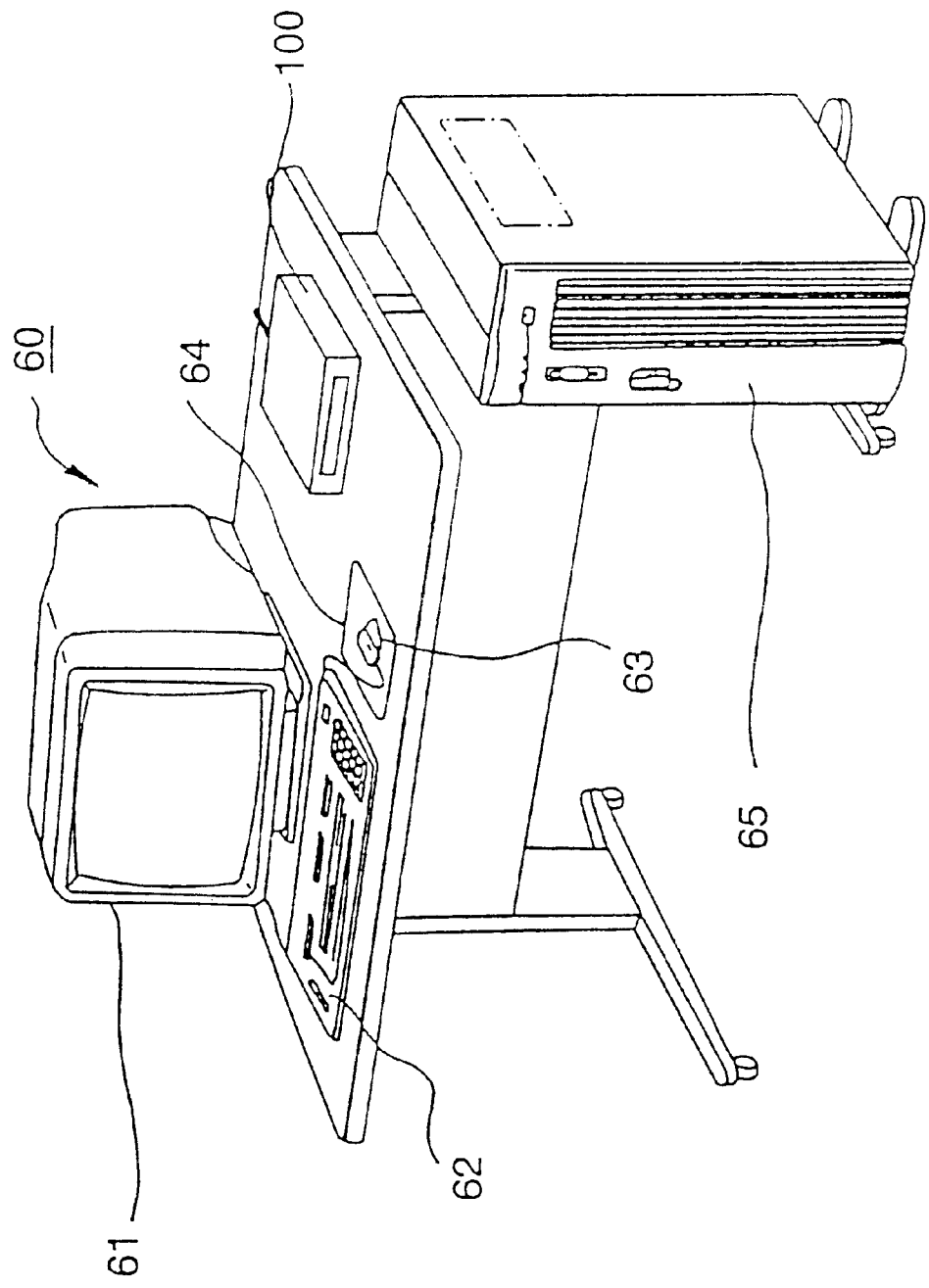
FIG. 1 is a perspective view showing a picture processing apparatus according to the present invention.

FIG. 1 is a perspective view showing a configuration of a picture processing apparatus having an encoder according to the present invention.

A picture processing apparatus having a decoder according to the present invention also has the configuration similar to that of the picture processing apparatus illustrated in FIG. 1.

In FIG. 1, a picture processing apparatus 60 includes a display unit 61, a keyboard 62, a mouse 63, a mouse pad 64, a system unit 65, and a compact disc drive 100.

As shown in FIG. 1, for example, a picture processing apparatus having a decoder according to the present invention receives encoded picture information from the compact disc drive 100, decodes the encoded picture information, transfers the decoded picture information to the system unit 65, and displays the decoded picture information on the display unit 61. A picture processing apparatus according to the present invention encodes picture information displayed on the display unit 61 and supplies the encoded picture information to the compact disc drive 100. Alternatively, a picture processing apparatus according to the present invention encodes picture information and transmits the encoded picture information via a transmission line (not shown). The configuration of the picture processing apparatus according to the present invention does not have to be limited to the configuration of a personal computer or a workstation as shown in FIG. 1. Other types of configurations using other components may also be used. A video player, for example, may be used as an input device instead of the compact disc drive 100, or picture data from a network may be input in place of the picture information. The input data may be either in analog format or in digital format.

Figure 2:
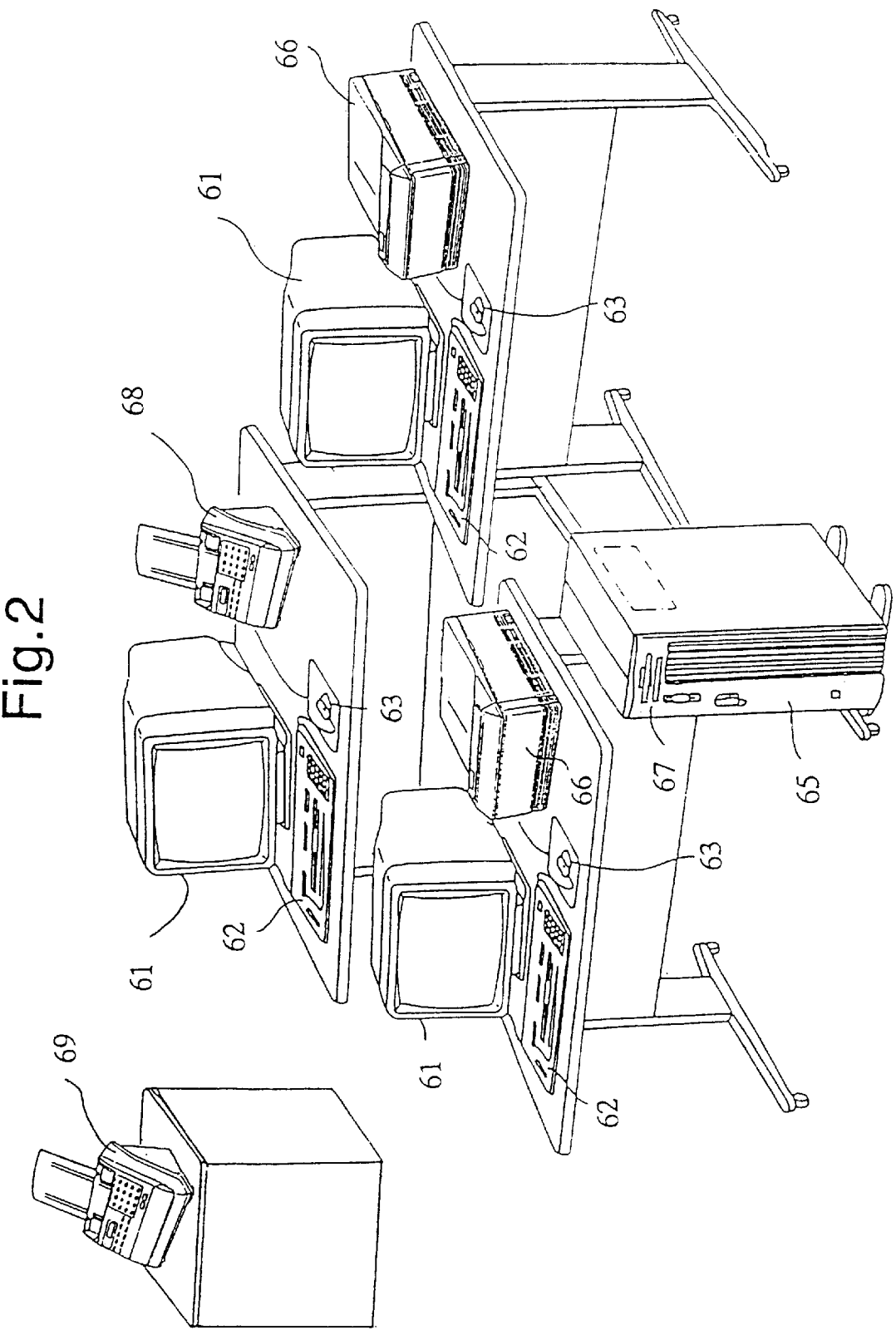
FIG. 2 is a perspective view showing an application of a picture processing apparatus according to the present invention.

A picture processing apparatus according to the present invention may be provided as an independent apparatus, as shown in FIG. 1. However, it may be housed inside the housing of a peripheral device such as a printer 66, a scanner 68, a facsimile machine 69, a display apparatus (such as the display unit 61), or a storage device (such as the compact disc drive 100), as shown in FIG. 2. That is, a picture processing apparatus according to the present invention is defined herein to be an electronic apparatus having an encoding apparatus or a decoding apparatus which will be hereinafter described. Or, a picture processing apparatus according to the present invention is also defined to be an electronic apparatus for implementing an encoding method or a decoding method which will be hereinafter described.

An encoding apparatus or a decoding apparatus according to the present invention may be provided as an independent apparatus. Alternatively, it may be incorporated into a system board of a television camera, a measuring device, or a computer, or it may be incorporated as a part of a circuit board, or it may be provided in a semiconductor chip. It may be implemented in a type of a communication system by connecting individual devices illustrated in FIG. 2 via a local area network (not shown in FIG. 2) to transmit encoded information therebetween. Alternatively, it may be implemented in a type of a communication system for receiving and transmitting encoded information via a wide area network such as the ISDN (Integrated Services Digital Network).

Figure 3:
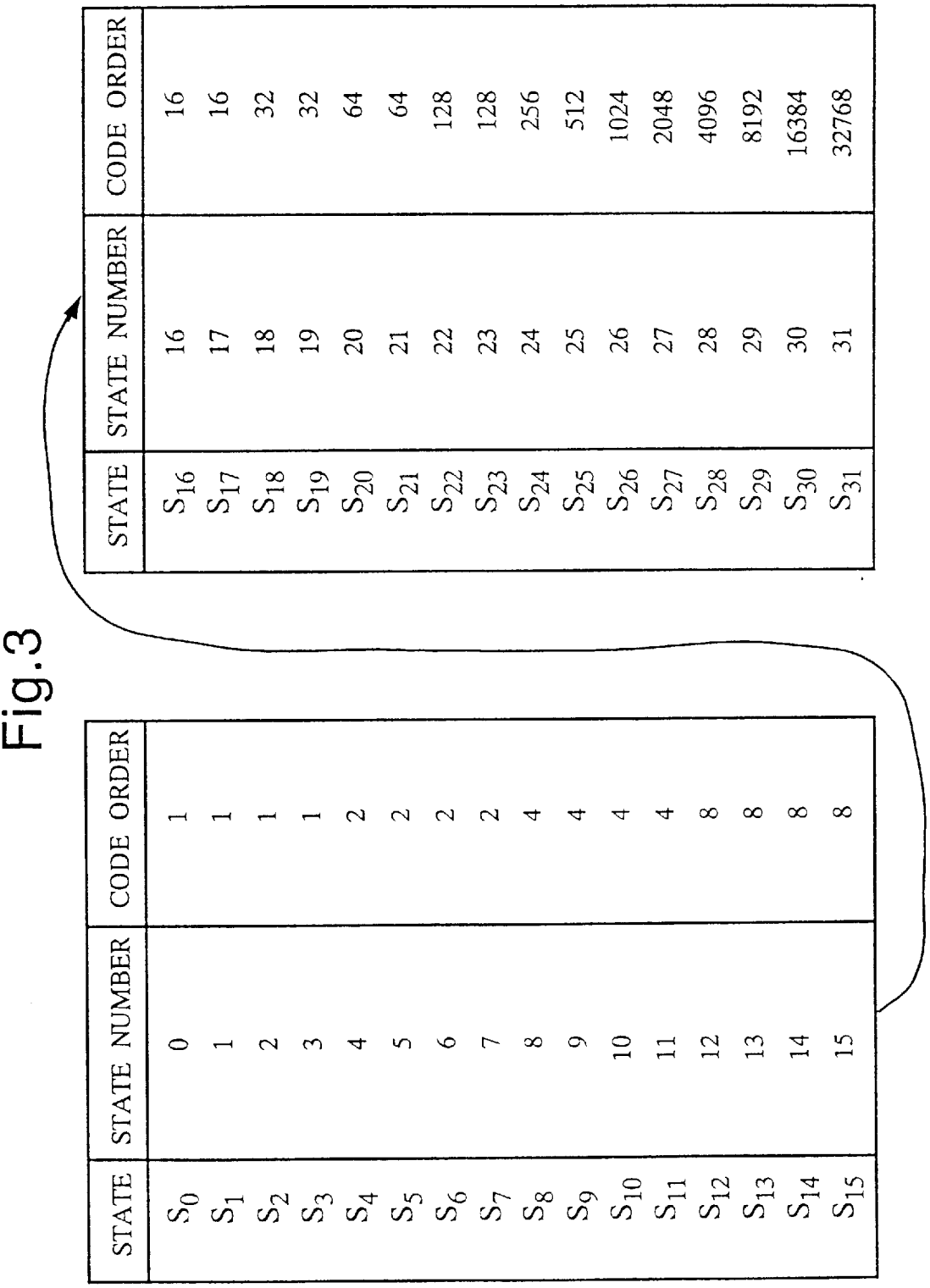
FIG. 3 is a table showing the states in which binary symbols to be encoded belong and the code orders.

In this embodiment, the encoding or the decoding method described in FIG. 67 is assumed to be applied to an encoder in an encoding apparatus or a decoder in a decoding apparatus according to the present invention. In this embodiment, it is assumed that encoding or decoding for an extended information source of binary symbols (a binary symbol sequence) is implemented, based on the information which one of the binary symbols is MPS and based on the estimated occurrence probability of the MPS, by selecting a codeword table from a set of Huffman codeword tables prepared systematically for the extended information source of binary symbols (a binary symbol sequence) as shown in FIG. 67. The code can be most suited to the state of the extended information source of binary symbols decided from the estimated occurrence probability of the MPS. It is also assumed that, as shown in FIG. 3, code orders are set respectively for the thirty-two states. Based on the state transition rule as shown in FIG. 3, a plurality of encoders or decoders, which will be hereinafter described, respectively and independently set one of the thirty-two states and one of the corresponding code orders and encode or decode binary symbols.

A configuration and an operation of an encoding apparatus according to the first embodiment of the present invention will be described explaining the switching between encoding modes and the conversion of a prediction error between the value of an encoding picture element and a prediction value therefor into a binary symbol sequence.

Figure 4:
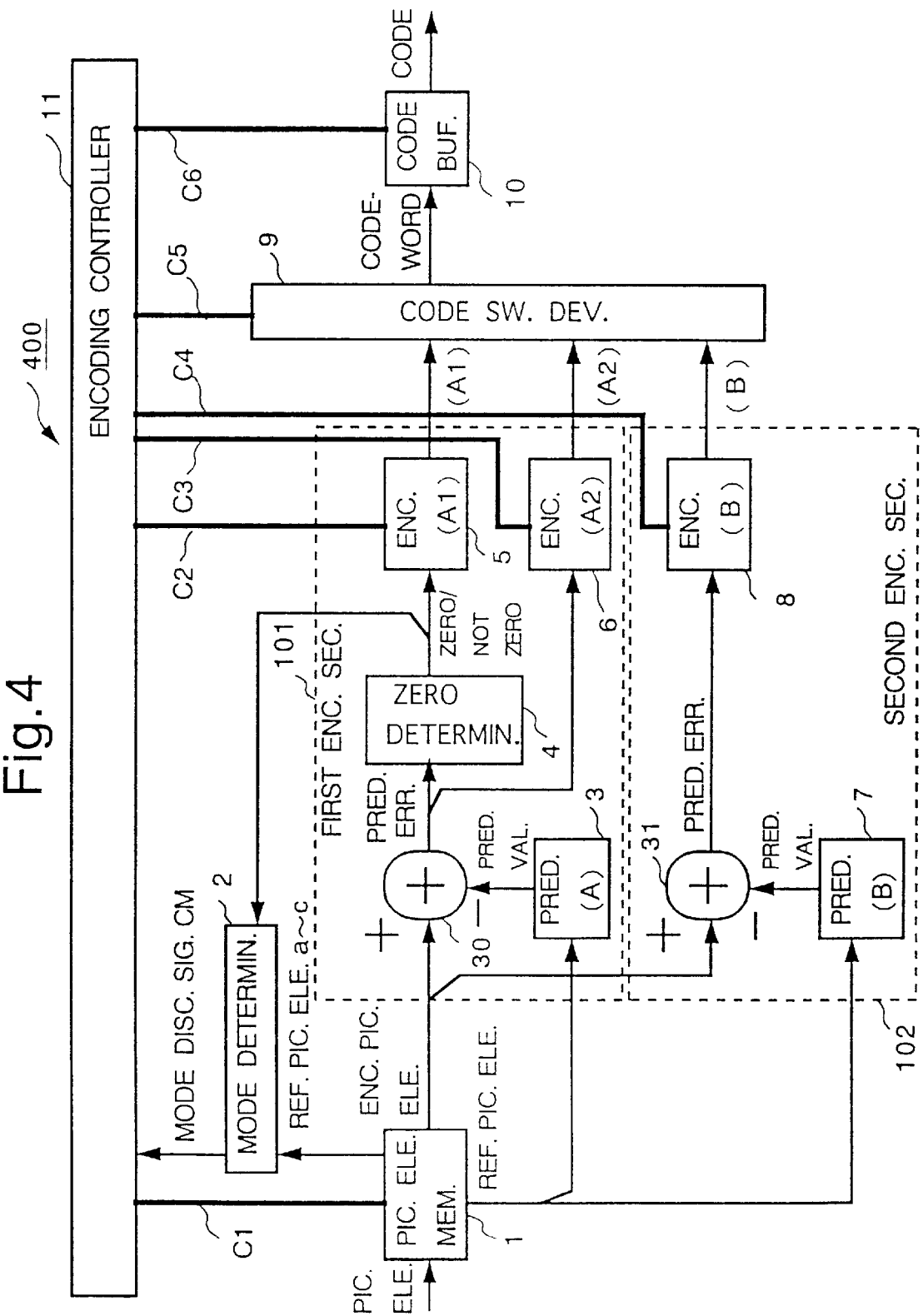
FIG. 4 is a block diagram showing a configuration of an encoding apparatus according to the first embodiment.

FIG. 4 shows a configuration of an encoding apparatus 400 according to the first embodiment of the present invention.

First, the configured elements of the encoding apparatus 400 according to this embodiment will be described.

In FIG. 4, reference numeral 1 indicates a picture element memory for receiving, storing, and outputting the value of an encoding picture element. The picture element memory 1 also outputs the value of at least one encoded picture element which has been already stored in the picture element memory 1 and which is adjacent to the encoding picture element as a reference picture element.

Reference numeral 2 indicates a mode determinator for deciding the mode A or the mode B, based on the value of the at least one reference picture element and for outputting a mode discrimination signal CM. A mode decision method for deciding the mode A or the mode B will be hereinafter described.

Reference numeral 3 indicates a first predictor for calculating in the mode A the prediction value of the encoding picture element by referring to the value(s) of the reference picture element(s).

Reference numeral 30 represents a first prediction error calculator for subtracting the prediction value calculated by the predictor 3 from the value of the encoding picture element and for determining the prediction error.

Reference numeral 4 indicates a zero determinator for converting the prediction error between the value of the encoding picture element and the prediction value calculated by the predictor 3 into a binary symbol indicating whether the prediction error is 0 or not 0. Then, the zero determinator 4 outputs the converted binary symbol. In this embodiment and the embodiments which will be hereinafter described, a zero determinator is provided for determining whether a prediction error is zero or not. However, this determinator may be a determinator for determining whether or not a prediction error is a predetermined value such as, for example, one or not one, or −3 or not −3, and the like.

Reference numeral 5 indicates a first encoder for encoding in the mode A the binary symbol which has been output from the zero determinator 4.

Reference numeral 6 indicates a second encoder for encoding a prediction error in the mode A except when the prediction error is zero. (When the above-mentioned determinator determines whether a prediction error is one or not one, the second encoder 6 encodes a prediction error in the mode A except when the prediction error is one. Similarly, when the above-mentioned determinator determines whether a prediction error is −3 or not −3, the second encoder 6 encodes a prediction error in the mode A except when the prediction error is −3.)

Reference numeral 7 indicates a second predictor for calculating in the mode B the prediction value of an encoding picture element by referring to the value(s) of the reference picture element(s).

Reference numeral 31 indicates a second prediction error calculator for determining the prediction error by subtracting the prediction value calculated by the predictor 7 from the value of the encoding picture element.

Reference numeral 8 represents a third encoder for encoding in the mode B the prediction error between the value of the encoding picture element and the prediction value calculated by the predictor 7.

Reference numeral 9 represents a code switching device for selecting and outputting an appropriate codeword among the codewords supplied from the first encoder 5, the second encoder 6, and the third encoder 8.

Reference numeral 10 represents a code buffer for receiving codewords selected by the code switching device 9 and for outputting a sequence of codes in the order the codewords have been supplied to the code buffer.

Reference numeral 11 indicates an encoding controller for controlling the picture element memory 1, the first encoder 5, the second encoder 6, and the third encoder 8, the code switching device 9, and the code buffer 10, based on the mode discrimination signal CM and control signals C1 through C6.

Reference numeral 101 indicates a first encoding section provided with the first encoder 5 which encodes in the mode A a binary symbol indicating whether or not a prediction error between the value of an encoding picture element and the estimated prediction value is zero, and the second encoder 6 which encodes a prediction error in the mode A when the prediction error is not zero.

Reference numeral 102 indicates a second encoding section provided with the third encoder 8 which encodes in the mode B a prediction error regardless of whether or not the prediction error between the value of an encoding picture element and the estimated prediction value is zero.

Figure 5:
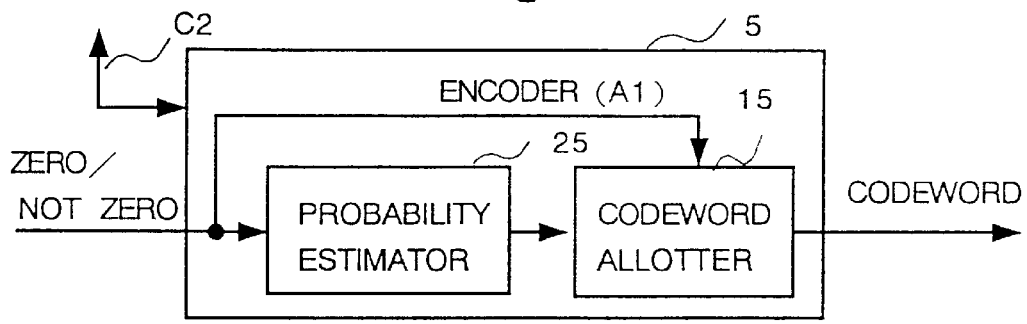
FIG. 5 is a block diagram showing a configuration of a first encoder according to the present invention.
Figure 6:
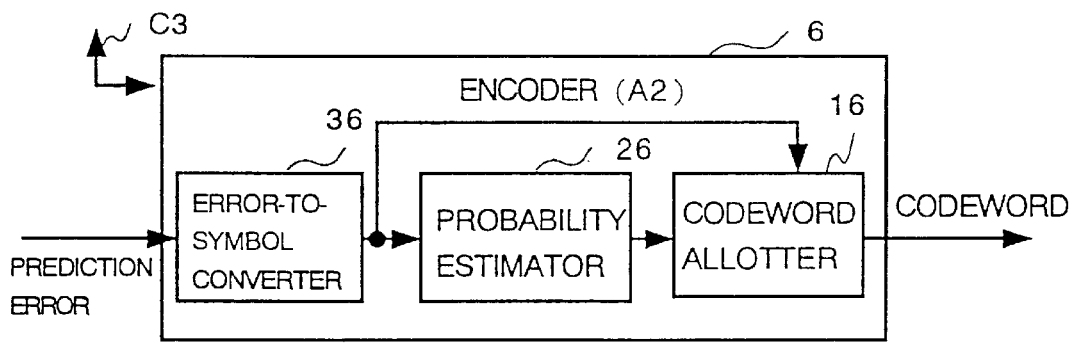
FIG. 6 is a block diagram showing a configuration of a second encoder according to the present invention.
Figure 7:
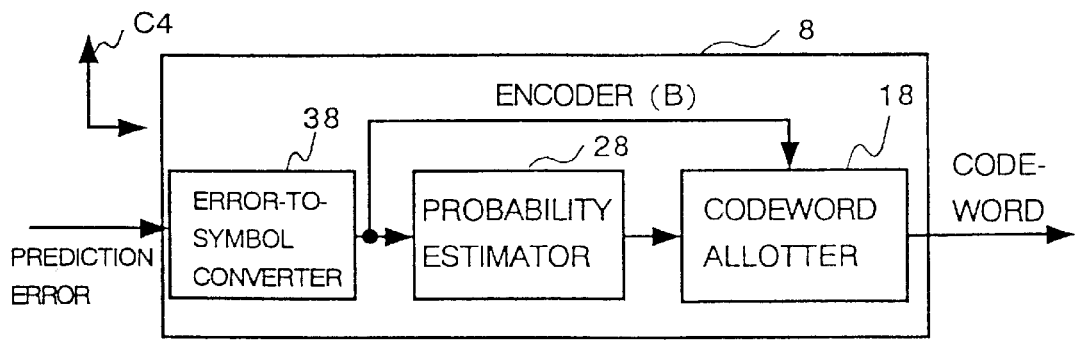
FIG. 7 is a block diagram showing a configuration of a third encoder according to the present invention.

FIGS. 5 through 7 are block diagrams showing internal configurations of the first encoder 5, the second encoder 6, and the third encoder 8 respectively.

Referring to FIGS. 5 through 7, the first encoder 5, the second encoder 6, and the third encoder 8 include the first probability estimator 25, the second probability estimator 26, and the third probability estimator 28 respectively for receiving a sequence of binary symbols and estimating the occurrence probability of the More Probable Symbols (MPS) for the binary symbols. Furthermore, the first encoder 5, the second encoder 6, and the third encoder 8 have a first codeword allotter 15, a second codeword allotter 16, and a third codeword allotter 18 respectively for receiving a sequence of binary symbols and the estimated occurrence probability of the MPS estimated by the probability estimators, for encoding the sequence of binary symbols, and for outputting codewords. The first probability estimator 25, the second probability estimator 26, and the third probability estimator 28 determine the code orders shown in FIG. 3, and supply the code orders to the first codeword allotter 15, the second codeword allotter 16, and the third codeword allotter 18 respectively. In other words, the probability estimator changes the code order to an appropriate value based on the occurrence probability of the MPS estimated from past data on binary symbol sequences. For this reason, an encoding efficiency can be enhanced.

There are possibly two methods by which probability estimators determine the code order. Both of the two methods have already been described hereinbefore as the conventional related arts.

The first example of the two methods is the state transition method. In this system, the state number assigned to specify each of the thirty-two states shown in FIG. 3 is increased by one when the number of MPSs consecutively occurred has become equal to the code order. On the other hand, when an LPS has occurred before the number of MPSs consecutively occurred becomes equal to the code order, the state number is decreased by one.

The second example of the two methods is to count the number of binary symbols "0" and binary symbols "1" which have occurred in a binary symbol sequence and which are respectively indicated by N(0) and N(1), and determine the code order based on the result of the count.

The probability estimator may estimate the occurrence probability of the MPS by using a method other than the abovementioned first code order determination method or the second code order determination method.

Referring to FIG. 6 and FIG. 7, the second encoder 6 and the third encoder 8 have the first error-to-symbol converter 36 and the second error-to-symbol converter 38 respectively for converting a prediction error to binary symbol(s). The error-to-symbol converter 36 performs conversion as shown in FIG. 8. On the other hand, the error-to-symbol converter 38 performs conversion as shown in FIG. 9. The conversion performed by the error-to-symbol converter 36 or the error-to-symbol converter 38 can be effected by prestoring the tables as shown in FIG. 8 and FIG. 9 and then converting a prediction error into binary symbol(s), by retrieving the tables.

Alternatively, a correspondence between the prediction error and binary symbol(s) shown in FIG. 8 and FIG. 9 may be achieved by using an algorithm which will be described hereinafter. The algorithm involves the step of generating comparison values successively, starting with the value which would most likely occur as a prediction error to be supplied to the error-to-symbol converter 36 or the error-to-symbol converter 38, that is, in order from the lowest absolute value of the prediction error among those shown in FIG. 8 and FIG. 9, and the step of comparing one by one the generated comparison values with the prediction error supplied to the error-to-symbol converter 36 or the error-to-symbol converter 38. The comparison continues until one of the generated comparison values coincides with the prediction error. When one of the generated comparison values does not coincide with the prediction error, a binary symbol "0" is produced. Then, a next generated comparison value and the prediction error are compared. When the next generated comparison value does not coincide with the prediction error, a binary symbol "0" is produced again. Thereafter, when a comparison value subsequently generated coincides with the prediction error, a binary symbol "1" is produced, and the conversion is terminated.

An operation of achieving the correspondence between the prediction error and binary symbol(s) by using the above-mentioned algorithm will be described more specifically with reference to FIG. 8.

Here, it is assumed that a prediction error to be supplied to the error-to-symbol converter 36 is "−2".

The error-to-symbol converter 36 generates "−1" as the first comparison value. Since the first comparison value and the prediction error supplied to the error-to-symbol converter 36 do not coincide with each other, a binary symbol "0" is output. Then, the error-to-symbol converter 36 generates "+1" as the second comparison value. Since the prediction error "−2" and the comparison value "+1" do not coincide with each other, a binary symbol "0" is output again. Then, the error-to-symbol converter 36 generates the comparison value "−2". Since the prediction value and the comparison value coincide with each other this time, a binary symbol "1" is generated, and the conversion is terminated. Consequently, when the prediction error "−2" is supplied to the error-to-symbol converter 36, a binary symbol sequence "001" is output.

Next, an encoding operation of an encoding apparatus 400 according to the first embodiment will be described.

Figure 10:
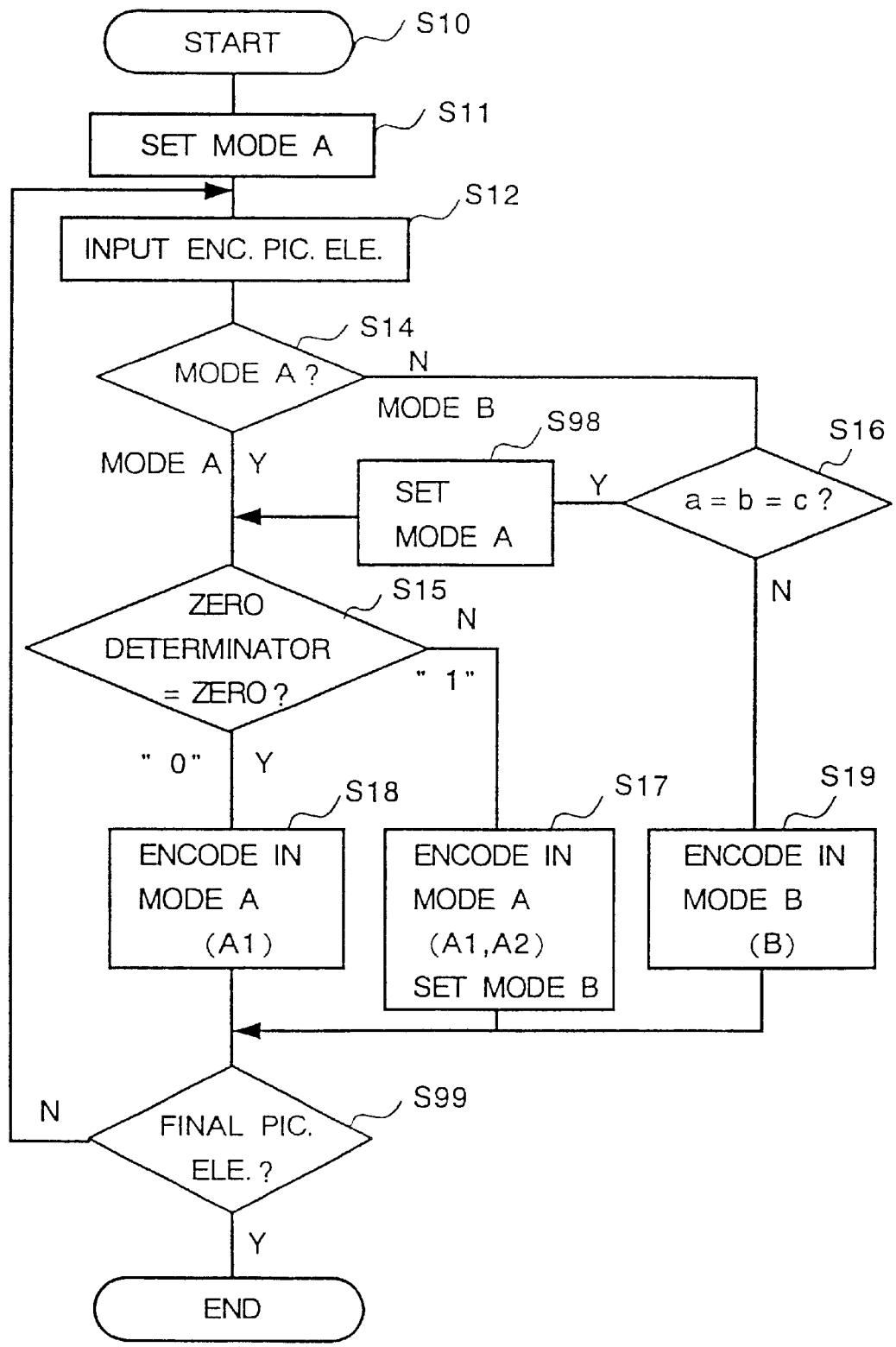
FIG. 10 is a flow chart showing a flow of an encoding process according to the present invention.

FIG. 10 is a flow chart showing a mode deciding operation effected by the mode determinator 2 and a flow of an encoding operation based on the decided mode.

Referring to FIG. 10, a mode switching operation is effected by the step of deciding by the mode determinator 2 whether or not reference picture elements a, b, and c for an encoding picture element which have been supplied from the picture element memory 1 satisfy the condition "a=b=c" ("a=b=c" indicates the values of reference picture elements a, b, and c are all identical) (S16), and the step of deciding whether the output value of the zero determinator 4 is "0" (prediction error=0; or prediction has proved to be correct) or "1" (prediction error □ 0; or prediction has proved to be incorrect) (S15). Then, the mode A or the mode B is specified (at S17 and S98). If the condition "a=b=c" is satisfied (at S11 or S16), and if the output value of the zero determinator 4 is then determined to be "0" (at S15), encoding in the mode A is determined and continues (at S18). In other words, once reference picture elements a, b, and c adjacent to a picture element X have satisfied the condition "a=b=c", the encoding in the mode A continues until a picture element X which does not coincide with a prediction value X occurs. If the output value of the zero determinator 4 is determined to be "1" (at S15), the picture element which has rendered the output value of the zero determinator 4 "1" is encoded in the mode A. Then, the mode B is set, and the encoding mode is switched into the mode B (at S17). When the condition "a=b=c" is satisfied in the mode B (at S16), the mode A is set (at S98). Then, whether the output value of the zero determinator 4 is "0" (the prediction error=0; or the prediction has proved to be correct) or "1" (the prediction error □ 0; or the prediction has proved to be incorrect) is determined (at S15). If the condition "a=b=c" is not satisfied in the mode B, encoding in the mode B is implemented and continues (at S19).

The operations of the flow chart shown in FIG. 10 will be hereinafter described again by referring to specific examples about FIG. 5 and FIG. 6.

(1) Encoding in the Mode A

An encoding operation in the mode A will be described.

First, the zero determinator 4 outputs a binary symbol "0" if a prediction error obtained by subtracting the output of the predictor 3 or the prediction value (for example, the value of the picture element which has been output immediately before the reference picture element) from the value of an encoding picture element is zero (the prediction has proved to be correct). On the other hand, if a prediction error is not zero (the prediction has proved to be incorrect), the zero determinator 4 outputs a binary symbol "1". The first encoder 5 implements encoding, regarding the output value "0" of the zero determinator 4 as the MPS and the output value "1" as the LPS. The encoding process in case that the output value of the zero determinator 4 is "0" (a prediction error is zero), and in case that the output value of the zero determinator 4 is "1" (a prediction error is not zero) proceeds as follows:

(1—1) Case that the Output Value of the Zero Determinator 4 is "0".

The first encoder 5 has an MPS counter (not shown) inside the probability estimator 25. The MPS counter counts the number of binary symbols "0" indicating that a prediction error is zero, that is, the number of MPSs consecutively occurred. As is seen from FIG. 67, a one-bit codeword "0" is determined only when the number of MPSs consecutively occurred which are supplied to the first encoder 5 (the count of the MPS counter) has become equal to the code order. The codeword is not determined until the number of MPSs consecutively occurred becomes equal to the code order.

(1–2) Case that the Output Value of the Zero Determinator 4 is "1".

First, the first encoder 5 encodes a binary symbol "1" indicating that a prediction error is not zero, that is, an LPS together with the number of MPSs which have occurred before the LPS and which have not been allotted a codeword yet. As seen from FIG. 67, the codeword length is determined according to the number of MPSs which have occurred before the LPS (the count of the MPS counter). When the code order is $2^n$ a codeword whose codeword length is (n+1) bits is determined. When encoding by the first encoder 5 is finished, the second encoder 6 converts a prediction error obtained by subtracting the prediction value output of the predictor 3 from the value of an encoding picture element (−255 −1, 1 255, exclusive of zero, in the case of one picture element being represented by eight bits) into a binary symbol sequence "0 . . . 01" shown in FIG. 8 so as to implement encoding. The converted binary symbol sequence is divided into at least one message based on the value of the code order determined by the probability estimator 26. Then, the codeword corresponding to the at least one message is determined.

The feature of this embodiment is that, when a prediction error is encoded by the second encoder 6, the same encoding system as that has been applied to the first encoder 5 as shown in FIG. 67 is also applied. In other words, a main feature of this embodiment is that, for encoding a binary symbol sequence, the same encoding method shown in FIG. 67 is applied to both the first encoder 5 and the second encoder 6.

(2) Encoding in the Mode B

Next, an operation of encoding in the mode B will be described.

The predictor 7 calculates a prediction value from the value of at least one reference picture element. The calculation method may be implemented in accordance with a predetermined prediction function or by referring to the reference table. The third encoder 8 converts a prediction error (−255 +255, inclusive of zero in the case of one picture element being represented by eight bits) obtained by subtracting the calculated prediction value from the value of an encoding picture element into a binary symbol sequence shown in FIG. 9. Then, the third encoder 8 encodes the binary symbol sequence in the same manner as that with the second encoder 6. In other words, a codeword corresponding to the binary symbol sequence is generated, based on the encoding method illustrated in FIG. 67. Since all of binary symbol sequences shown in FIG. 9 end with an LPS, the third encoder 8 can determine codewords corresponding to all the binary symbol sequences illustrated in FIG. 9.

In the conversion examples shown in FIG. 8 and FIG. 9 described hereinbefore, the values which would most likely occur as prediction errors are successively generated and compared with a prediction error shown in FIG. 8 or FIG. 9. When one of these values coincides with the prediction error, a binary symbol "1" is output. While on the other hand, when one of these values does not coincide with the prediction error, a binary symbol "0" is output. In this way, prediction errors are converted into binary symbol(s). As described hereinbefore, the error-to-symbol converter 36 and the error-to-symbol converter 38 convert a prediction error into binary symbol(s) and supplies the binary symbol (s) to the probability estimator 26 and the probability estimator 28, respectively. The probability estimator 26 and the probability estimator 28 receive the binary symbol(s), change, and determine the code order based on the received binary symbol(s) and supplies the determined code order to the codeword allotter 16 and the codeword allotter 18, respectively. The aforementioned two code order determination methods can be applied in this case. Encoding effected by the codeword allotter 16 and the codeword allotter 18 are the same as encoding effected by the codeword allotter 15. It means that encoding is accomplished by using the encoding method shown in FIG. 67.

Referring again to FIG. 4, the encoding controller 11 directs the picture element memory 1 to store the values of encoding picture elements and output the values of the encoding picture elements and the value of at least one reference picture element adjacent to one of the encoding picture elements. The encoding controller operates the first encoder 5, the second encoder 6, and the third encoder 8 appropriately via the mode discrimination signal CM supplied from the mode determinator 2. During that operation process, the first encoder 5, the second encoder 6, and the third encoder 8 notify the encoding controller 11 of the state in which codewords are arranged to be output. The encoding controller 11 determines among the first encoder 5, the second encoder 6, and the third encoder 8 the encoder for outputting codewords and uses the code switching device 9 and the code buffer 10 to supply a code composed of a sequence of codewords in the order that the codewords have been determined. By being directly notified of required individual codeword lengths from the first encoder 5, the second encoder 6, and the third encoder 8, or by being indirectly notified of the required individual codeword lengths via the encoding controller 11, the code buffer 10 constitutes a code from codewords.

Figure 12:
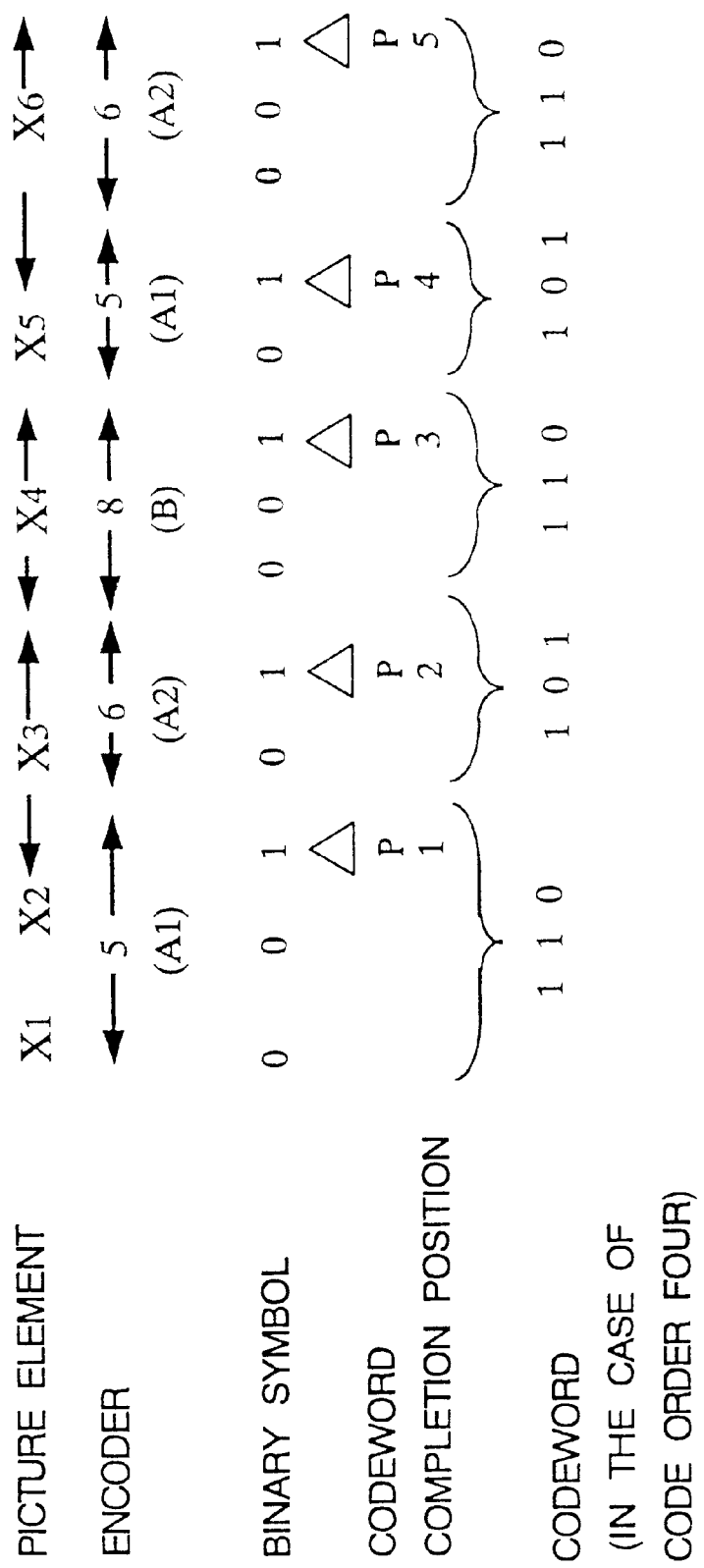
FIG. 12 is a diagram showing an encoding operation according to the present invention.

Next, referring to FIG. 11 and FIG. 12, the flow chart illustrated in FIG. 10 will be more specifically described.

FIG. 11 is a diagram showing encoding picture elements, the condition of reference picture elements, the output values of the zero determinator, and prediction errors.

When picture elements $X_1$ through $X_6$ as shown in FIG. 11 have been entered, the condition of reference picture elements adjacent to them are as described in FIG. 11. The output values of the zero determinator indicate whether or not predictions for respective encoding picture elements have proved to be correct. Prediction errors represent the values of the prediction errors when predictions have proved to be incorrect. Assuming that the picture elements $X_1$ through $X_6$ as shown in FIG. 11 are entered successively, the operations of the flow chart illustrated in FIG. 10 will be described. The results obtained from the operations are shown in FIG. 12. For simplifying the description, it is assumed in FIG. 12 that all of the probability estimators 25, 26, and 28 provided in the first encoder 5, the second encoder 6, and the third encoder 8, respectively had determined the code order to be four ($2^n=4$).

In the initial state when power has been supplied to the apparatus, the mode A is set as the initial encoding mode for the apparatus at S11. Then, at S12, the picture element $X_1$ is entered. At S14, the picture element $X_1$ is determined to be encoded in the mode A, and at S15, the output value of the zero determinator for the picture element $X_1$ is checked. As shown in FIG. 11, the output value of the zero determinator for the picture element $X_1$ is zero. Thus, the operation proceeds to S18. At S18, the picture element $X_1$ is encoded in the mode A by the first encoder 5.

Next, at S12, the picture element $X_2$ is entered. Through S14, S15, and S18, the picture element $X_2$ is also encoded in the mode A.

Next, at S12, the picture element $X_3$ is entered. Then, at S14, the picture element $X_3$ is determined to be encoded in the mode A, and the operation proceeds to S15. At S15, since the output value of the zero determinator is 1, the operation proceeds to S17. At S17, the picture element $X_3$ is encoded in the mode A. Since the output value of the zero determinator is one, encoding in the mode A in this case is effected by the first encoder 5 and the second encoder 6. Since an LPS has occurred, the codeword supplied from the first encoder 5 for the picture elements $X_1$ and $X_2$ is determined. In FIG. 12, the codeword supplied from the first encoder 5 for the picture elements $X_1$ and $X_2$ is completed in a position P1. As described hereinbefore, when encoding in the mode A is determined by the occurrence of an LPS encoding by the second encoder 6 is effected for the picture element for which the output value of the zero determinator is "1". As shown in FIG. 11, the prediction error of the picture element $X_3$ is "+1". Accordingly, the error-to-symbol converter 36 in the second encoder 6 outputs binary "01" symbols according to the table shown in FIG. 8. The second encoder 6 encodes the binary symbols according to the encoding method shown in FIG. 67. All the binary symbols shown in FIG. 8 end with an LPS. For this reason, when using the encoding method shown in FIG. 67 and when encoding of individual prediction errors shown in FIG. 8 is finished by the second encoder 6, the codewords corresponding to the individual prediction errors are always determined. As shown in FIG. 12, in the case of the picture element $X_3$, the codeword supplied from the second encoder 6 for the picture element $X_3$ is determined in a position P2.

Next, at S17, the mode B is set. Then, at S12, the picture element $X_4$ is entered. At S14, the picture element $X_4$ is determined to be encoded in the mode B. Then, at S16, the state of the reference picture elements for the picture element $X_4$ is checked. As shown in FIG. 11, since the values of the reference picture elements for the picture element $X_4$ do not satisfy the condition "a=b=c", the operation proceeds to S19. Then, at S19, the picture element $X_4$ is encoded in the mode B. Since the prediction error of the picture element $X_4$ is "+1", binary symbols "001" are output as shown in FIG. 9. All the binary symbol sequences shown in FIG. 9 also end with an LPS. For this reason, as long as the encoding method shown in FIG. 67 is used, codewords supplied from the third encoder 8 are determined at the end of the encoding operation for individual prediction errors. As shown in FIG. 12, the codeword for the picture element $X_4$ is determined in a position P3.

After the codeword for the picture element $X_4$ has been determined at S19, the picture element $X_5$ is entered at S12. The picture element $X_5$ is determined to be encoded in the mode B at S14, and the state of the reference picture elements for the picture element $X_5$ is checked at S16. Since the reference picture elements a, b, and c for the picture element $X_5$ satisfy the condition "a=b=c", the mode A is set (at S98). Then, the operation proceeds to S15. As the output value of the zero determinator for the picture element $X_5$ is zero, the operation proceeds to S18. At S18, the picture element $X_5$ is encoded in the mode A. At this point, the codeword supplied from the first encoder 5 for the picture element $X_5$ has not been determined yet.

Next, the picture element $X_6$ is entered at S12. At S14, the picture element $X_6$ is determined to be encoded in the mode A. At S15, the output value of the zero determinator for the picture element $X_6$ is determined to be "1". Accordingly, the picture element $X_6$ is encoded in the mode A at S17. Since an LPS has occurred in the case of the picture element $X_6$, the codeword supplied from the first encoder 5 for the picture element $X_5$ is determined in a position P4, as shown in FIG. 12. Since the first encoder 5 determines the codeword for the picture element $X_5$ due to an LPS occurred, the second encoder 6 encodes the prediction error for the picture element $X_6$. As shown in FIG. 11, the prediction error for the picture element $X_6$ is "−2". Accordingly, as shown in FIG. 8, the binary "001" symbols for the prediction error of "−2" are to be encoded. Since an LPS has occurred in a position P5, the codeword supplied from the second encoder 6 for the picture element $X_6$ is determined in the position P5.

Determined codewords shown in FIG. 12 indicate the case where the probability estimators 25, 26, and 28 in the first encoder 5, the second encoder 6, and the third encoder 8, respectively determine the code order to be four ($2^n=4$) as shown in FIG. 67. For simplifying the description, it is assumed herein that all the first encoder 5, the second encoder 6, and the third encoder 8 implement encoding with the code order four. However, as described hereinbefore, the first encoder 5, the second encoder 6, and the third encoder 8 respectively determine their own code orders and operates independently.

As described above, in this embodiment, a picture element is entered, and the code for the entered picture element is output. The output code is temporarily stored in a memory (not shown) in the code buffer 10. Then, the output code is transmitted from the code buffer 10 directly or indirectly via radio or a communications line in analog or digital format. Alternatively, the output code is stored in a storing medium (such as a magnetic or optical recording card, a tape, a disc, a RAM, or a ROM).

In this first embodiment, when the encoding mode is switched from the mode A to the mode B, an LPS is always output. That is, in this first embodiment, when the encoding mode is switched from the mode A to the mode B, a codeword is always determined by the first encoder 5 or the second encoder 6. When the encoding mode is switched from the mode B to the mode A, an LPS is also always output. For this reason, in this first embodiment, when the encoding mode is switched from the mode B to the mode A, a codeword is always determined by the third encoder 8.

As described above, when MPSs consecutively occur, this encoding apparatus provides a considerably enhanced encoding efficiency. By switching the encoding mode into the mode B when an LPS has occurred in the mode A, and by switching the encoding mode from the mode B to the mode A when the values of reference picture elements a, b, and c have satisfied a predetermined condition "a=b=c" in the mode B, switching of encoding between the first encoding section and the second encoding section is actively implemented.

In this way, switching of encoding in the first encoding section and the second encoding section is implemented appropriately and consistently. Thus, efficient encoding and decoding can be implemented. Switching of encoding is effected by the encoding controller 11 which controls respective devices within the encoding apparatus, using the mode discrimination signal CM and the control signals C1 through C6.

Figure 13:
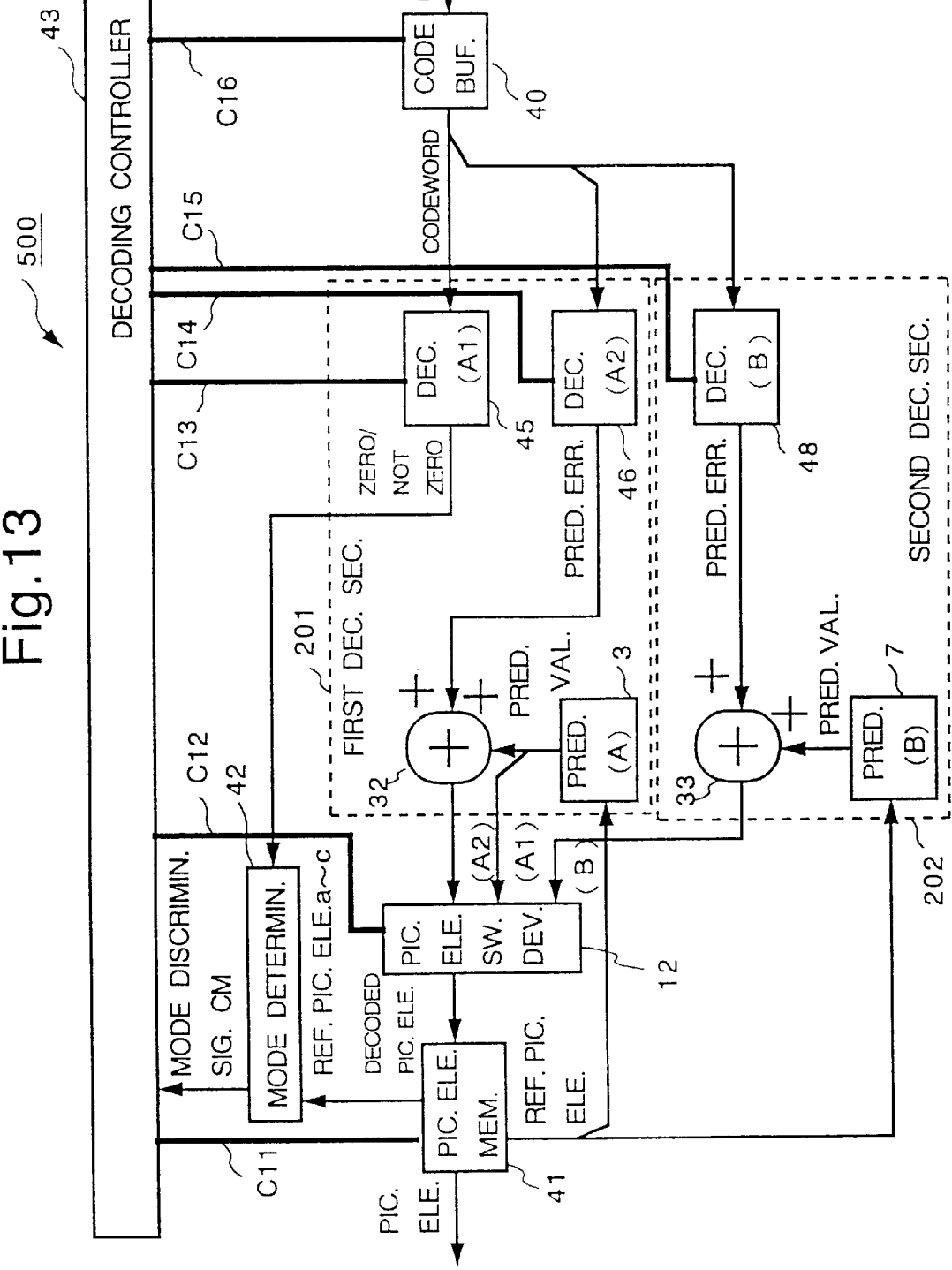
FIG. 13 is a block diagram showing a configuration of a decoding apparatus according to the first embodiment.

FIG. 13 is a block diagram showing a configuration of a decoding apparatus 500 according to the first embodiment of the present invention.

First, the configured elements of the decoding apparatus 500 according to the first embodiment will be described.

Reference numeral 41 indicates a picture element memory for outputting at least one stored and decoded picture element adjacent to a decoding picture element as reference picture element before decoding the decoding picture element. The picture element memory 41 also stores decoded picture elements.

Reference numeral 42 indicates a mode determinator, like the mode determinator 2 in the encoding apparatus described hereinbefore, for determining the decoding mode to be either the mode A or the mode B, based on the value of the at least one reference picture element. Then, the mode determinator 42 outputs the mode discrimination signal CM.

Reference numeral 45 indicates a first decoder for decoding a codeword in the mode A into a binary symbol indicating whether or not a prediction error is zero. (When the zero determinator determines whether a prediction error is one or not one, for example, the first decoder decodes a codeword in the mode A into a binary symbol indicating whether or not a prediction error is one. Similarly, when the determinator determines whether a prediction error is −3 or not −3, the first decoder decodes a codeword in the mode A into a binary symbol indicating whether or not a prediction error is −3.)

Reference numeral 46 indicates a second decoder for decoding a codeword in the mode A into a prediction error when the prediction error is not zero.

Reference numeral 48 indicates a third decoder for decoding in the mode B a codeword into a prediction error between the value of a decoding picture element and the prediction value calculated by the predictor 7 for the decoding picture element.

Reference numeral 40 indicates a code buffer for dividing an input code into codewords and outputting the codewords.

Reference numeral 43 indicates a decoding controller for controlling the picture element memory 41, the first decoder 45, the second decoder 46, and the third decoder 48, a picture element switching device 12 (which will be described hereinafter), and the code buffer 40 based on the mode discrimination signal CM and the control signals C11 through C16.

Reference numeral 12 indicates the picture element switching device for selecting an appropriate decoded picture element among decoded picture elements output from decoding picture element calculators 32 and 33, and the predictor 3, and outputting the value of the appropriate decoded picture element.

Reference numerals 32 and 33 indicate the first decoding picture element calculator and the second decoding picture element calculator, respectively for calculating the value of a decoding picture element from the prediction value for the decoding picture element and the decoded prediction error.

The predictor 3 and the predictor 7 are the same as those in the picture encoding apparatus described hereinbefore.

Reference numeral 201 indicates a first decoding section provided with the first decoder 45 for decoding a codeword into a binary symbol indicating whether or not a prediction error between the value of a decoding picture element and the estimated prediction value is zero, and the second decoder 46 for decoding a codeword into a prediction error when the prediction error is not zero.

Reference numeral 202 indicates a second decoding section provided with the third decoder 48 for decoding a codeword into a prediction error regardless of whether the prediction error between the value of a decoding picture element and the estimated prediction value is zero or not.

Figure 14:
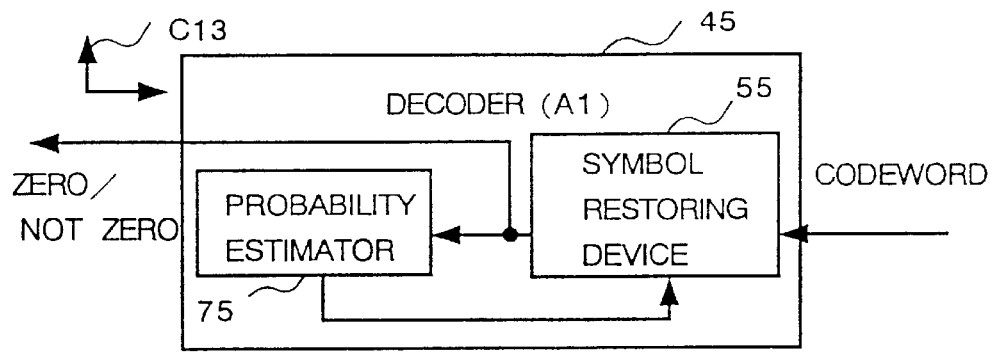
FIG. 14 is a block diagram showing a configuration of a first decoder according to the present invention.
Figure 15:
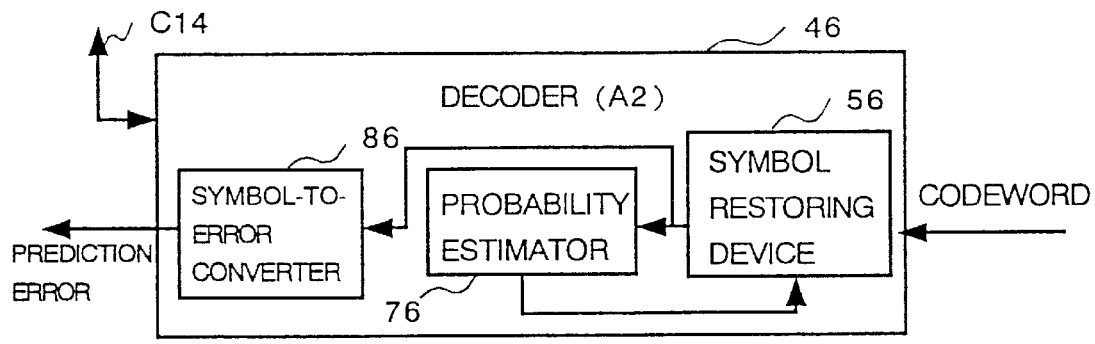
FIG. 15 is a block diagram showing a configuration of a second decoder according to the present invention.
Figure 16:
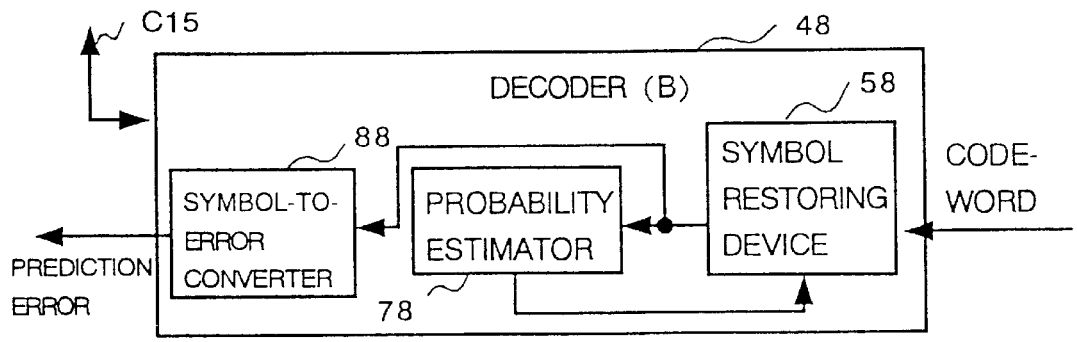
FIG. 16 is a block diagram showing a configuration of a third decoder according to the present invention.

FIGS. 14, 15, and 16 are block diagrams respectively showing an internal configuration of the first decoder 45, the second decoder 46, and the third decoder 48.

The first decoder 45, the second decoder 46, and the third decoder 48 have a first symbol restoring device 55, a second symbol restoring device 56, and a third symbol restoring device 58, respectively. Furthermore, the first decoder 45, the second decoder 46, and the third decoder 48 have a first probability estimator 75, a second probability estimator 76, and a third probability estimator 78, respectively. The second decoder 46 and the third decoder 48 have a first symbol-to-error converter 86 and a second symbol-to-error converter 88 respectively for converting a binary symbol sequence to a prediction error.

Next, a decoding operation of the decoding apparatus according to this embodiment will be described.

The first decoder 45, the second decoder 46, and the third decoder 48 receive codewords into which the code buffer 40 has divided a code and which have been supplied from the code buffer 40. When the first decoder 45, the second decoder 46, or the third decoder 48 implements decoding with the code order $2^n$, the first decoder 45, the second decoder 46, or the third decoder 48 determine the codeword length based on the value of the starting bit of a codeword in the following way:

When the value of the starting bit of a codeword is zero, the codeword length is determined to be 1. Consequently, as seen from FIG. 67, a message comprised solely of binary symbols "0" having the codeword length $2^n$ is restored. When the value of the starting bit of a codeword is 1, the codeword length is determined to be (n+1) bits. Consequently, the first decoder 45, the second decoder 46, or the third decoder 48 regards the value of the binary symbols for the remaining n-bit codeword except the starting bit 1 of the codeword as k or the number of binary symbols "0" consecutively occurred. Then, a message "0 . . . 01" having the codeword length of (k+1) bits is restored.

When decoding in the mode A, the first decoder 45 receives a codeword, converts the codeword into a binary symbol sequence, and outputs the binary symbol sequence (which is equivalent to a message). Each output of the first decoder 45 is for a picture element which is to be decoded in the mode A. When the output value of the first decoder 45 is "0", it indicates that a prediction error for a decoding picture element is zero. On the other hand, when the output value of the first decoder 45 is "1", it indicates that a prediction error is not zero. When a prediction error is zero, the prediction value will become the value of a decoding picture element. When a prediction error is not zero, the prediction error is subsequently decoded by the second decoder 46.

When decoding a prediction error, the second decoder 46 and the third decoder 48 respectively receive codewords and convert the codewords into at least one message. Then, the second decoder 46 or the third decoder 48 combine the at least one message into binary symbol sequences. The second decoder 46 implements decoding in the mode A for a picture element for which the prediction error is not zero. The second decoder 46 inversely converts a binary symbol sequence, which is as shown in FIG. 8 (which indicates the case that a prediction error of zero does not exist), into a prediction error and outputs the prediction error. The third decoder 48 implements decoding for a picture element which has been encoded in the mode B. The third decoder 48 inversely converts a binary symbol sequence, which is as shown in FIG. 9 (which indicates the case that a prediction error of zero exists), into a prediction error and outputs the prediction error. The value of a decoding picture element which is to be decoded in the mode A is obtained by adding the output of the predictor 3 (the prediction value) to the output of the second decoder 46 (the prediction error). The value of a decoding picture element which is to be decoded in the mode B is obtained by adding the output of the predictor 7 (the prediction value) to the output of the third decoder 48 (the prediction error).

Mode switching in a decoding process can be implemented by the mode determinator 42, by using the same determination method as with the mode determinator 2 shown in FIG. 4, based on the condition of reference picture element(s) output from the picture element memory 41 and the output value of the first decoder 45.

While the decoding process is being implemented, the decoding controller 43 directs the picture element memory 41 to output at least one reference picture element, and also operates the first decoder 45, the second decoder 46, and the third decoder 48 selectively according to the mode discrimination signal CM output from the mode determinator 42. During this process, the first decoder 45, the second decoder 46, and the third decoder 48 notify the decoding controller that a codeword has been input. By being directly notified of the individual codeword lengths or by being indirectly notified of the individual codeword lengths via the decoding controller 43, the code buffer 40 divides a code into codewords. The decoding controller 43 determines the appropriate decoder for implementing decoding among the first decoder 45, the second decoder 46, and the third decoder 48 and directs the picture element switching device 12 to supply decoded picture elements to the picture element memory 41 for storing them.

Embodiment 2.

Figure 17:
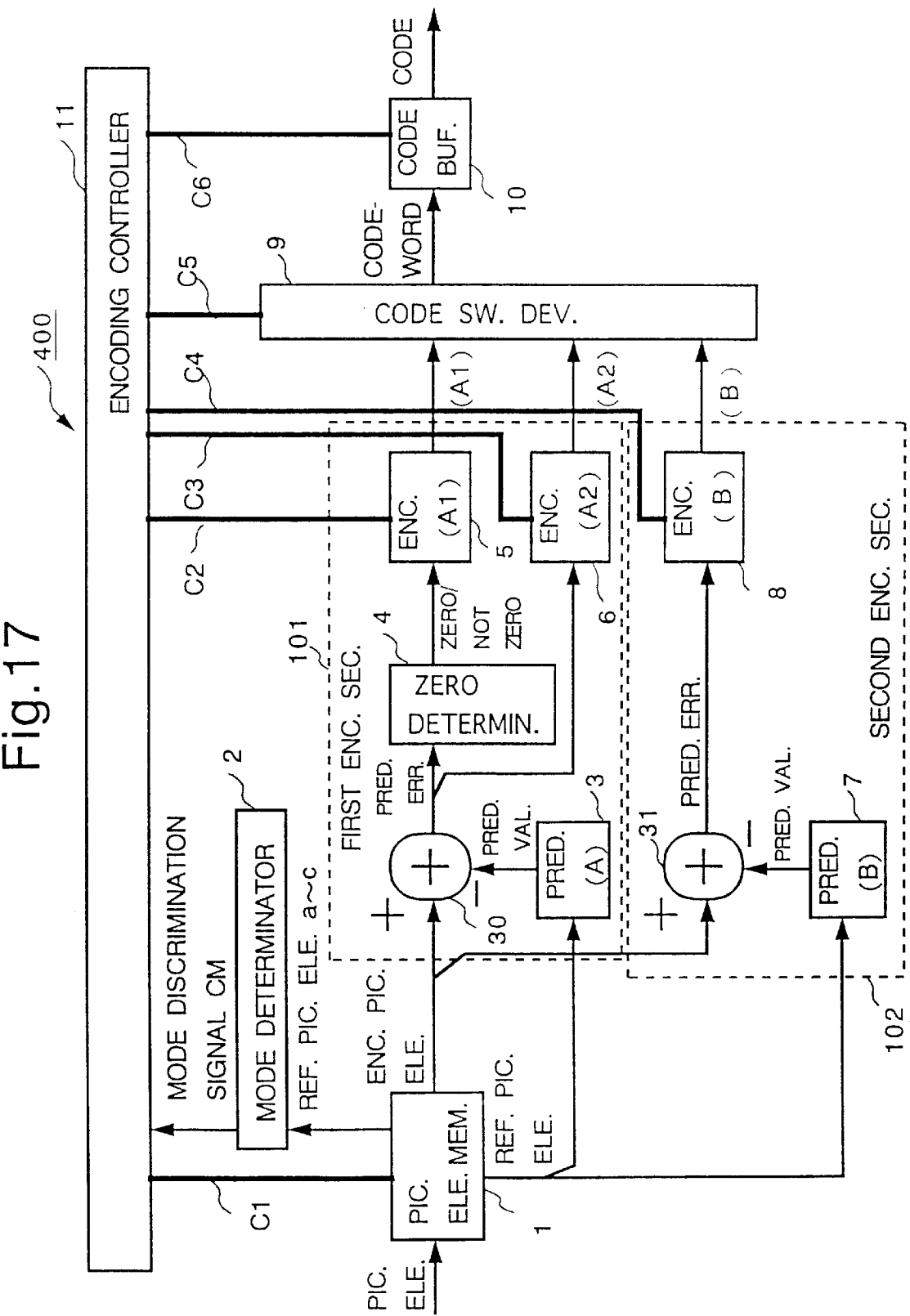
FIG. 17 is a block diagram showing a configuration of an encoding apparatus according to the second embodiment of the present invention.

FIG. 17 is a block diagram showing a configuration of an encoding apparatus 400 according to the second embodiment of the present invention. FIG. 17 is different from FIG. 4 described in the first embodiment, in that the output of the zero determinator 4 is not supplied to the mode determinator 2.

An operation of the encoding apparatus 400 according to this embodiment will be described.

Figure 18:
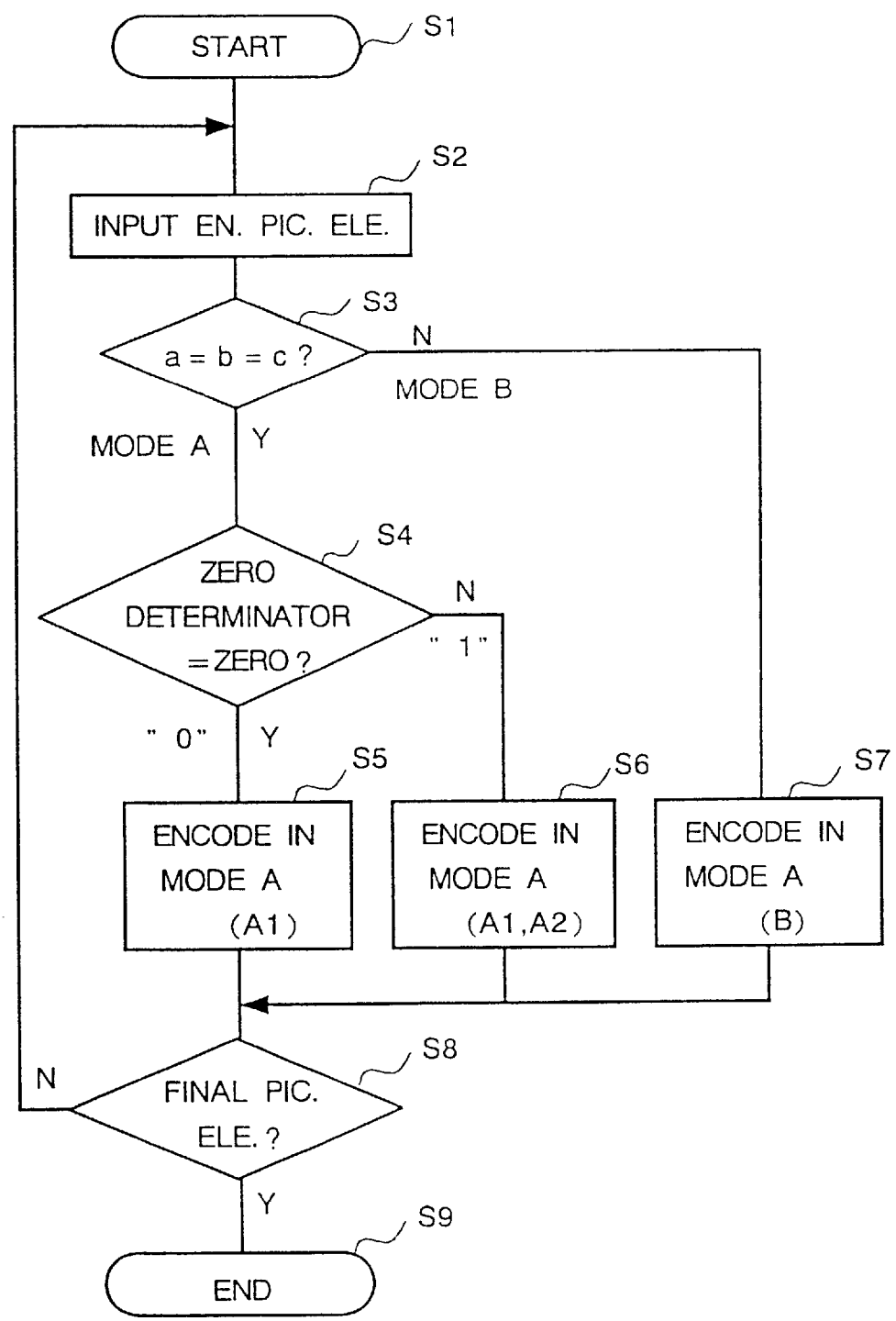
FIG. 18 is a flow chart showing a flow of an encoding process according to the present invention.

In this embodiment, as shown in FIG. 18, when the values of reference picture elements a, b, and c adjacent to an picture element X satisfy the condition "a=b=c", the picture element X is encoded in the mode A (at S4 through S6). When the values of reference picture elements a, b, and c do not satisfy the condition, the picture element X is encoded in the mode B (at S7). The mode determinator 2 implements this mode switching operation just by determining whether or not the values of reference picture elements a, b, and c from the picture element memory 1 satisfy the condition "a=b=c". There is not a case that the output value of the zero determinator 4 is referred to as in the first embodiment. Since encoding operations in the mode A and the mode B are same as those in the first embodiment, the description about the encoding operations will be omitted.

In the first embodiment, when the encoding mode is switched from the mode A to the mode B, a codeword is always determined by the first encoder 5. In the second embodiment, since the condition for determining the encoding mode is different from that in the first embodiment, a codeword is not always determined by the first encoder 5.

Figure 19:
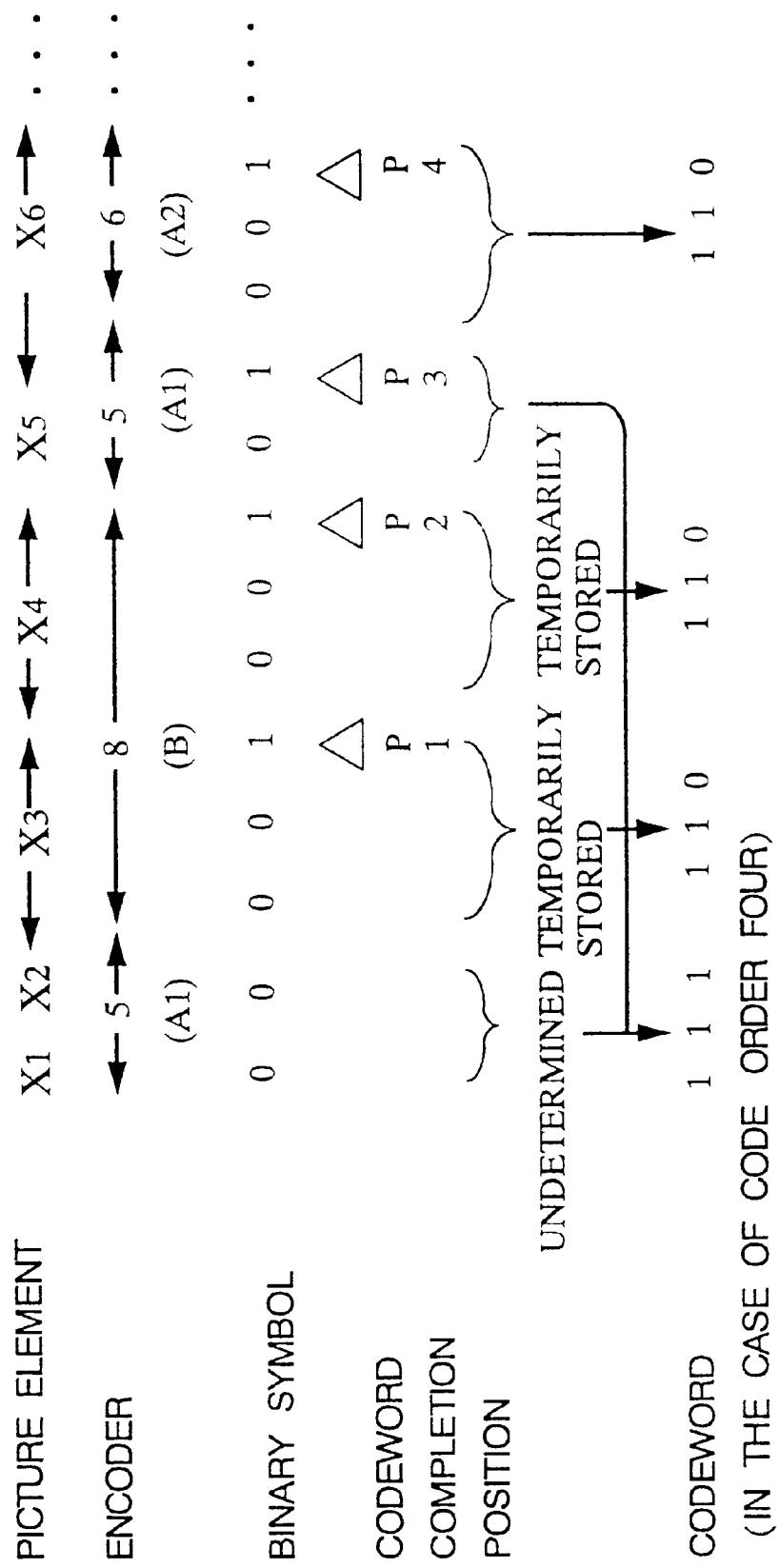
FIG. 19 is a diagram showing an encoding operation according to the present invention.

FIG. 19 shows an example of binary symbols into which picture elements $X_1$ through $X_6$ are encoded according to the second embodiment of the present invention. The example shown in FIG. 19 shows the encoding state where the encoding picture elements shown in FIG. 11 are input into the encoding apparatus according to this embodiment. For simplifying the description, it is assumed herein that a codeword is supplied from the first encoder 5, the second encoder 6, and the third encoder 8 for implementing encoding with the code order four.

Referring to the example shown in FIG. 19, at the time of termination of the encoding for the picture element $X_2$ in the mode A, binary symbols output consecutively have not ended with 1. The count of the MPS counter has not reached the code order four, either. For this reason, a codeword for the picture element $X_2$ is not determined by the first encoder 5. Thus, before the codeword for the picture element $X_2$ is determined by the first encoder 5, codewords for the picture elements $X_3$ and $X_4$ are determined by the third encoder 8. In this case, the decoding apparatus 500 cannot implement accurate decoding unless a codeword generated by the first encoder 5 is input into the decoding apparatus before a codeword generated by the third encoder 8 is input into the decoding apparatus. For this reason, an operation for changing the transmission order of codewords which will be described hereinafter, that is, control over the transmission order of codewords is required in the encoding apparatus 400. Alternatively, a picture-element preread operation in the mode A, which will be described hereinafter, is required in the encoding apparatus 400.

First, an operation for controlling the transmission order of codewords according to the second embodiment of the present invention will be described with reference to FIG. 20 and FIG. 21.

Figure 20:
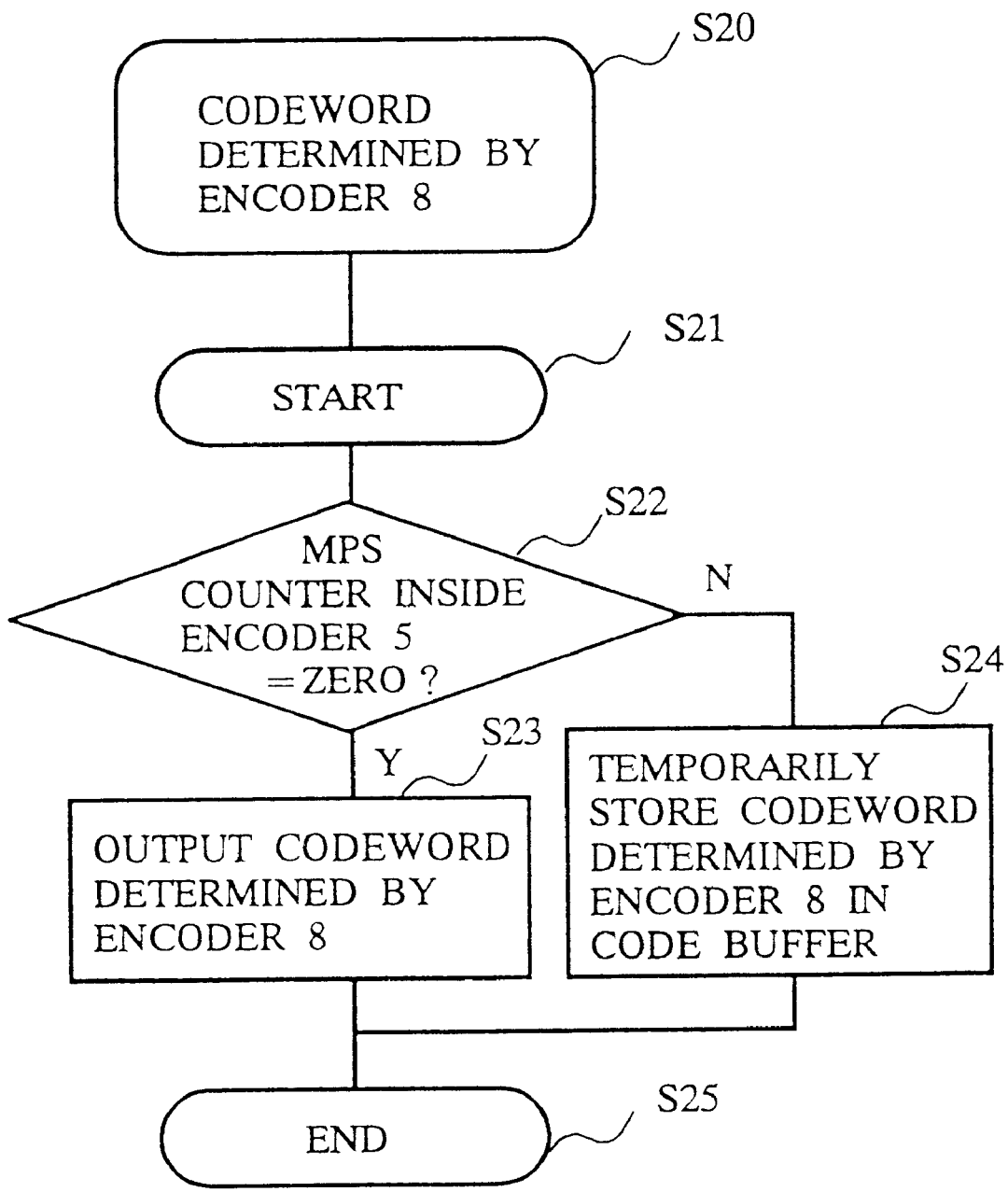
FIG. 20 is a flow chart showing a flow of the control process implemented by the encoding controller after a codeword has been determined by the third encoder.

FIG. 20 is a flow chart showing a flow of the control process implemented by the encoding controller 11 after a codeword has been determined by the third encoder 8 (at S20).

Figure 21:
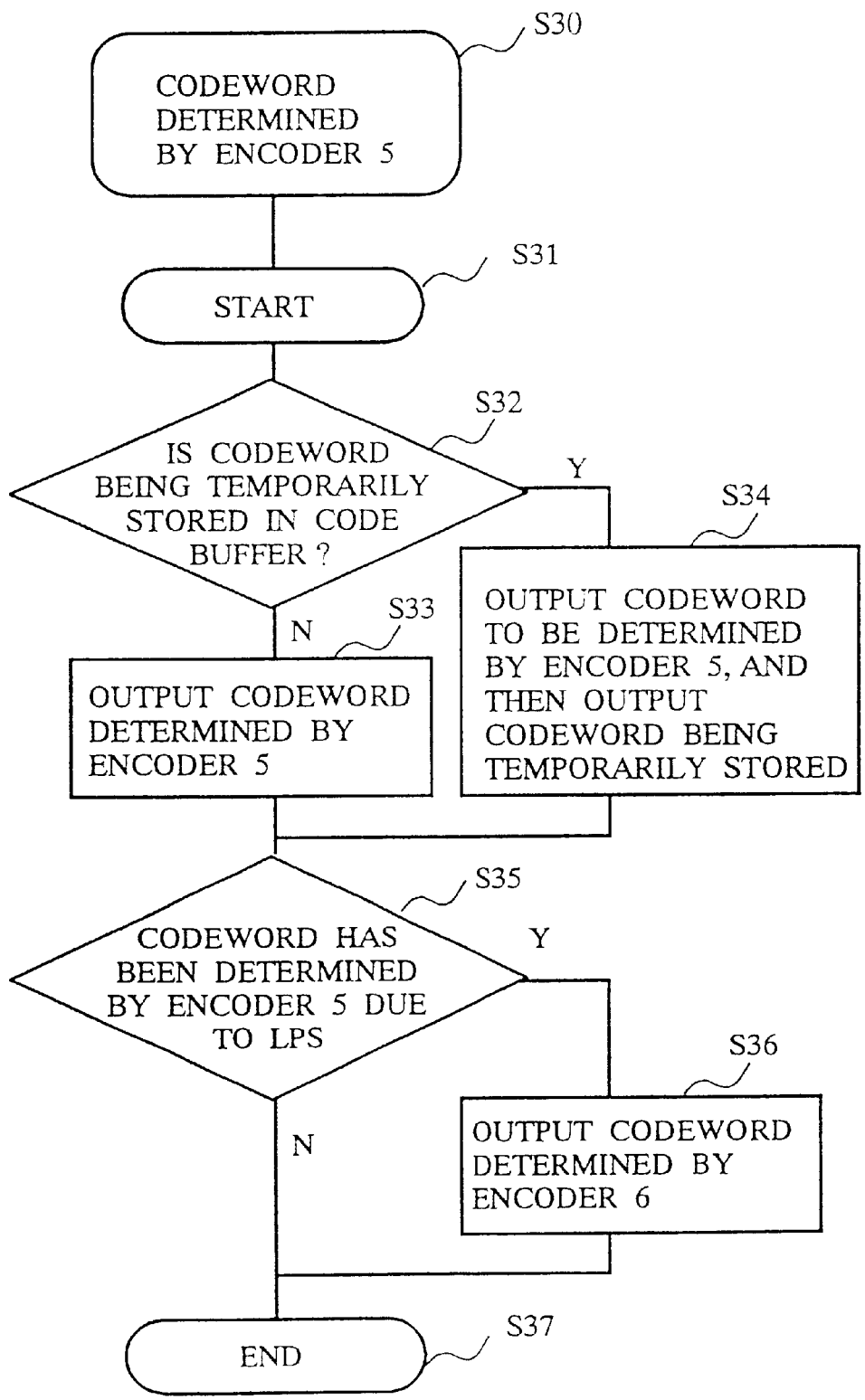
FIG. 21 is a flow chart showing a flow of the control process implemented by the encoding controller after a codeword has been determined by the first encoder.

FIG. 21 is a flow chart showing a flow of the control process implemented by the encoding controller 11 after a codeword has been determined by the first encoder 5 (at S30).

In this embodiment, control over the transmission order of codewords is required when a codeword has been generated by the third encoder 8 before a codeword is determined by the first encoder 5, as shown in FIG. 19 (in other words, when the count of the MPS counter inside the first encoder 5 is equal to or greater than one at S22 in FIG. 20), a codeword is determined by the third encoder 8. In this case, the codeword generated by the third encoder 8 is temporarily stored in the code buffer 10 (at S24 in FIG. 20). In the following two cases, a codeword is determined by the first encoder 5:

(1) When the number of MPSs consecutively occurred has become equal to the code order (2) When an LPS has occurred.

As shown in FIG. 21, both in the cases (1) and (2), transmission of a codeword determined by the first encoder 5 and transmission of a codeword determined by the third encoder 8 and temporarily stored in the code buffer 10 are implemented in the inverse order. Thus, after the codeword determined by the first encoder 5 has been transmitted, the codeword temporarily stored in the code buffer 10 is transmitted by a direction of the encoding controller 11 (at S34). As shown at S35 and S36 in FIG. 21, in the case (2), after a codeword determined by the first encoder 5 and a codeword temporarily stored in the code buffer 10 have been transmitted (at S34), a codeword determined by the second encoder 6 is further transmitted (at S36). Referring to the example shown in FIG. 19, codewords are determined by the third encoder 8 in positions P1 and P2. While on the other hand, a codeword which is to be output from the first encoder 5 is determined in a position P3. Consequently, the codewords determined by the third encoder 8 in the positions P1 and P2 are temporarily stored in the code buffer 10. When a codeword to be output from the first encoder 5 has been determined in the position P3, the codeword determined in the position P3 is output first. Then, the codewords temporarily stored in the code buffer 10 and determined in the positions P1 and P2 are output subsequently. Finally, a codeword determined by the second encoder 6 in a position P4 is output.

Figure 22:
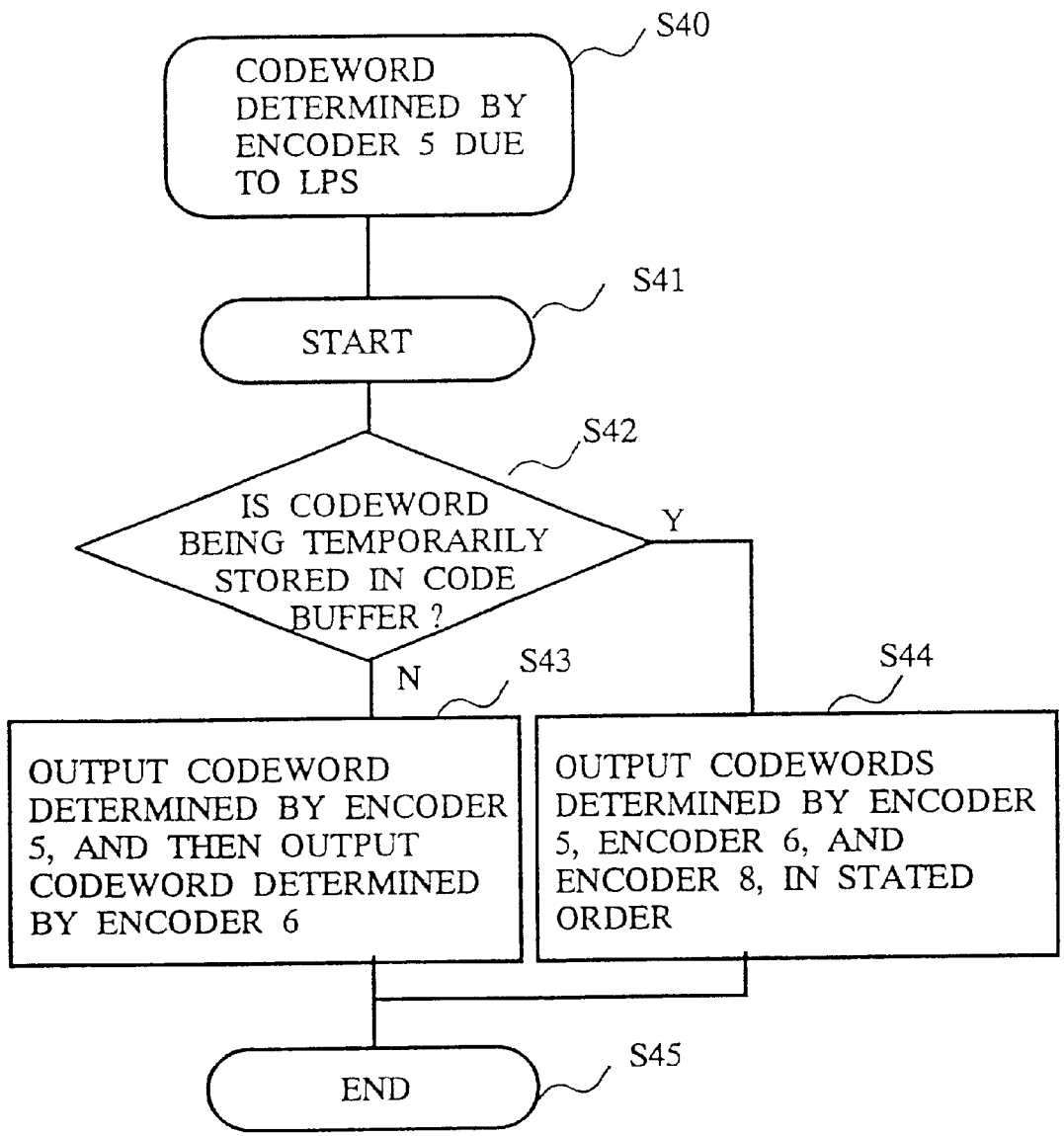
FIG. 22 is a flow chart showing a flow of the control process implemented by the encoding controller after a codeword has been determined by the first encoder because of the occurrence of an LPS in a binary symbol sequence.

In the case (2), as is shown at S44 in FIG. 22, a codeword determined by the first encoder 5, a codeword determined by the second encoder 6, and a codeword determined by the third encoder 8 and temporarily stored in the code buffer 10 can be transmitted in stated order. According to a flow chart illustrated in FIG. 22, the output order of codewords shown in FIG. 19 is such that a codeword determined by the first encoder 5 in the position P3 is output first. Then, a codeword determined by the second encoder 6 in the position P4 is output. Then, a codeword determined by the third encoder 8 in the position P1 is output. Finally, a codeword determined by the third encoder 8 in the position P2 is output.

When controlling the transmission order of codewords, a maximum capacity MAX of the code buffer 10 needs to be determined both by the transmitting side and the receiving side.

Figure 23:
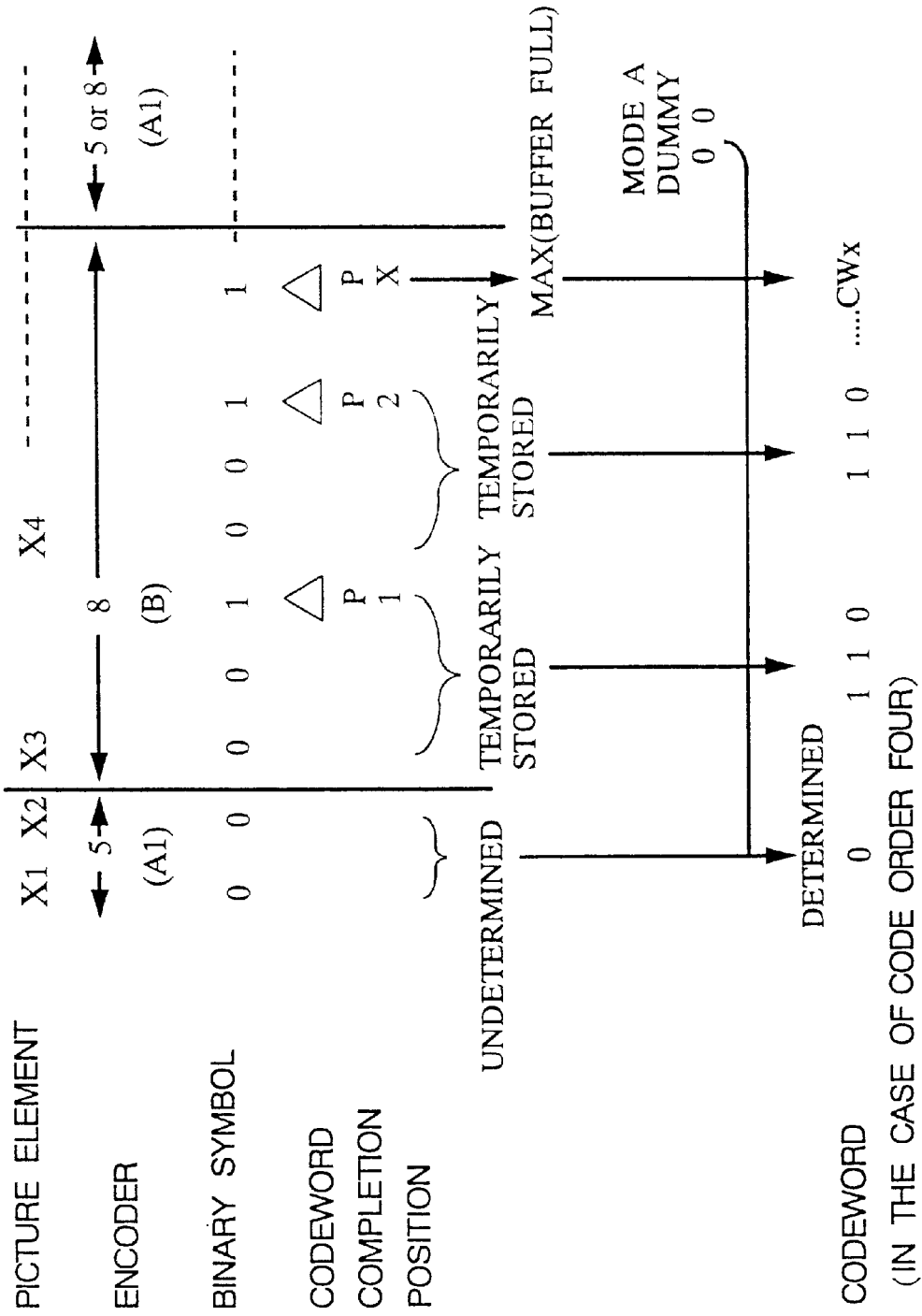
FIG. 23 is a diagram showing an encoding operation according to the present invention.

FIG. 23 shows an operation for defining the maximum capacity MAX of the code buffer 10.

When the picture elements $X_0$ through $X_2$ have been encoded in the mode A, codewords corresponding to the picture elements $X_1$ through $X_2$ have not been determined, and the encoding mode has been switched into the mode B, and when codewords have been determined in the mode B and in the position P1, the position P2, and the position P3, etc. one after another and have been temporarily stored in the code buffer 10, the code buffer 10 sequentially stores the temporarily stored codewords determined by the third encoder 8. In this situation, the maximum capacity MAX of the code buffer 10 occupied by the temporarily stored codewords should be defined. When the number of temporarily stored codewords has reached the maximum capacity MAX of the code buffer 10, the temporarily stored codewords should be output so as to increase the vacant area of the code buffer 10. As shown in FIG. 23, when the number of temporarily stored codewords has reached the maximum capacity MAX of the code buffer 10 in the position PX, dummy binary symbols "0" whose number is equal to the number required for determining a codeword in the mode A should be added to binary symbols for which a codeword has not been determined. Since FIG. 23 shows a case where the code order is four, two dummy binary symbols "0" are added. Then, the codeword to be output from the first encoder 5 is determined. Dummy binary symbols "0" are added to binary symbols for which a codeword has not been determined by the required number until the codeword is determined by the first encoder 5.

By determining a codeword to be output from the first encoder 5 by force in this way, codewords determined by the third encoder 8 and temporarily stored in the code buffer 10 are output. Consequently, a vacant area for the code buffer 10 can be regained. By implementing the process described above, an overflow of the code buffer 10 by the temporarily stored codewords determined by the third encoder 8 can be prevented.

Even if dummy binary symbols "0" are added to binary symbols for which a codeword has not been determined in the above-mentioned way, an accurate decoding operation can be effected by setting the maximum capacity MAX of the code buffer in the decoding apparatus 500 to be identical to that in the encoding apparatus 400 and by implementing a process of adding dummy binary symbols "0".

FIG. 23 shows a case where dummy binary symbols "0" are added to binary symbols for which a codeword has not been determined so as to determine a codeword to be output from the first encoder 5. Alternatively, a codeword to be output from the first encoder 5 may be determined by adding only a dummy binary symbol "1" to the binary symbols. In this case, however, a codeword for a prediction error should not be generated from the second encoder 6 when a dummy binary symbol "1" has been added.

Next, a picture element preread operation in the encoding mode A will be described with reference to FIG. 24.

The term "picture element preread operation in the encoding mode A" used herein is employed to mean an operation for reading the values of picture elements to be encoded subsequently one by one beforehand until a codeword to be output from the first encoder 5 is determined.

Figure 24:
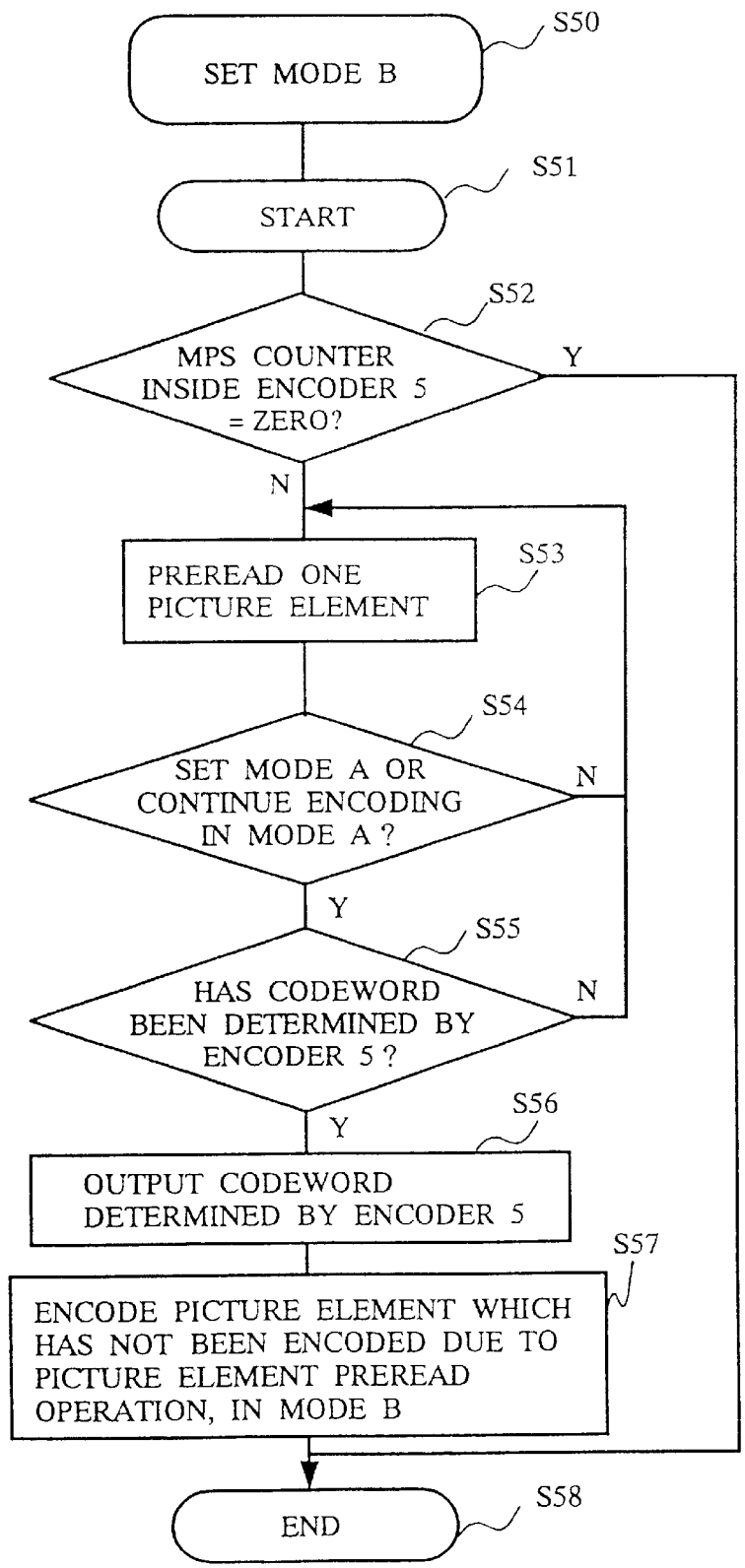
FIG. 24 is a flow chart showing a flow of a picture-element prefetch operation according to the present invention.

FIG. 24 is a flow chart showing a flow of the control process initiated by the encoding controller 11 after the mode B has been set (at S50).

According to the picture element preread operation in the encoding mode A, after the mode B has been set at S50 as shown in FIG. 24, whether or not the count of the MPS counter inside the first encoder 5 is zero is checked at S52. When the count of the MPS counter is zero, it means that a codeword to be output from the first encoder 5 has already been determined. Thus, the picture element preread operation is not required. When the count of the MPS counter inside the first encoder 5 is not zero, it means that a codeword to be output from the first encoder 5 has not been determined. For this reason, the picture element preread operation shown at S53 through S56 will be implemented. That is, until a codeword to be output from the first encoder 5 is determined (at S55), the values of picture elements to be encoded subsequently are preread (at S53) one by one and the picture element preread operation (at S53 through S56) is repeated over and over again. Then, after a codeword for the picture element to be output from the first encoder 5 has been determined, encoding in the mode B is implemented (at S57) for the picture elements which have not been encoded due to the picture element preread operation.

Referring again to FIG. 19, in order to implement the picture element preread operation, the encoding mode for the picture elements following the picture element $X_2$ should not be switched from the mode A to the mode B. Instead of doing this, the values of the picture elements $X_5$ and $X_6$ are preread so as to determine codewords to be output from the fist encoder 5 (at S55). Thereafter, the picture elements $X_3$ and $X_4$ which have not been encoded yet are encoded in the mode B (at S57).

When implementing the picture element preread operation, the values of the picture elements to be encoded subsequently are to be preread. Thereafter, encoding should be implemented for the picture elements which have not been encoded yet due to the picture element preread operation. For this reason, a line memory for storing picture elements is needed, and both the transmitting side and the receiving side need to predefine the maximum capacity of the line memory. The reason for predefining the maximum capacity of the line memory is the same as that given from FIG. 23. That is, because, even if picture elements to be encoded subsequently are preread for a codeword undetermined by the first encoder 5, it occurs that a codeword may still be undetermined by the first encoder 5. Thus, the maximum capacity of the line memory for storing picture elements should be predefined. If the number of picture elements is to exceed the maximum capacity of the line memory, dummy binary symbols "0" are added to binary symbols for which a codeword has not been determined yet so as to determine the codeword to be output from the first encoder 5. As described hereinbefore, a dummy binary symbol "1" may be added to determine the codeword to be output from the first encoder 5.

Figure 25:
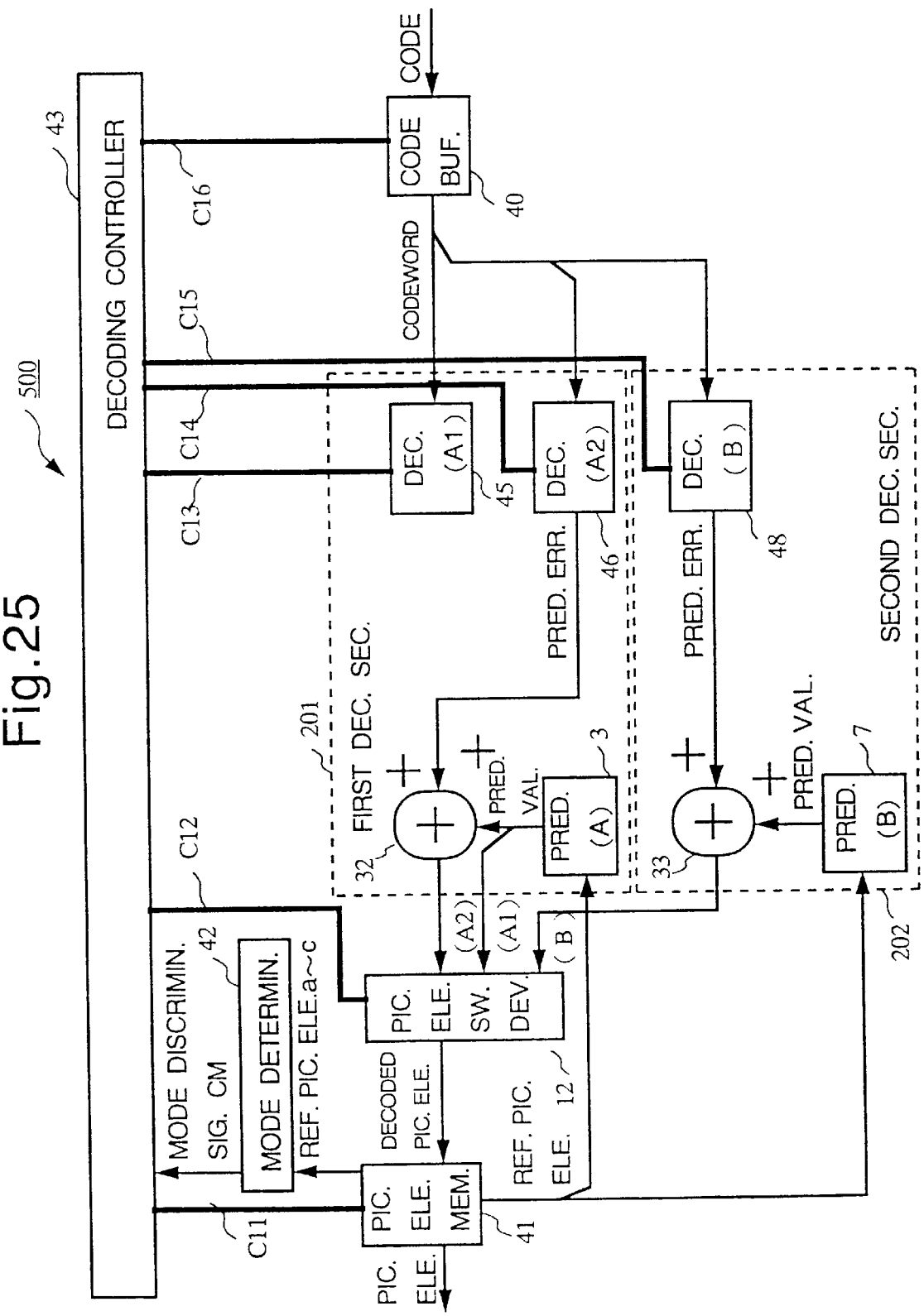
FIG. 25 is a block diagram showing a configuration of a decoding apparatus according to the second embodiment of the present invention.

Next, a configuration of a decoding apparatus 500 according to the this embodiment will be described with reference to FIG. 25. FIG. 25 is different from FIG. 13 used in the first embodiment in that the output of the first decoder 45 is not supplied to the mode determinator 42. The first decoder 45 shown in FIG. 25 implements the same decoding operation as that of the first decoder 45 shown in FIG. 13 according to the first embodiment. That is, the first decoder 45 decodes a codeword in the mode A into a binary symbol indicating whether or not a prediction error is zero. Then, the result is transmitted to the decoding controller 43 through the control signal C13. The decoding controller 43 operates the second decoder 46 based on the information from the first decoder 45 as to whether or not the prediction error is zero. Hereinafter, a description will be especially directed to an operation different from that according to the first embodiment of the present invention.

The decoding apparatus 500 according to this embodiment converts an input codeword into a binary symbol sequence (or a message). Using such messages, the values of picture elements are reproduced. In this second embodiment, as different from the first embodiment, there is a case that the decoding mode is switched from the mode A into the mode B before all of the binary symbols into which the first decoder 45 decodes one codeword in the mode A are used up. Referring again to FIG. 19, when decoding $X_1$, binary symbols "0001" associated with decoding of $X_2$, $X_5$, and $X_6$ can be obtained. However, after $X_2$ is decoded, the decoding mode is switched into the mode B. Thus, binary symbols "01" remain unused. The unused binary symbols "01" will be used after decoding in the mode B has been finished. Thus, when unused binary symbols to be decoded in the mode A remain in the first decoder 45, the decoding controller 43 directs the first decoder 45 to output the unused binary symbols. When no unused binary symbol is not present in the first decoder 45, the decoding controller 43 directs the first decoder 45 to receive a codeword, converts it into a sequence of binary symbols, and decodes the binary symbols.

In the decoding apparatus 500, as described above, except that an operation for controlling the order in which decoded binary symbols are to be used is needed, other operations are the same as those in the first embodiment. Thus, the description about them will be omitted.

As described above, according to this embodiment, the encoding mode for a picture element can be determined solely by the state to which reference picture elements belong. Consequently, a codeword may not be determined when the encoder is switched from the first encoder 5 to the third encoder 8. However, by exercising the above-mentioned control, the decoding apparatus 500 can decode codewords into picture elements consistently. When the decoder is switched from the third decoder 48 to the first decoder 45, as described in the first embodiment, a codeword is always determined as long as binary symbols shown in FIG. 9 are encoded according to the encoding method shown in FIG. 67. Thus, control over the transmission order of codewords and control over the picture element preread operation are not needed.

Embodiment 3.

Figure 26:
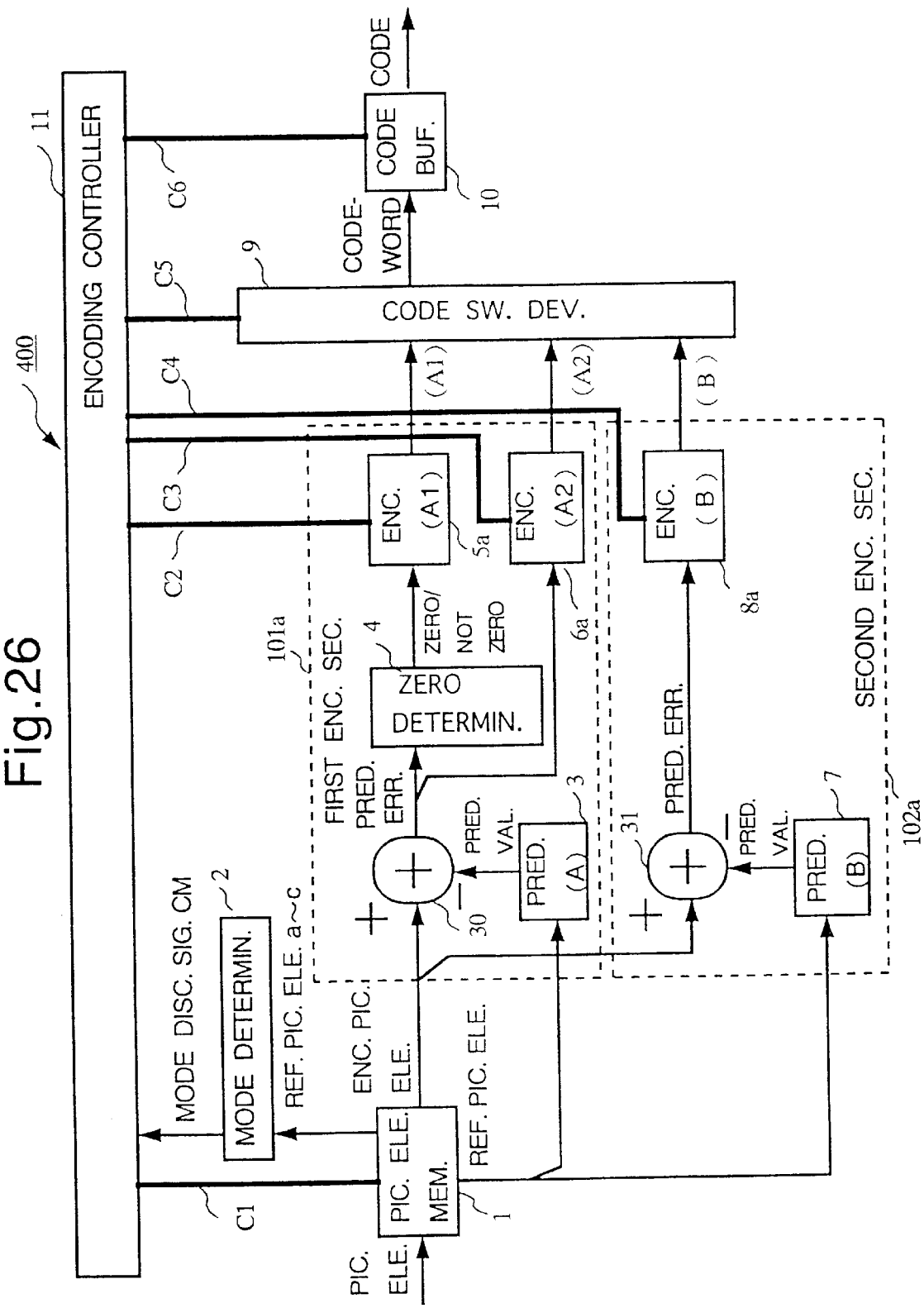
FIG. 26 is a block diagram showing a configuration of an encoding apparatus according to the third embodiment of the present invention.

FIG. 26 shows a configuration of an encoding apparatus 400 according to the third embodiment of the present invention. FIG. 26 is different from FIG. 17 described in the second embodiment in that the encoders are configured in a different way.

Figure 27:
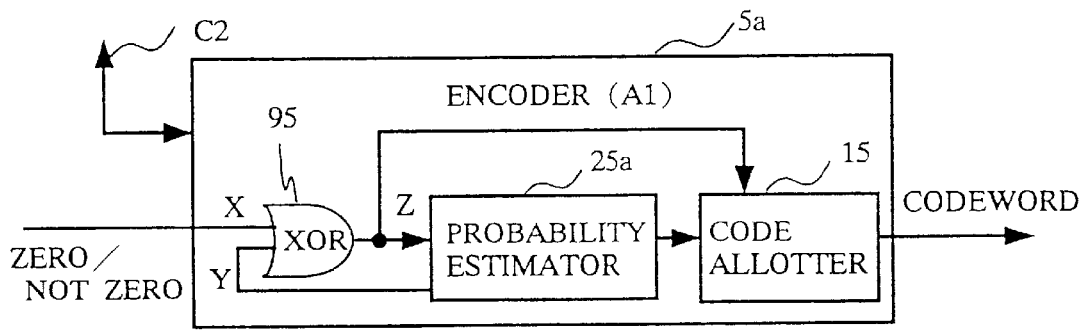
FIG. 27 is a block diagram showing a configuration of an encoder 5a according to the third embodiment of the present invention.
Figure 28:
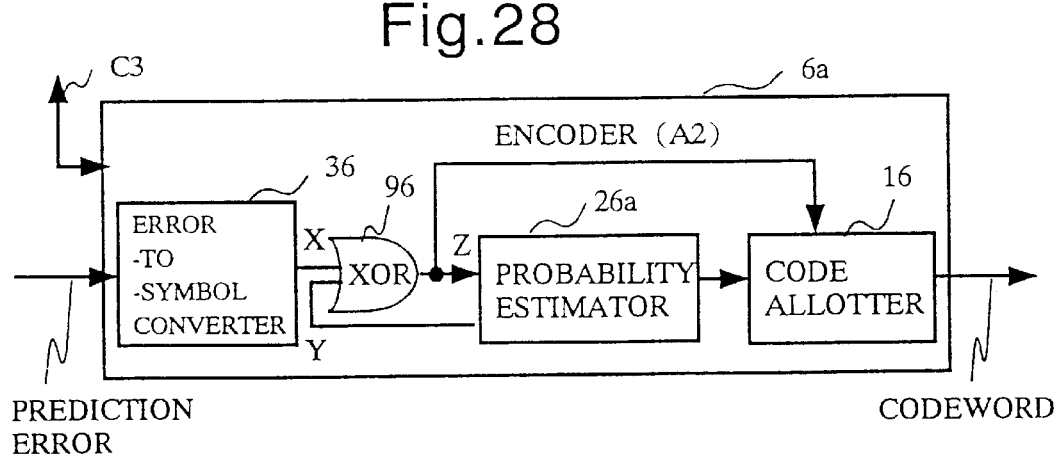
FIG. 28 is a block diagram showing a configuration of an encoder 6a according to the third embodiment of the present invention.
Figure 29:
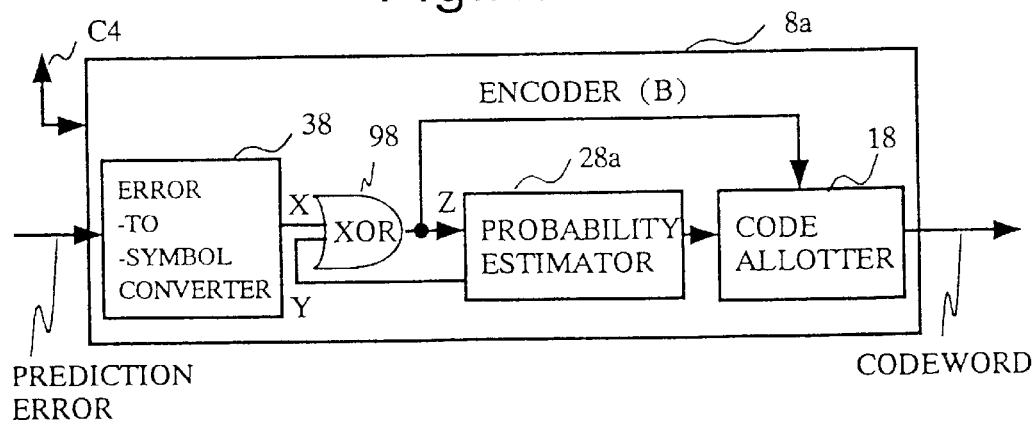
FIG. 29 is a block diagram showing a configuration of an encoder 8a according to the third embodiment of the present invention.

FIGS. 27, 28, and 29 are block diagrams showing a configuration of the first encoder 5a, the second encoder 6a, and the third encoder 8a respectively according to this embodiment.

Figure 30:
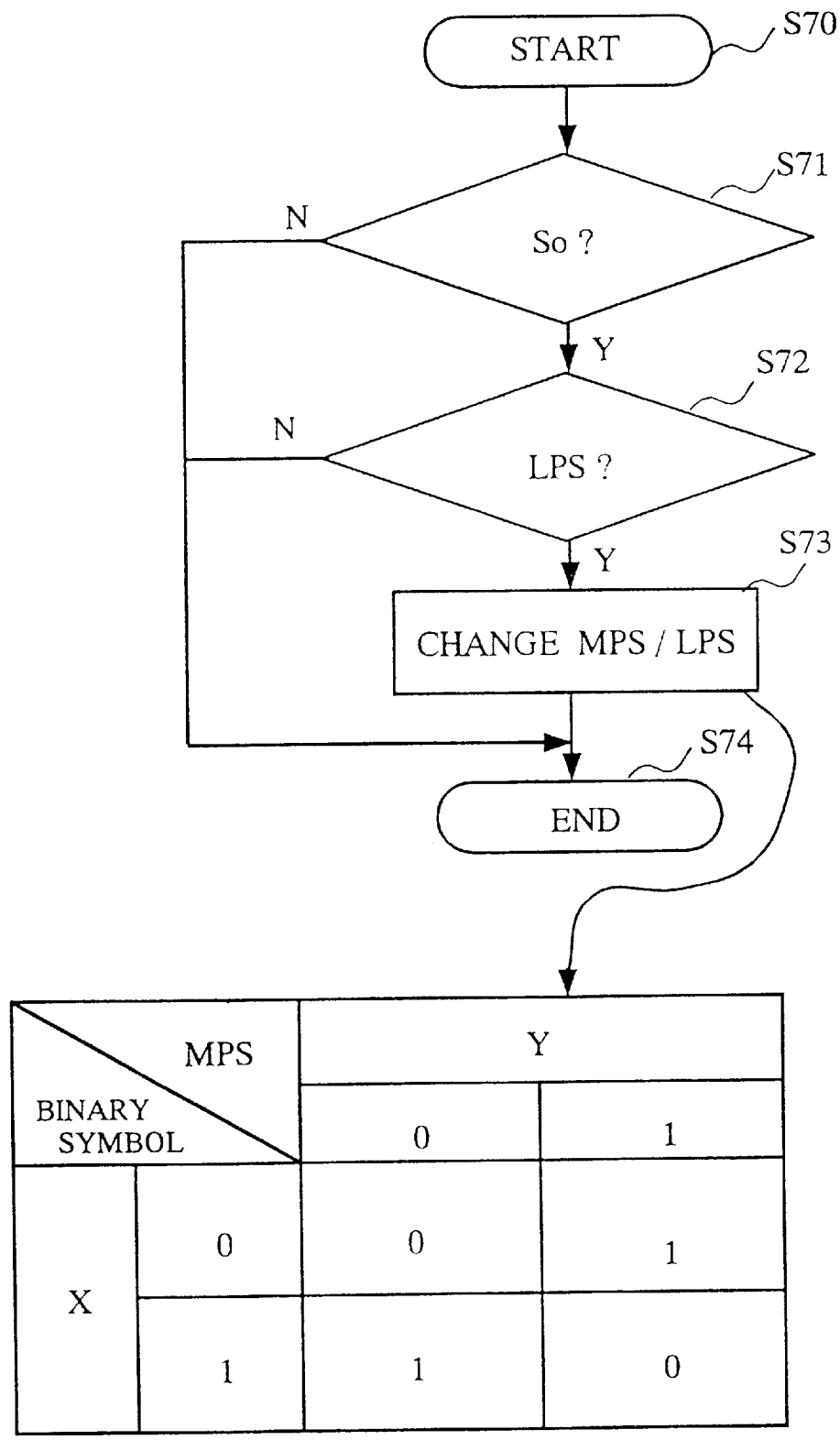
FIG. 30 is a flow chart showing a flow of an operation implemented by a probability estimator and a truth table according to the third embodiment of the present invention.

The first encoder 5a, the second encoder 6a, and the third encoder 8a have exclusive OR circuits 95, 96, and 98 respectively. Each of the exclusive OR circuits 95, 96, and 98 receives a binary symbol X and an MPS (Y) supplied from probability estimators 25a, 26a, and 28a respectively, performs an operation as shown in a truth table in FIG. 30, and outputs an exclusive OR signal Z to the probability estimator. The MPS (Y) used herein is defined as the value of a binary symbol which the probability estimators interpret as the MPS at the time of an encoding operation, that is, "0" or "1".

An operation of the encoding apparatus 400 according to this embodiment will be described.

In this embodiment, the encoding mode is determined according to the same method as that described in the second embodiment. That is, as shown in FIG. 18, when reference picture elements a, b, and c adjacent to a picture element X satisfy the condition "a=b=c", the picture element X is encoded in the mode A. When the reference picture elements do not satisfy the condition, the picture element X is encoded in the mode B.

The third embodiment is different from the second embodiment in that, when encoding is implemented according to the encoding method shown in FIG. 67, interpretation of the MPS and the LPS is changed during transition of states. In the first and second embodiments, the first encoder 5 interprets the MPS as "0" (a binary symbol indicating that the prediction has proved to be correct). The second encoder 6 and the third encoder 8 interpret the MPS as "0" defined in FIG. 8 and FIG. 9. However, in the third embodiment, as shown in a flow chart illustrated in FIG. 30, during transition of states, when an LPS has occurred (or the prediction has proved to be incorrect) in a state $S_0$ (at S72), interpretation of the MPS and the LPS is changed (at S73) and the changed interpretation will be used thereafter. For example, let us assume that while encoding is being implemented by the first encoder 5 and when the MPS is interpreted as "0", a binary symbol "1" has occurred (or the prediction has proved to be incorrect) in the state $S_0$. In this case, a corresponding codeword is output. Then, the interpretation of the MPS and the LPS is changed. That is, the MPS will be interpreted as "1", and the LPS will be interpreted as "0". Then, codewords are generated on that condition. On the other hand, let us assume conversely that, while encoding is being implemented by the first encoder 5 and when the MPS is interpreted as "1", a binary symbol "0" has occurred in the state $S_0$. In this case, a corresponding codeword is output. Then, the MPS will be interpreted as "0" and the LPS will be interpreted as "1" thereafter.

In this way, when the prediction has proved to be incorrect in the state $S_0$, the interpretation of the MPS and the LPS will be changed. This is implemented because a proposition that the occurrence probability of the MPS should be inherently higher than that of the LPS has proved to be false, and it can be seen that a situation in which the occurrence probability of the LPS is higher than that of the MPS has occurred. Once the interpretation of the MPS and the LPS has been changed, encoding on that condition will continue until an LPS occurs again in the state $S_0$. The exclusive OR circuits 95, 96, and 98 receive the binary symbol X and the MPS (Y) from the probability estimators 25a, 26a, and 28a, respectively and outputs the exclusive OR signal Z. That is, when the binary symbol X coincides with the MPS, the exclusive OR signal indicating a binary symbol "0" is output. When the binary symbol X does not coincide with the MPS, the exclusive OR signal indicating a binary "1" is output. Regardless of whether the MPS is interpreted as "0" or "1", the same rule as described hereinbefore for the transition of states is applied. In other words, the exclusive OR signal Z, which is the output of the exclusive OR circuit is regarded to represent a binary symbol for determining the transition of states described in the first and second embodiments. Thus, the transition of states can be implemented based on the exclusive OR signal Z.

Described above is the case where the interpretation of the MPS and the LPS is changed by using the state transition method which has been described as the first example of the methods of determining the code order. The change in the interpretation of the MPS and the LPS can also be implemented easily by comparing N(0) and N(1) in the 0/1 counting method which has been described hereinbefore as the second example of the methods of determining the code order. That is, if N(0)>N(1), the MPS may be interpreted as "0", and the LPS may be interpreted as "1". On the other hand, if N(0)<N(1), the MPS may be interpreted as "1", and the LPS may be interpreted as "0".

Because of the change in the interpretation of the MPS and the LPS, the method of controlling the transmission order of codewords will be different from that described in the second embodiment. In the second embodiment, when encoding is implemented by the third encoder 8 which has been switched from the first encoder 5, control over the transmission order of codewords becomes possible only if it is found whether or not a codeword has been determined. In the third embodiment, a codeword is not always completed in the codeword completion position shown in FIG. 19.

Figure 31:
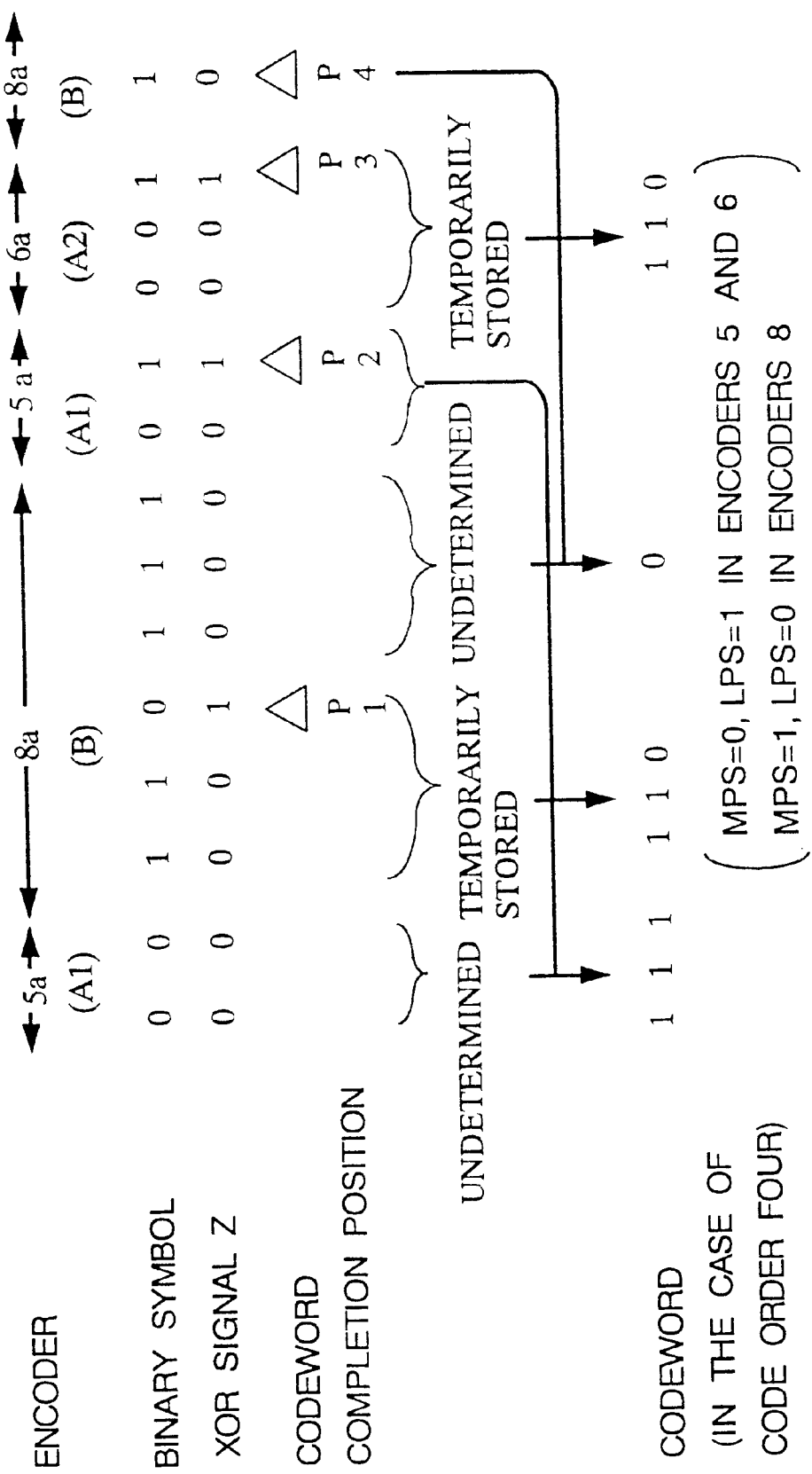
FIG. 31 is a diagram showing how encoding is implemented according to the present invention when the interpretation of the MPS and the LPS has been changed.

FIG. 31 shows how encoding is implemented when the interpretation of the MPS and the LPS has been changed.

It is assumed in FIG. 31 that in the encoders 5a and 6a, the MPS is interpreted as "0" and the LPS is interpreted as "1". It is also assumed that in the encoder 8a, the MPS is interpreted as "1" and the LPS is interpreted as "0".

The binary symbols X is converted to the exclusive OR signal Z by the exclusive OR circuit. For this reason, the encoders 5a, 6a, and 8a should receive a plurality of exclusive OR signals Z as a sequence of binary symbols and encode them. As shown in FIGS. 8 and 9, the binary symbols X constitute a binary symbol sequence which always ends with an LPS. On the other hand, since the exclusive OR signal Z is the inverse of the binary symbols X, the binary symbols shown in FIG. 8 and FIG. 9 are to be inverted. Thus, when the encoding mode is switched, a codeword may not always be determined by each of the encoders. For this reason, when the encoder has been switched into the other encoder, the encoding controller 11 needs to know whether or not a codeword has been determined by the encoder which has been used before switched into the other encoder.

When a codeword has been determined by the encoder 8a in a position P1 in FIG. 31, for example, the encoding controller 11 examines if there remains the other encoder by which a codeword has not been determined (or the encoder with the count of the MPS counter therein being equal to or greater than one). If there remains no such an encoder, the encoding controller 11 directs the code buffer 10 to output the determined codeword. If there remains the encoder by which a codeword has not been determined, the codeword determined by the encoder 8a is temporarily stored in the code buffer 10. Then, the codeword determined by the encoder 8a is output after another codeword has been determined by the other encoder. As shown in FIG. 31, a codeword to be output from the encoder 5a has not been determined yet in the position P1. Thus, the codeword determined in the position P1 is not output until the codeword to be output from the encoder 5a has been determined in a position P2. Referring to FIG. 31, when the encoder is switched from the encoder 8a to the encoder 5a, a codeword to be output from the encoder 8a cannot be determined. The codeword to be output from the encoder 5a is determined in the position P2, and output as described hereinbefore, before the codeword determined in the position P1 is output. Then, a codeword determined by the encoder 6a in a position P3 is temporarily stored in the code buffer 10. Thereafter, a codeword to be output from the encoder 8a is determined in the position P4. Consequently, the codeword determined in the position P3 is output after the codeword determined in a position P4 is output. By implementing the above-mentioned process, the codewords for individual messages are transmitted in the occurrence order of the beginning symbol of the individual messages (the order of the binary symbol which the MPS counter started to count).

Figure 32:
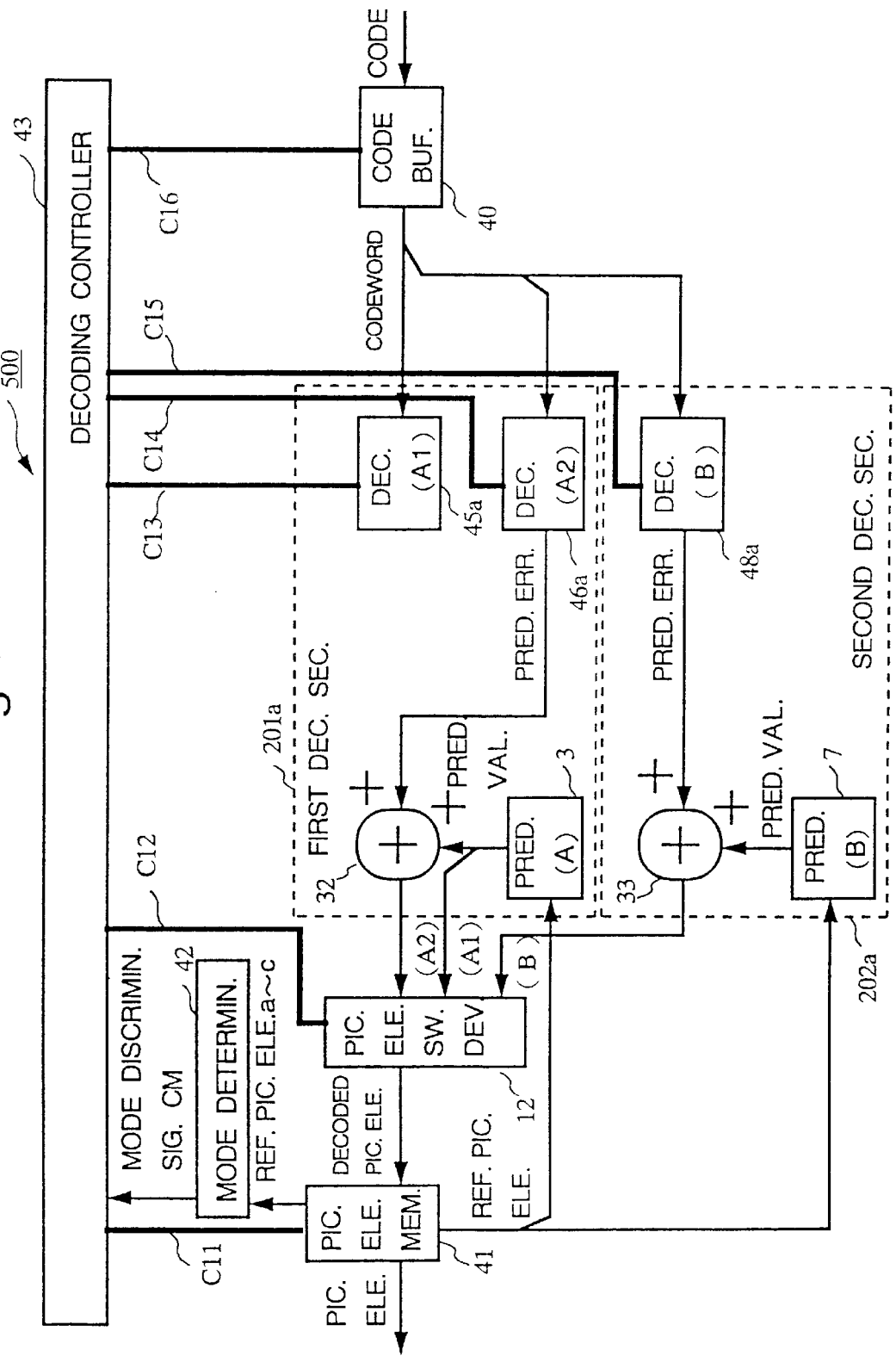
FIG. 32 is a block diagram showing a configuration of a decoding apparatus according to the third embodiment of the present invention.

Next, a configuration of a decoding apparatus 500 according to this embodiment will be described with reference to FIG. 32.

Figure 33:
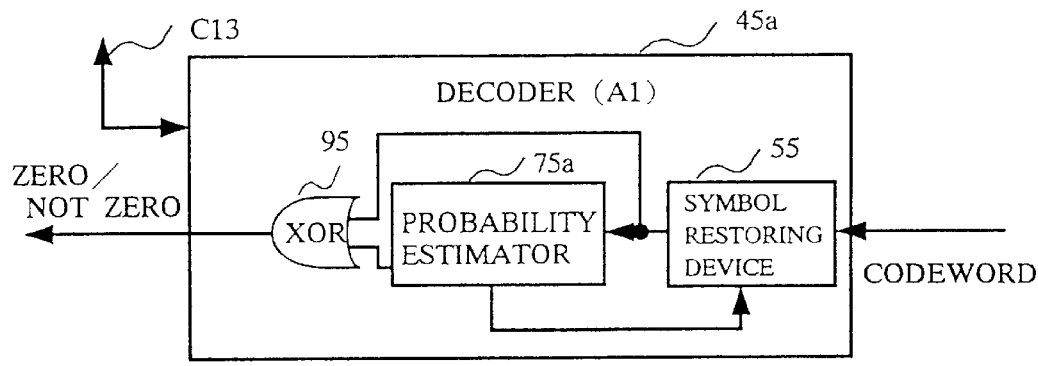
FIG. 33 is a block diagram showing a configuration of a decoder 45a according to the third embodiment of the present invention.
Figure 34:
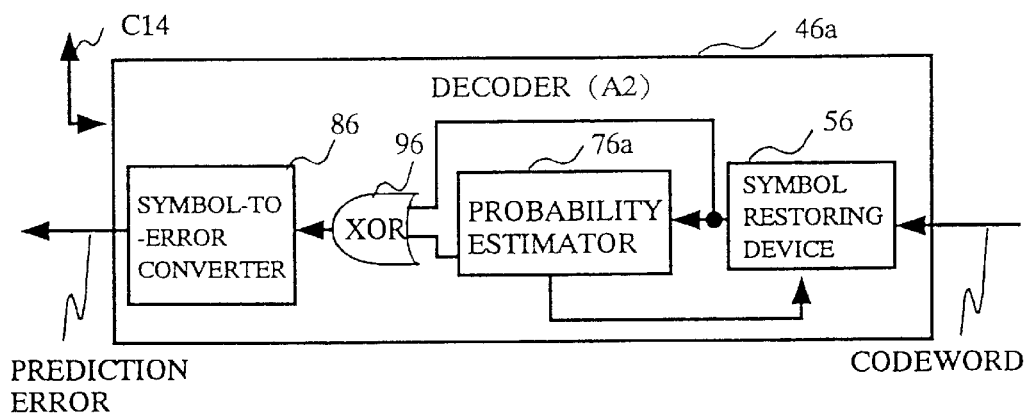
FIG. 34 is a block diagram showing a configuration of a decoder 46a according to the third embodiment of the present invention.
Figure 35:
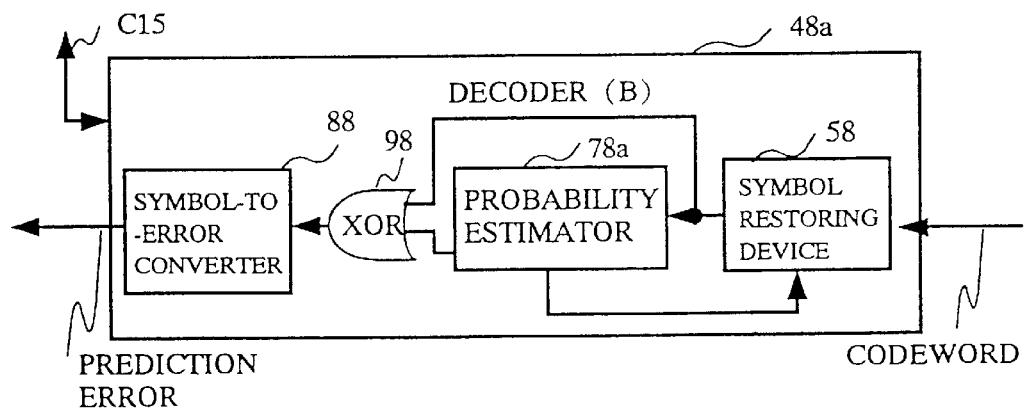
FIG. 35 is a block diagram showing a configuration of a decoder 48a according to the third embodiment of the present invention.

FIGS. 33, 34, and 35 are block diagrams showing an inside configuration of decoders 45a, 46a, and 48a respectively.

The decoding apparatus 500 converts an input codeword into a sequence of binary symbols (message), and by using the binary symbols, the value of the corresponding picture element is reproduced. In this third embodiment, before binary symbols decoded from a codeword by a decoder are used up, there is a case that binary symbols which have been decoded by the other decoder is used. When unused binary symbols have remained in a decoder switched from the other decoder, the decoding controller 43 directs the decoder to output the unused binary symbols. When unused binary symbols are not present in the decoder, the decoding controller 43 directs the decoder to receive another codeword and decode it into binary symbols.

In the decoding apparatus 500 according to this embodiment, control over the order in which decoded binary symbols are to be used is exercised differently from that in the second embodiment. Since other operations are performed in the same way as in the second embodiment, the description about the operations will be omitted.

Embodiment 4.

Figure 36:
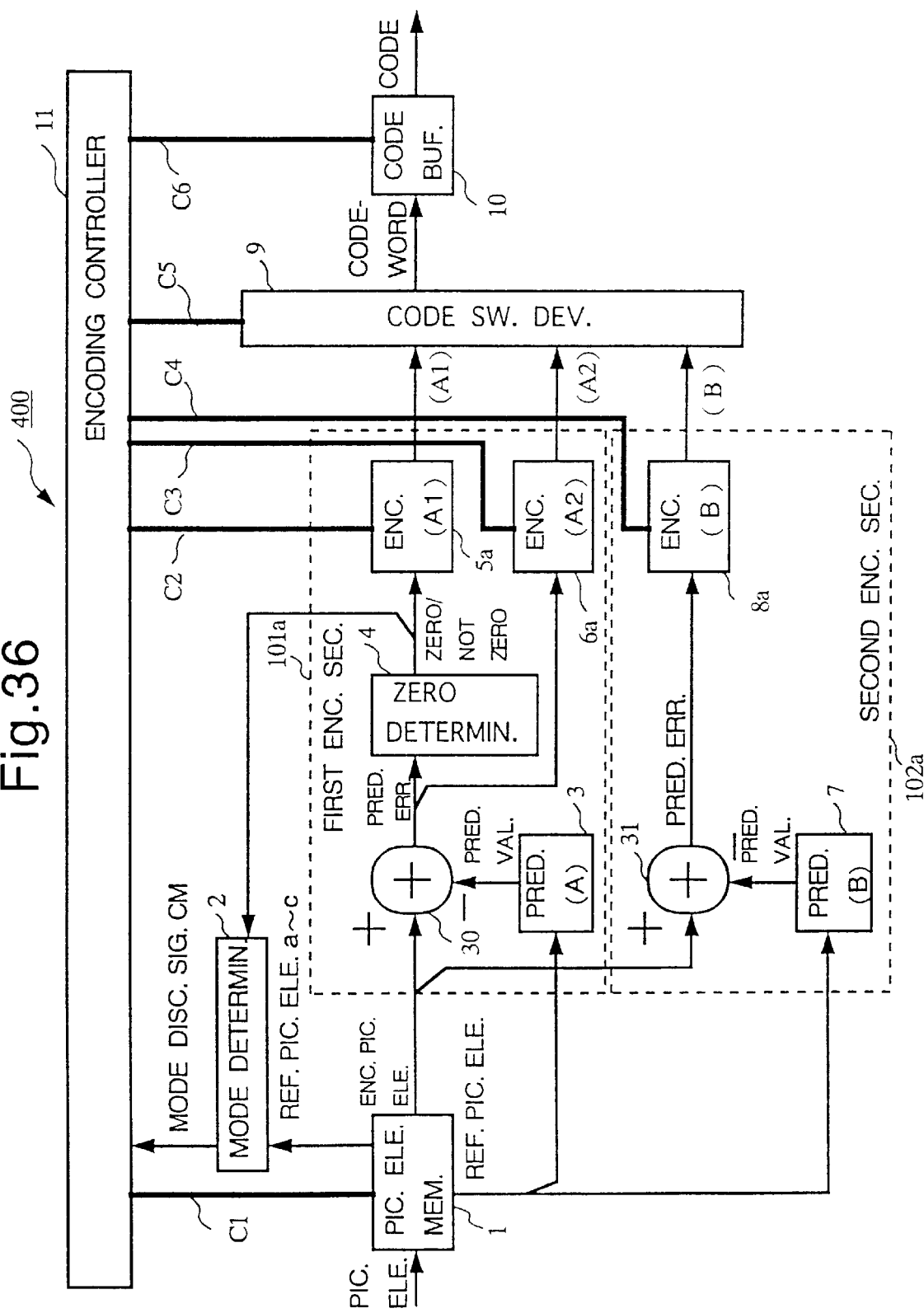
FIG. 36 is a block diagram showing a configuration of an encoding apparatus according to the fourth embodiment of the present invention.

FIG. 36 is a block diagram showing a configuration of an encoding apparatus 400 according to the fourth embodiment of the present invention.

In FIG. 36, encoders 5a, 6a, and 8a are encoders having the same configuration as that shown in FIGS. 27, 28, and 29, respectively.

An operation of the encoding apparatus 400 according to this embodiment will be described.

It is assumed herein that the encoding mode determination according to this embodiment is performed in the same way as that in the first embodiment. That is, as shown in FIG. 10, once reference picture elements a, b, and c adjacent to a picture element X satisfy the condition "a=b=c", encoding is continuously implemented in the mode A until a picture element X becomes "X □ a prediction value".

The fourth embodiment is different from the first embodiment in that when encoding is implemented according to the encoding method shown in FIG. 67, interpretation of the MPS and the LPS is changed during transition of states. According to the first and second embodiments, in the first encoder 5, the MPS is interpreted as a binary symbol "0" (which indicates that the prediction has proved to be correct). In the second encoder 6 and the third encoder 8, the MPS is interpreted as "0" defined in FIG. 8 and FIG. 9. However, in the fourth embodiment, interpretation of the MPS and the LPS is changed when an LPS has occurred in the state $S_0$ at the time of the transition of states. The rule for the transition of states is applied in the same way as in the first, second, and third embodiments. As described hereinbefore, when implementing transition of states by the 0/1 counting method, the change in the interpretation of the MPS and the LPS can be implemented easily by comparing N(0) with N(1).

Thus, the method of controlling the transmission order of codewords will be the same as that in the third embodiment. In the second embodiment, control over the transmission order of codewords becomes possible when it is found whether or not a codeword has been determined only when the encoder is switched from the first encoder 5 to the third encoder 8. In the fourth embodiment, codewords are not always completed in the codeword completion positions P1 through P4 shown in FIG. 19. For this reason, whenever one encoder has been switched into the other encoder, the encoding controller should know whether or not a codeword has been determined by the encoder which has been used before switched into the other encoder.

Next, a configuration of a decoding apparatus 500 according to this embodiment will be described with reference to FIG. 37.

Figure 37:
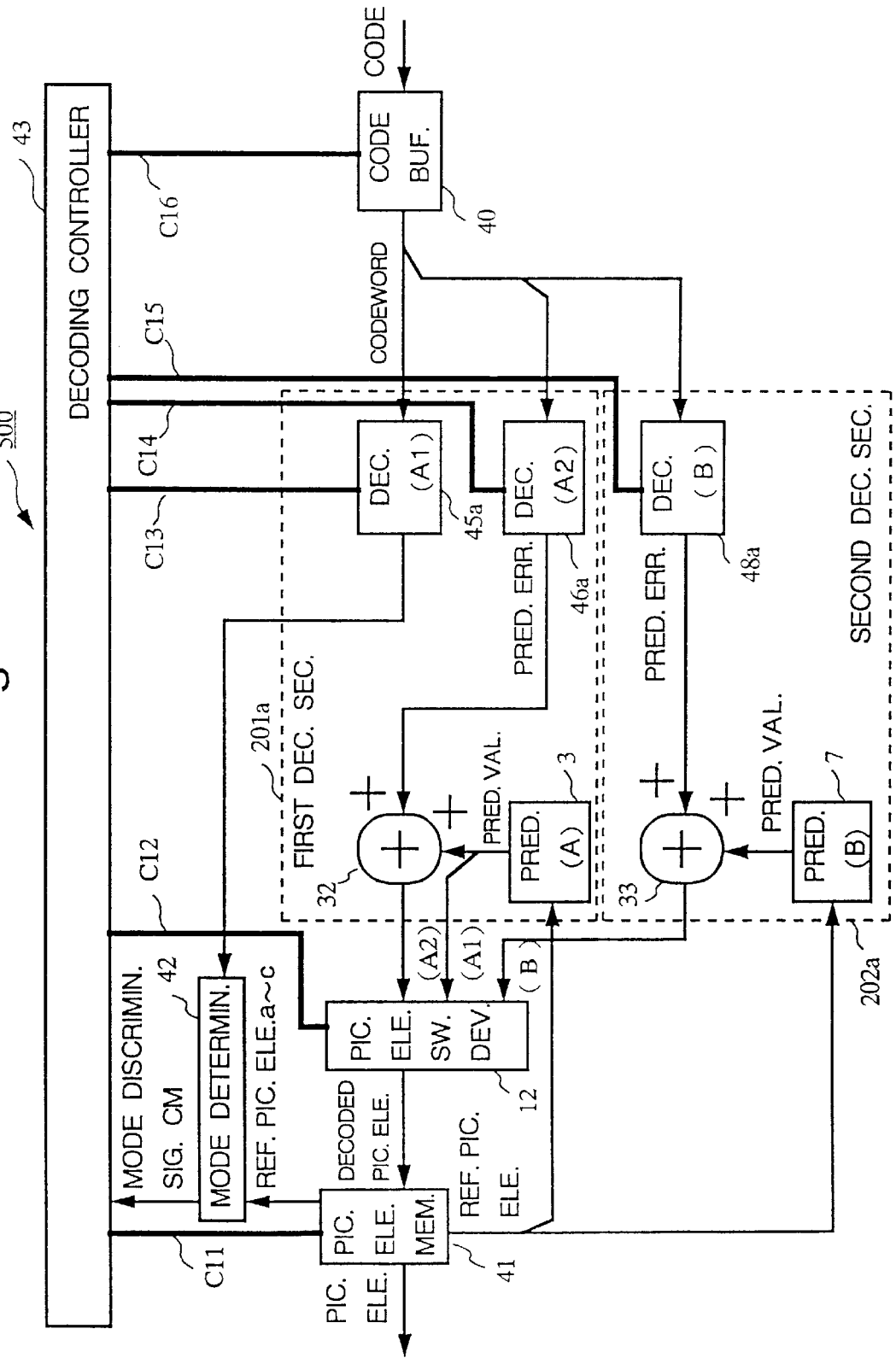
FIG. 37 is a block diagram showing a configuration of a decoding apparatus according to the fourth embodiment of the present invention.

In FIG. 37, decoders 45a, 46a, and 48a have the same configuration as that of the decoders shown in FIGS. 33, 34, and 35 respectively.

The decoding apparatus 500 converts an input codeword into a sequence of binary symbols (message), and by using the binary symbols, the value of a picture element is reproduced. In the fourth embodiment, before binary symbols decoded by a decoder from a codeword are used up, there is a case that binary symbols which have been decoded by the other decoder is used. When unused binary symbols have remained in a decoder switched from the other decoder, the decoding controller directs the decoder to output the unused binary symbols. When unused binary symbols are not present in the decoder, the decoding controller directs the decoder to receive another codeword and decode it into binary symbols.

In the decoding apparatus 500 according to this embodiment, control over the order in which decoded binary symbols are to be used is implemented in a different manner from that in the third embodiment. Since other operations are performed in the same way as in the third embodiment, the description about the operations will be omitted.

Embodiment 5.

Figure 38:
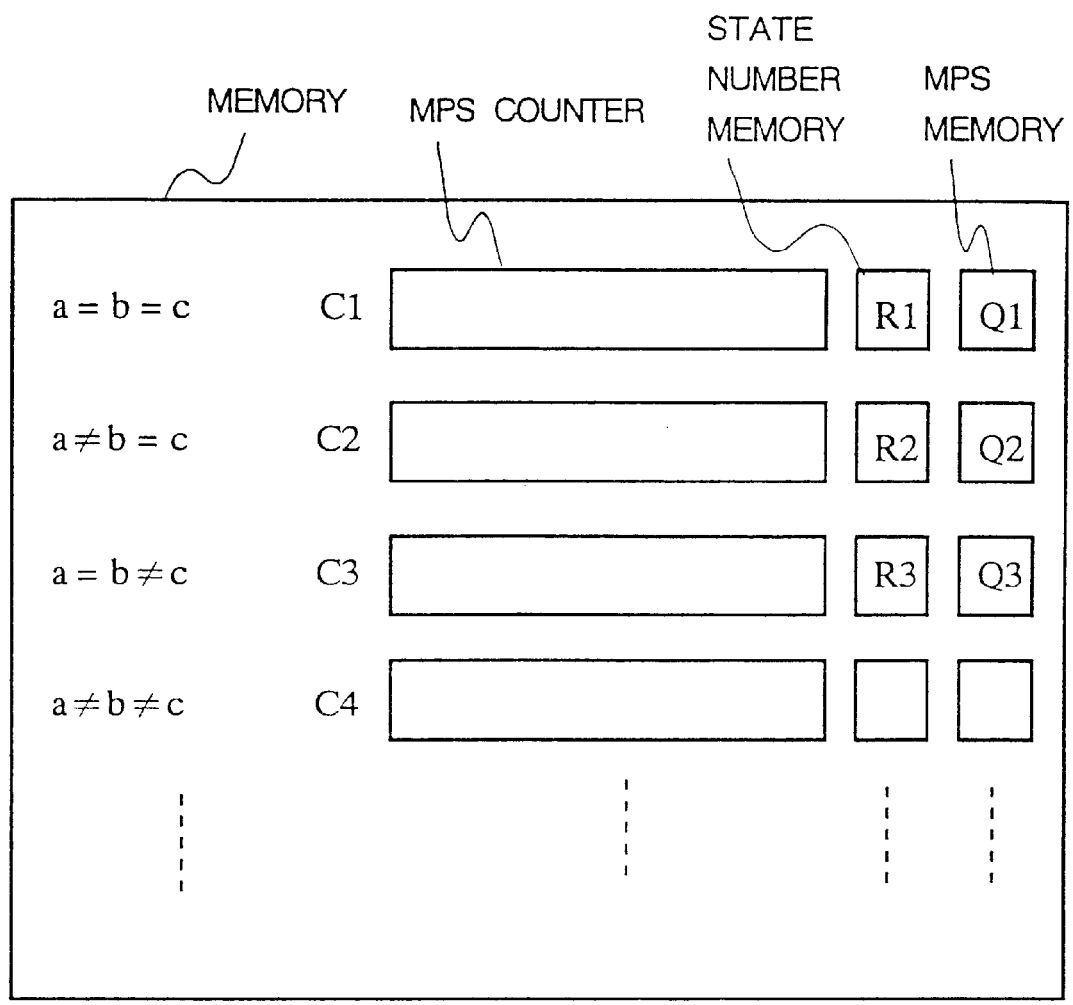
FIG. 38 is a diagram showing a case where a plurality of MPS counters are present inside an encoder according to the present invention.

In the above-mentioned embodiments, a description has been made, based on the assumption that each encoder has an MPS counter, a state-number memory for storing a state number, and an MPS memory for storing the value of MPSs inside. However, as shown in FIG. 38, there may be a plurality of MPS counters, state-number memories, and MPS memories inside the encoder. Referring to FIG. 38, a plurality of MPS counters C1, C2, C3 . . . , state-number memories R1, R2, R3 . . . , MPS memories Q1, Q2, Q3 . . . are present inside the encoder. MPS counters C1, C2, C3 . . . , state-number memories R1, R2, R3 . . . , and MPS memories Q1, Q2, Q3 . . . are provided corresponding to the states to which reference picture elements belong.

Even if a decoder has a plurality of MPS counters, state-number memories, and MPS memories corresponding to the states of reference picture elements as described above, the decoder can be used in the aforementioned embodiments.

Figure 39:
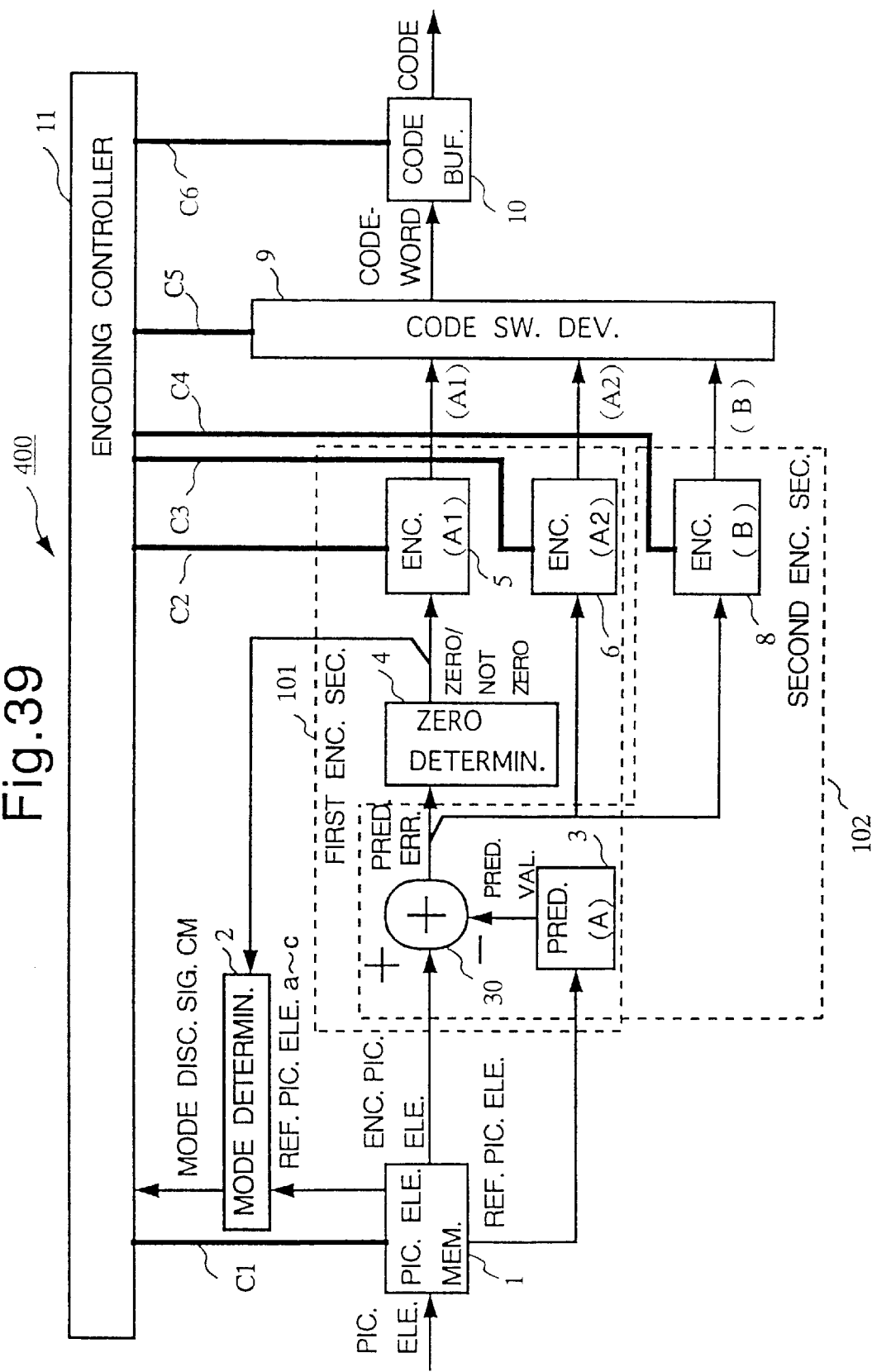
FIG. 39 is a block diagram showing a configuration of an encoding apparatus according to the fifth embodiment of the present invention.

FIG. 39 is a block diagram showing another configuration of an encoding apparatus 400 according to the this embodiment.

When the predictor 3 and the predictor 7 described hereinbefore calculates the prediction value of an encoding picture element by using the same prediction method, the predictor 3 and the predictor 7, the first prediction error calculator 30 and the second prediction error calculator 31 need not be provided separately. Alternatively, as shown in FIG. 39, the output of the prediction error calculator 30 including the output of the predictor 3 may be supplied to the third encoder 8.

Figure 40:
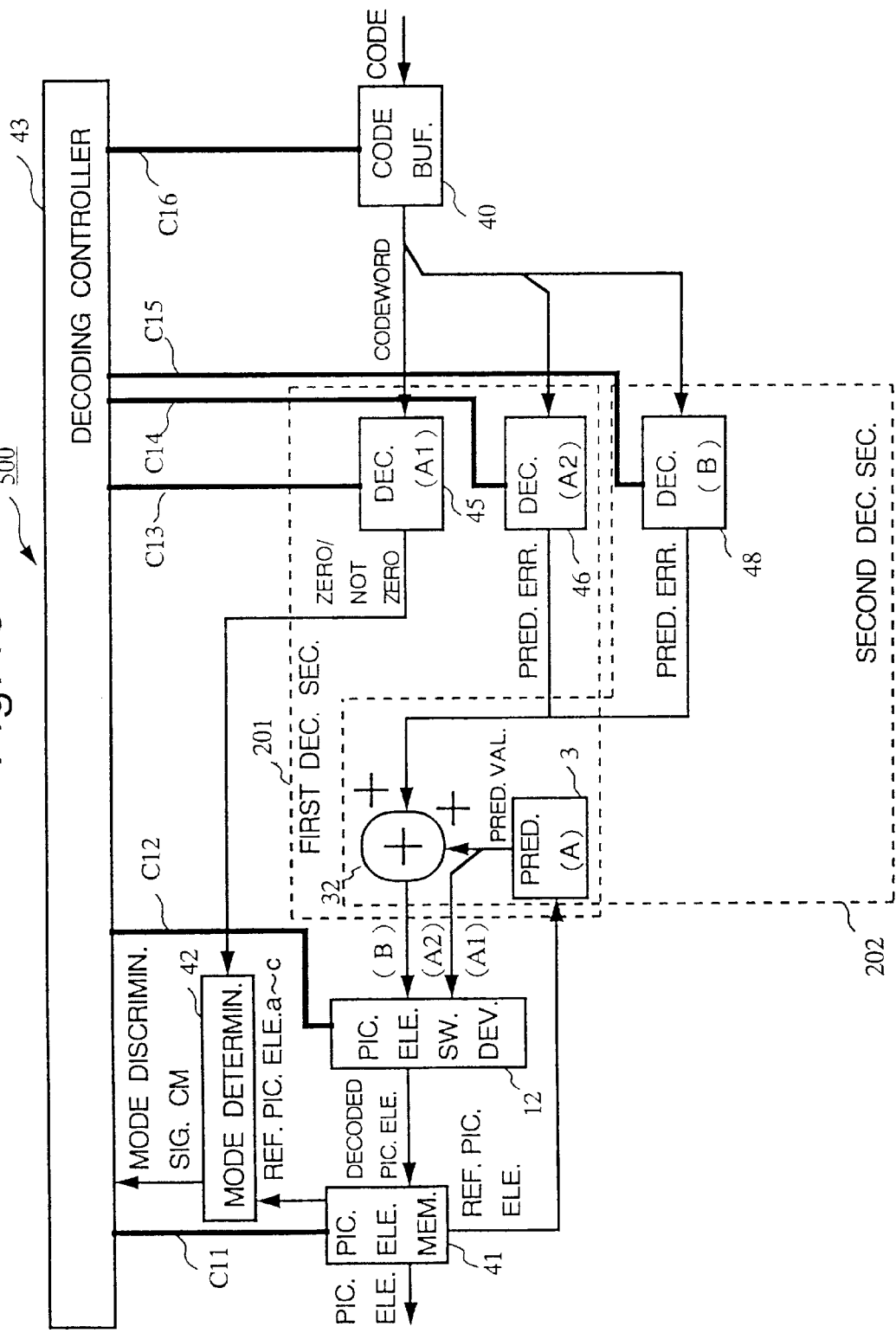
FIG. 40 is a block diagram showing a configuration of a decoding apparatus for the encoding apparatus illustrated in FIG. 39.

FIG. 40 is a block diagram showing a configuration of a decoding apparatus 500 for the encoding apparatus 400 shown in FIG. 39.

Referring to FIG. 40, as in FIG. 39, only one predictor and one decoding picture element calculator are provided in the decoding apparatus 500.

Figure 41:
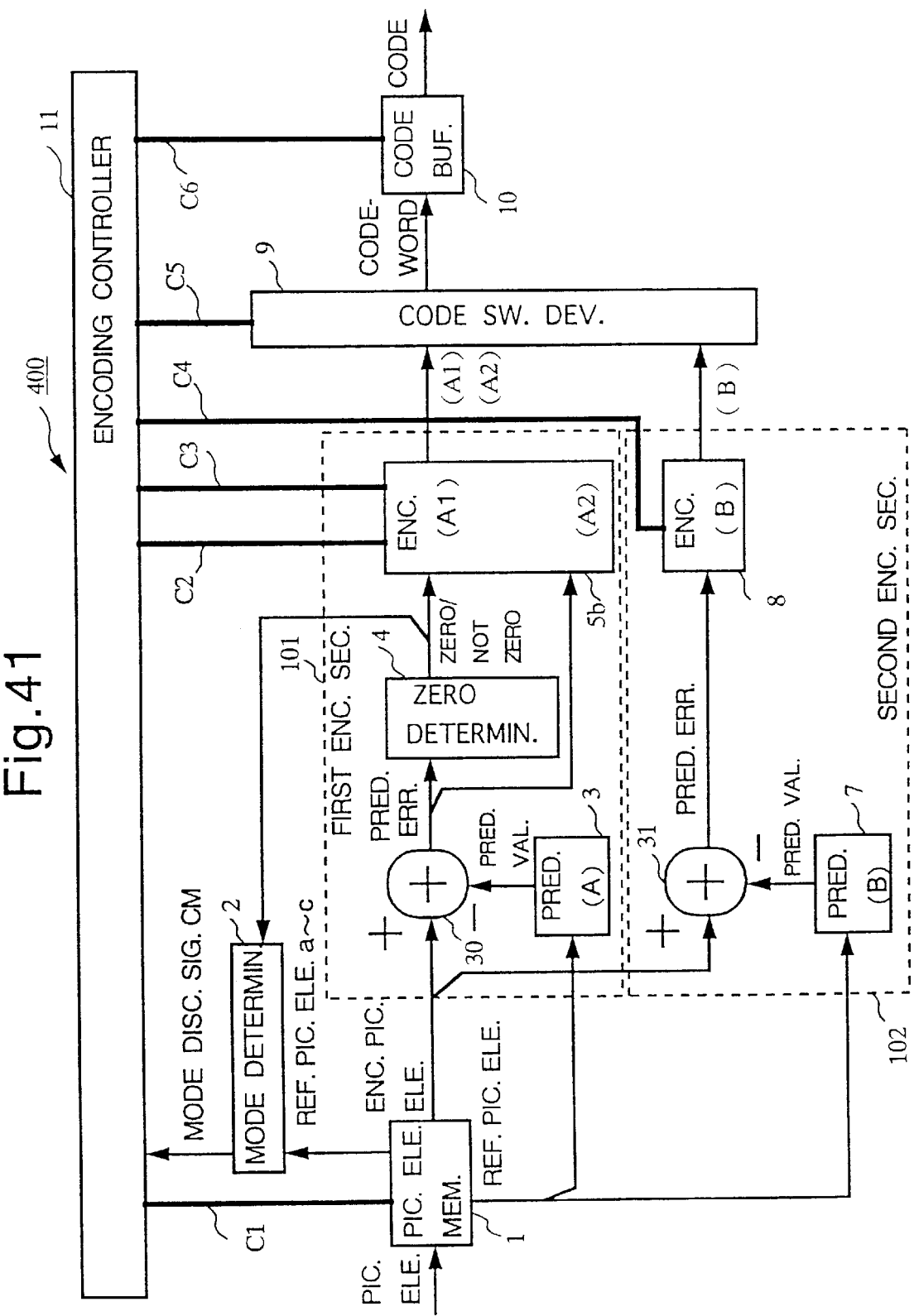
FIG. 41 is a block diagram showing another configuration of an encoding apparatus according to the fifth embodiment of the present invention.

FIG. 41 is a block diagram showing another configuration of the encoding apparatus 400 according to this embodiment.

Figure 42:
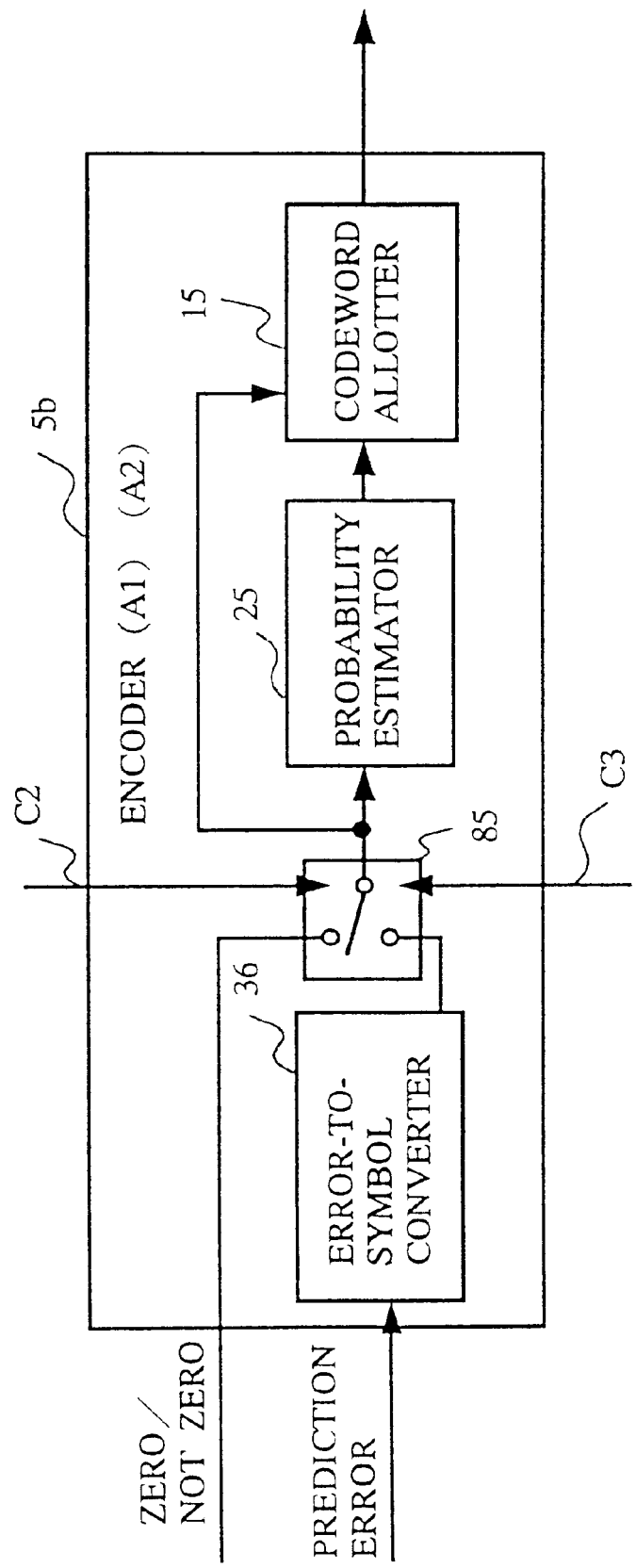
FIG. 42 is a block diagram showing a configuration of an encoder 5b illustrated in FIG. 41.

FIG. 42 is a block diagram showing an internal configuration of an encoder 5b shown in FIG. 41.

The feature of the encoding apparatus 400 shown in FIG. 41 is that the aforementioned first encoder 5 and the second encoder 6 are combined into the encoder 5b. The configuration of the encoder 5b is as shown in FIG. 42. The encoder 5b has a switch 85 which connects the zero determinator 4 to the probability estimator 25 based on the control signal C2. The switch 85 also connects the error-to-symbol converter 36 and the probability estimator 25 based on the control signal C3. As described in the aforementioned embodiments, the first encoder 5 and the second encoder 6 receive different inputs, but use the same encoding method for encoding binary symbols. For this reason, by using the encoder 5b as shown in FIG. 42, the configuration of an encoding apparatus can be simplified.

Figure 43:
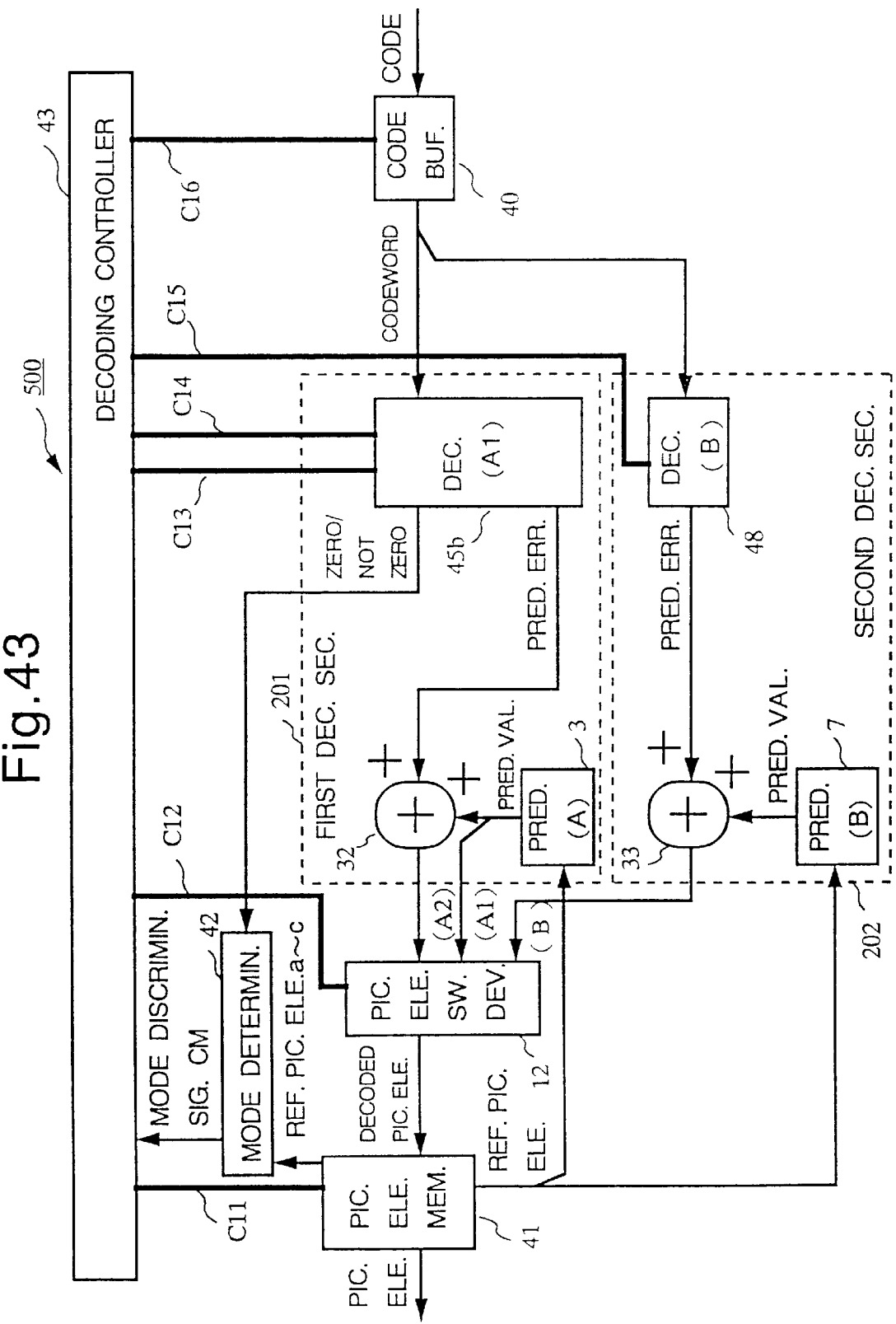
FIG. 43 is a block diagram showing a configuration of a decoding apparatus for the encoding apparatus illustrated in FIG. 41.

FIG. 43 is a block diagram showing a decoding apparatus 500 for the encoding apparatus 400 shown in FIG. 41.

Figure 44:
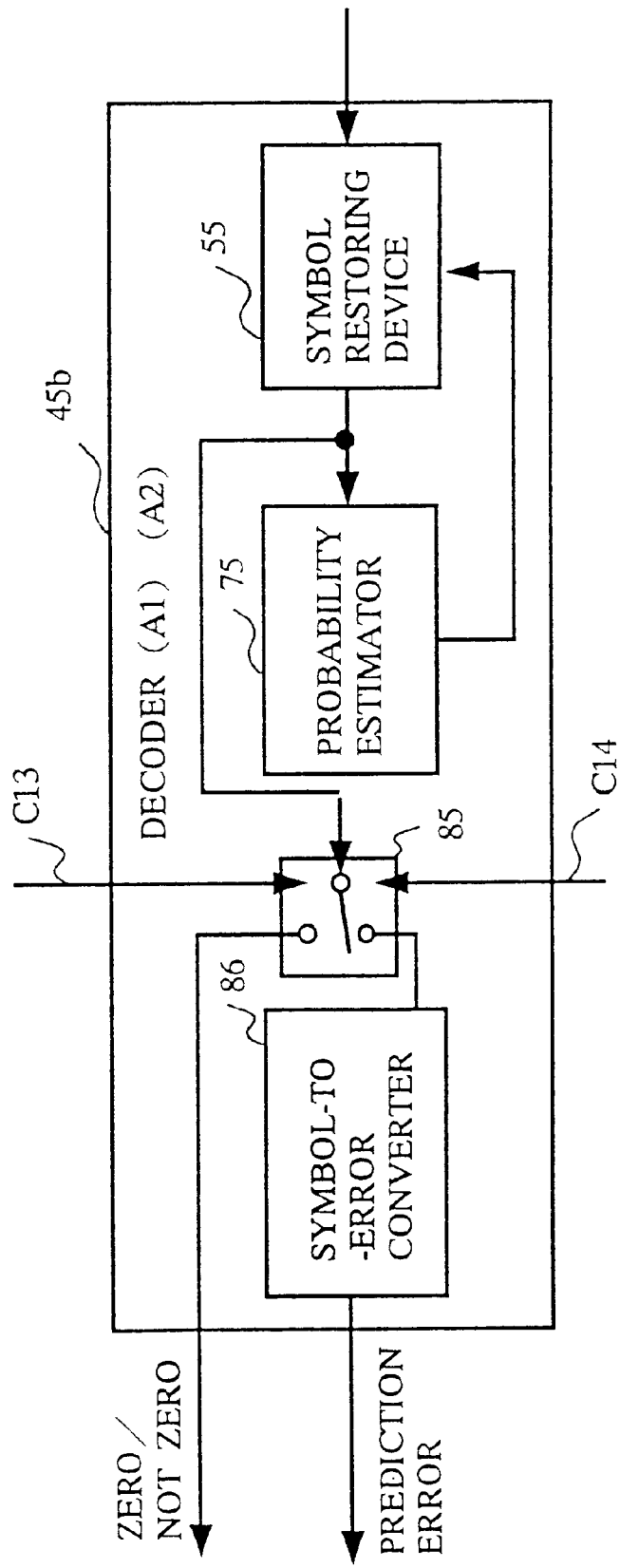
FIG. 44 is a block diagram showing a configuration of a decoder 45b used in the decoding apparatus illustrated in FIG. 43.

FIG. 44 is a block diagram showing an internal configuration of a decoder 45b used in the decoding apparatus 500 shown in FIG. 43.

The first decoder 45 and the second decoder 46 described in the aforementioned embodiments are combined into the decoder 45b shown in FIG. 44.

Figure 45:
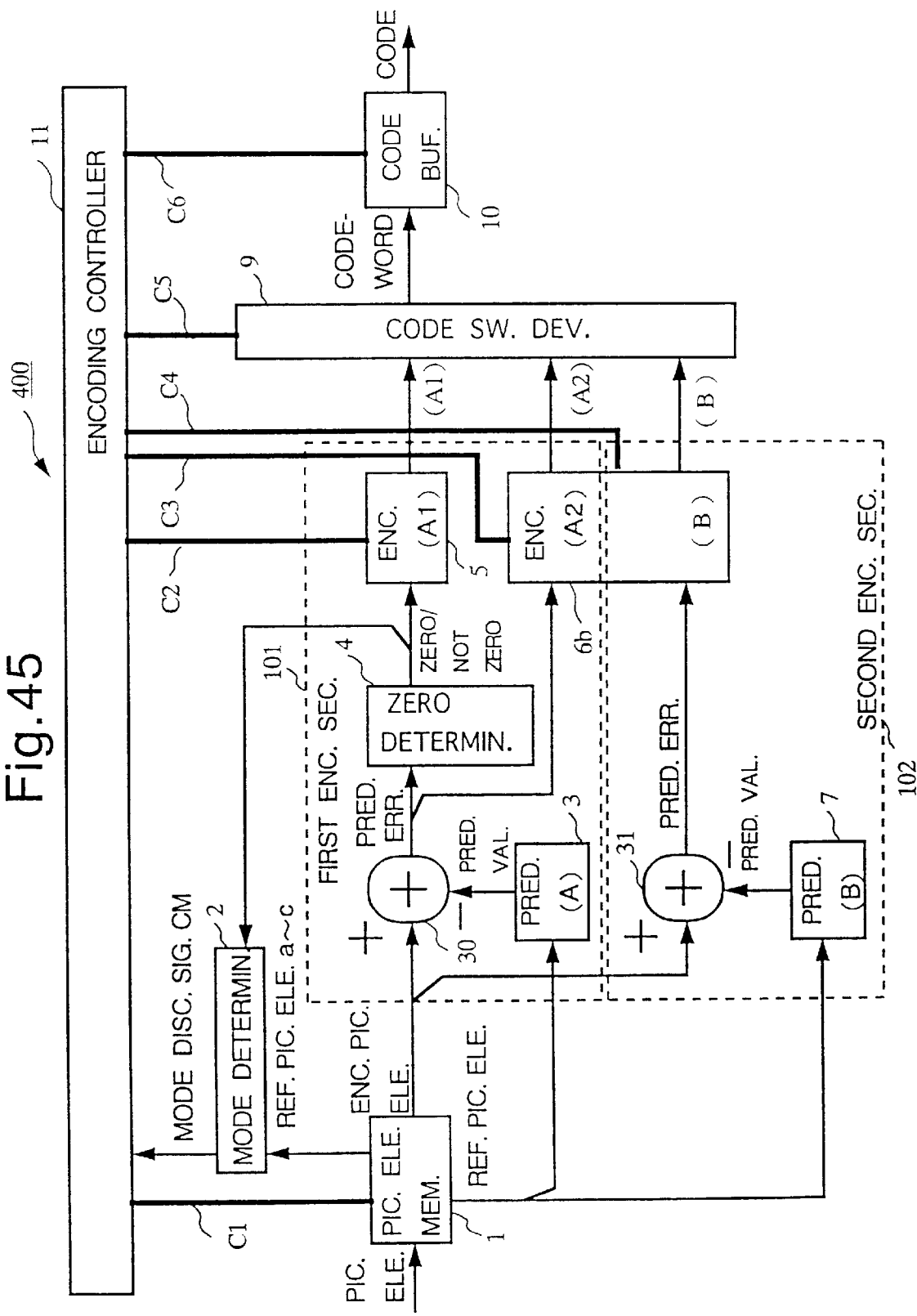
FIG. 45 is a block diagram showing another configuration of an encoding apparatus according to the fifth embodiment of the present invention.

FIG. 45 is a block diagram showing another configuration of an encoding apparatus 400 according to this embodiment.

Figure 46:
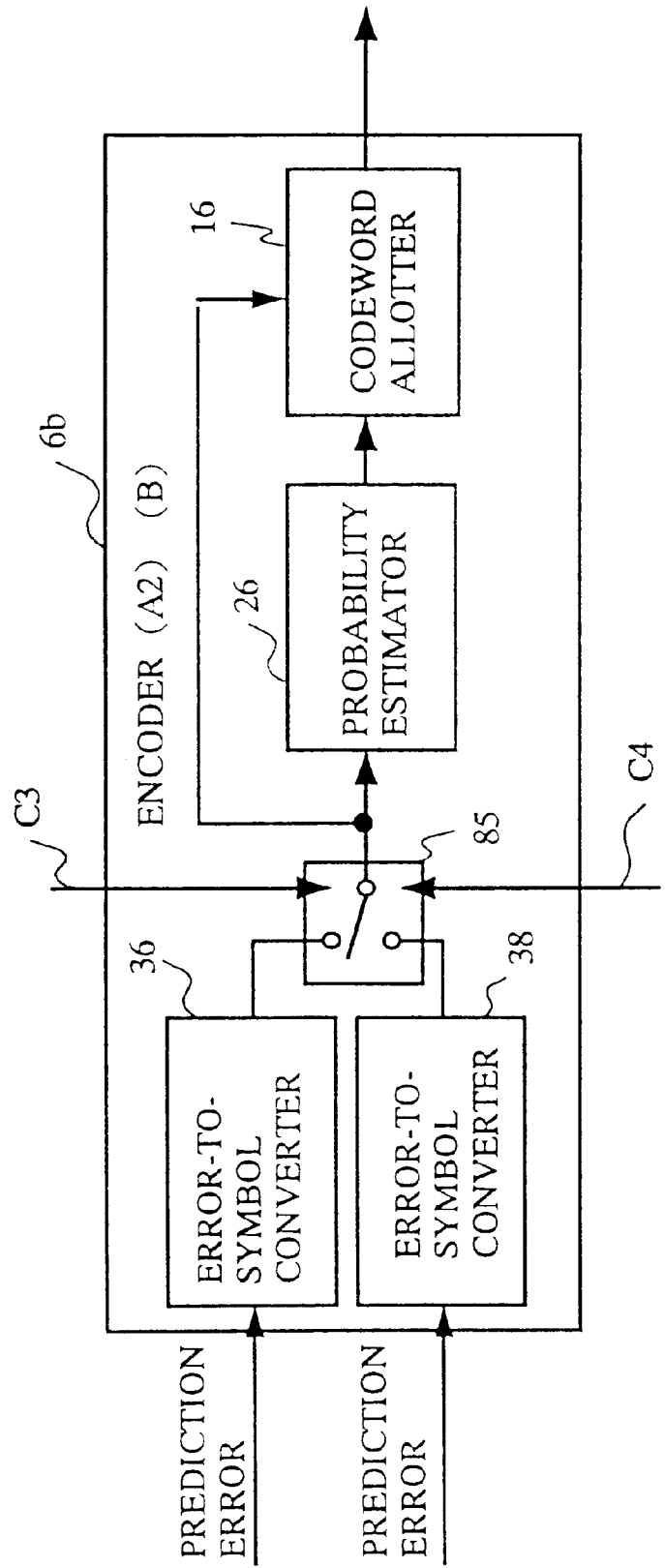
FIG. 46 is a block diagram showing an encoder 6b used in the encoding apparatus illustrated in FIG. 45.

FIG. 46 is a block diagram showing a configuration of an encoder 6b in the encoding apparatus 400 shown in FIG. 45.

Figure 47:
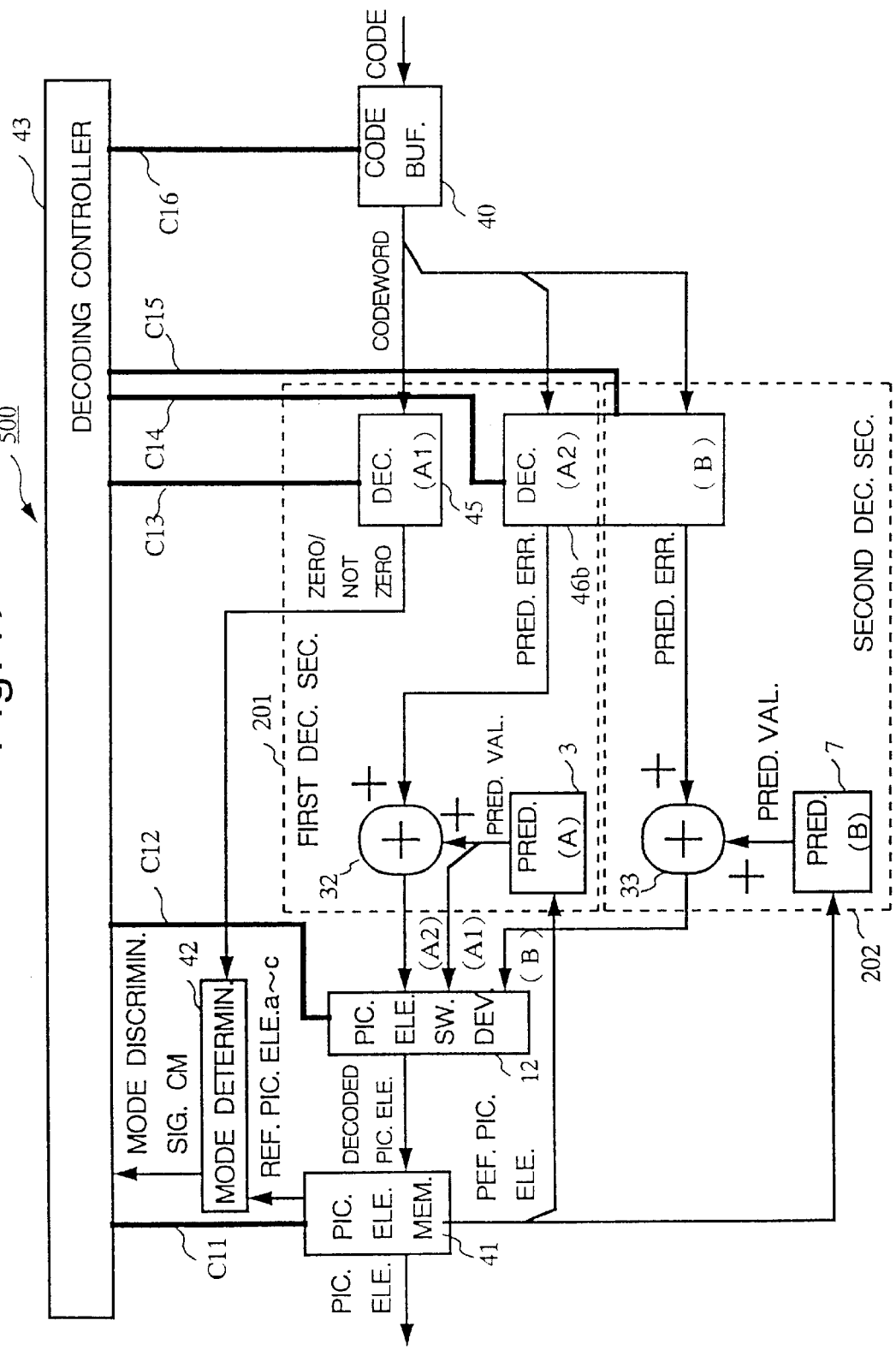
FIG. 47 is a block diagram showing a configuration of a decoding apparatus for the encoding apparatus illustrated in FIG. 45.

FIG. 47 is a block diagram showing a decoding apparatus 500 for the encoding apparatus 400 shown in FIG. 45.

Figure 48:
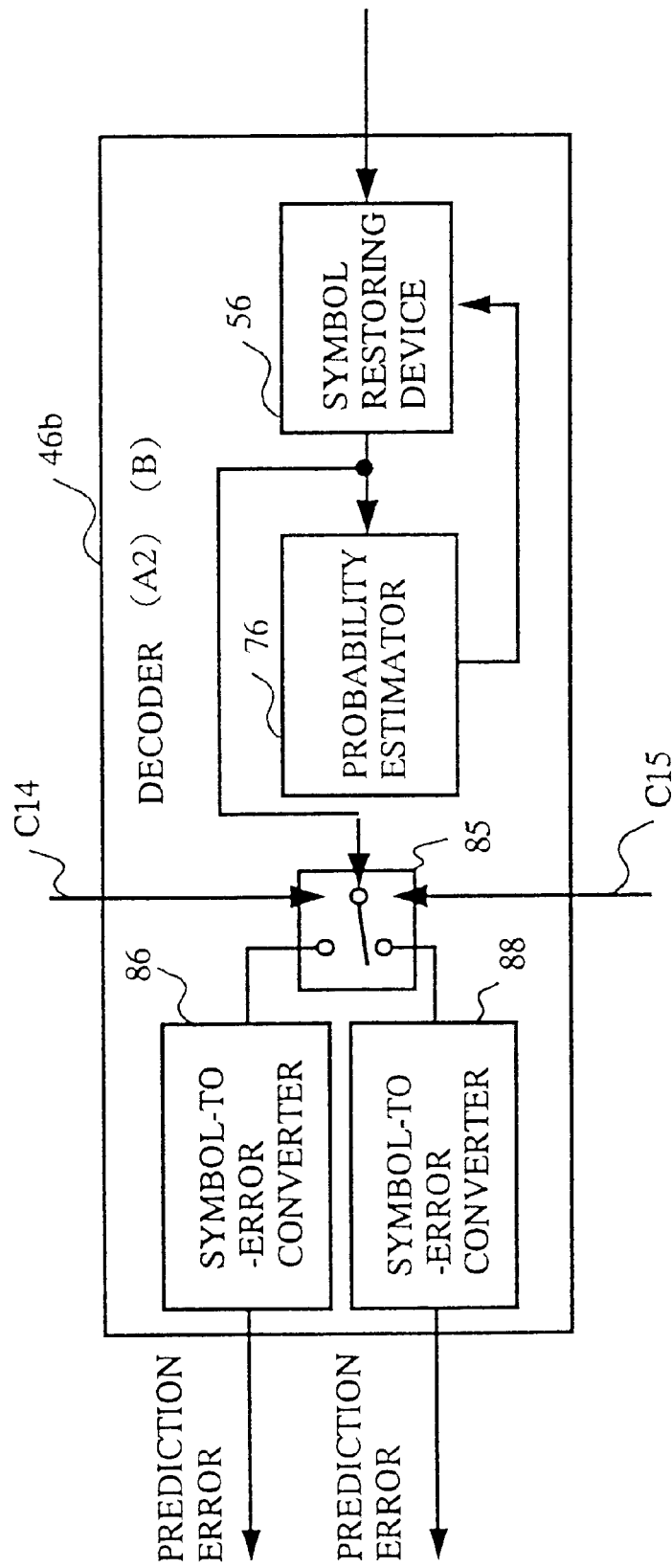
FIG. 48 is a block diagram showing a configuration of a decoder 46b used in the decoding apparatus illustrated in FIG. 47.

FIG. 48 is a block diagram showing a configuration of a decoder 46b in the decoding apparatus 500 shown in FIG. 47.

The feature of the encoding apparatus 400 shown in FIG. 45 is that the second encoder 6 and the third encoder 8 are combined into the encoder 6b. The only difference between the second encoder 6 and the third encoder 8 described in the aforementioned embodiments is that the correspondence between the prediction errors and the binary symbols shown in FIGS. 8 and 9 becomes different. Except for this, the encoder 6b implements the same operations. Thus, as shown in FIG. 46, by switching between the error-to-symbol converter 36 and the error-to-symbol converter 38 by using the switch 85 in the encoder 6b, the second encoder 6 and the third encoder 8 can be combined into the encoder 6b. In the case of the decoder 46b shown in FIG. 48, by switching between the symbol-to-error converter 86 and the symbol-to-error converter 88 by using the switch 85, the second decoder 46 and the third decoder 48 shown in FIG. 13 or FIG. 25 can be combined into the decoder 46b.

Figure 49:
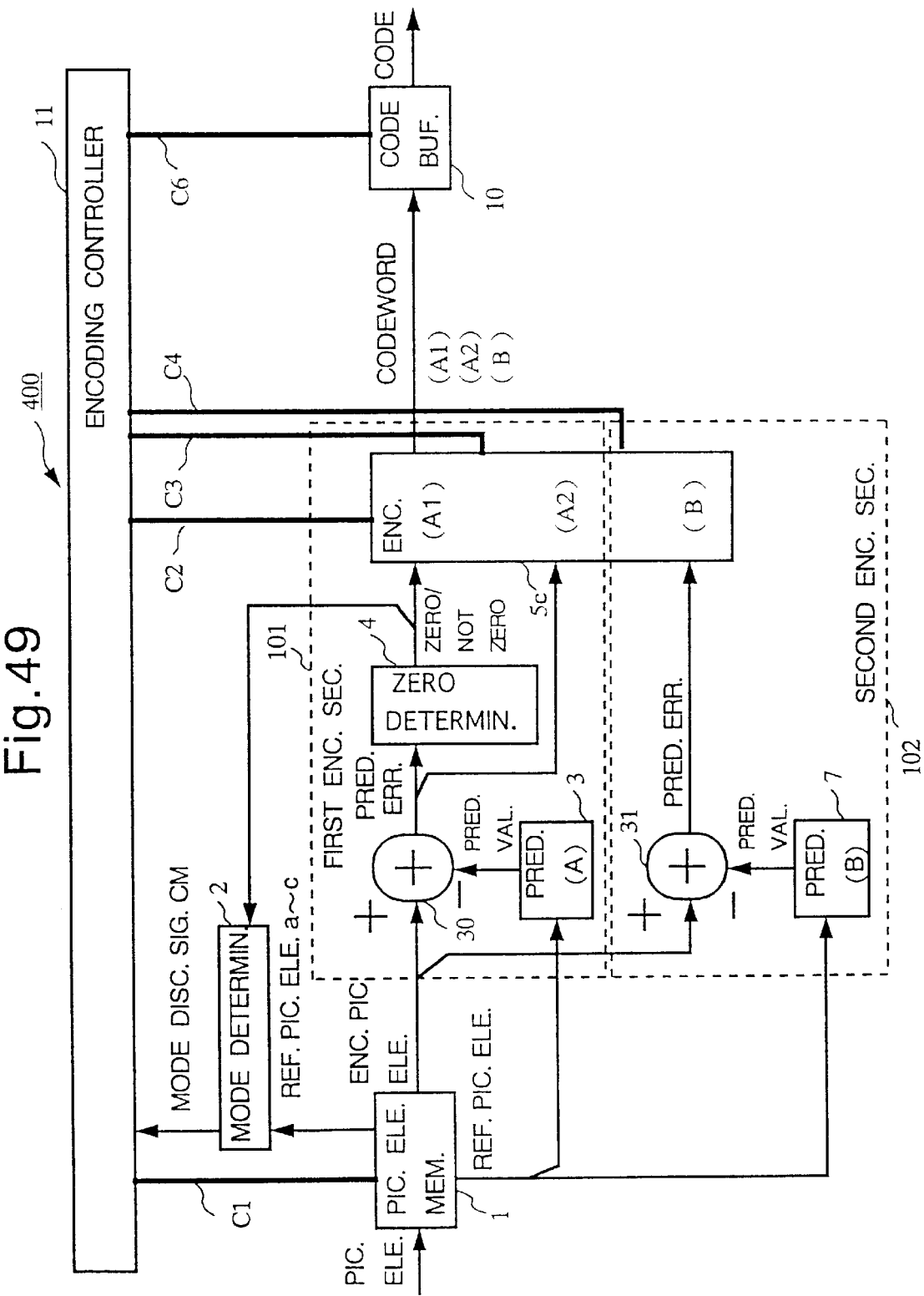
FIG. 49 is a block diagram showing another configuration of an encoding apparatus according to the fifth embodiment of the present invention.

FIG. 49 is a block diagram showing another configuration of the encoding apparatus 400 according to this embodiment.

Figure 50:
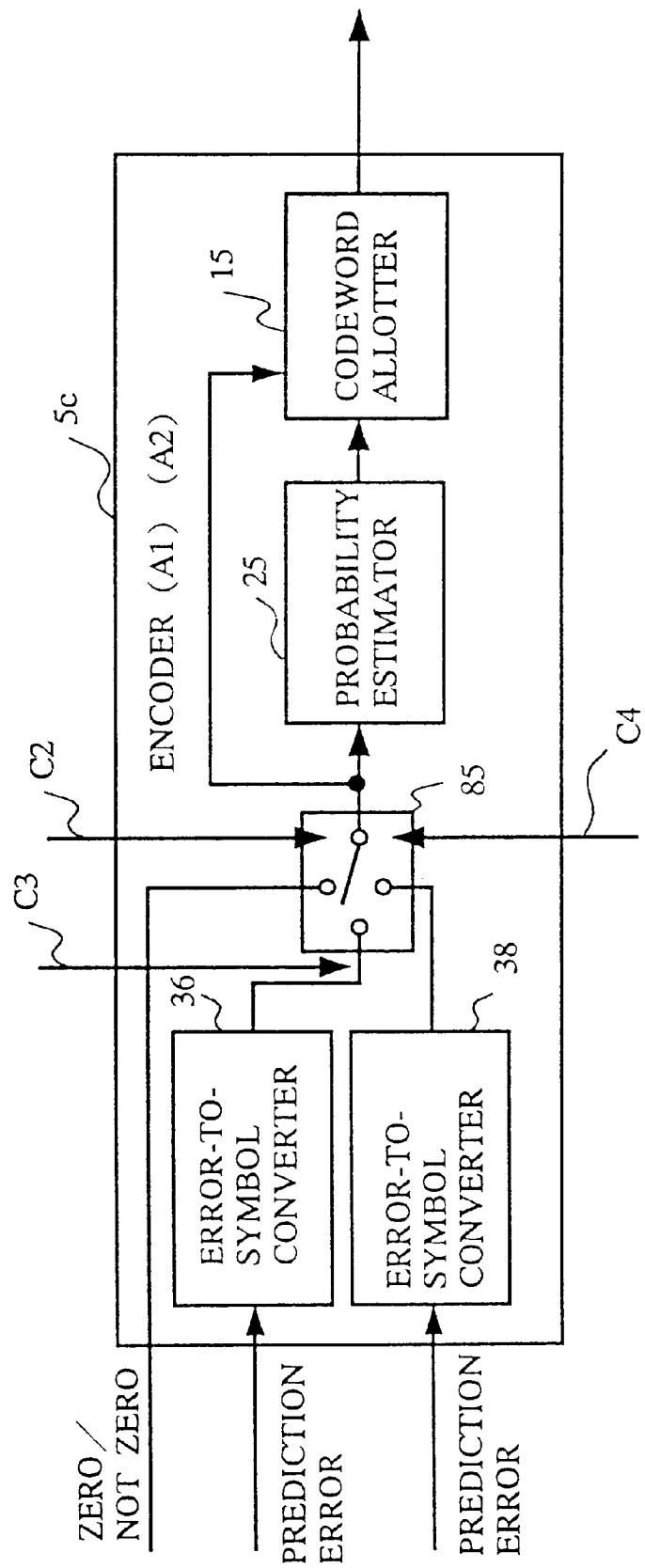
FIG. 50 is a block diagram showing a configuration of an encoder 5c used in the encoding apparatus illustrated in FIG. 49.

FIG. 50 is a block diagram showing a encoder 5c into which the first encoder 5, the second encoder 6, and the third encoder 8 described in the aforementioned embodiments are combined.

The switch 85 switches between the output of the zero determinator, the output of the error-to-symbol converter 36, and the output of the error-to-symbol converter 38. Thus, the encoder 5c can have the functions of the first encoder 5, the second encoder 6, and the third encoder 8 described hereinbefore.

Though not shown in the figure in this application, the first decoder 45, the second decoder 46, and the third decoder 48 can be combined into one decoder in the same way as with the encoder 5c.

Sixth Embodiment.

Figure 51:
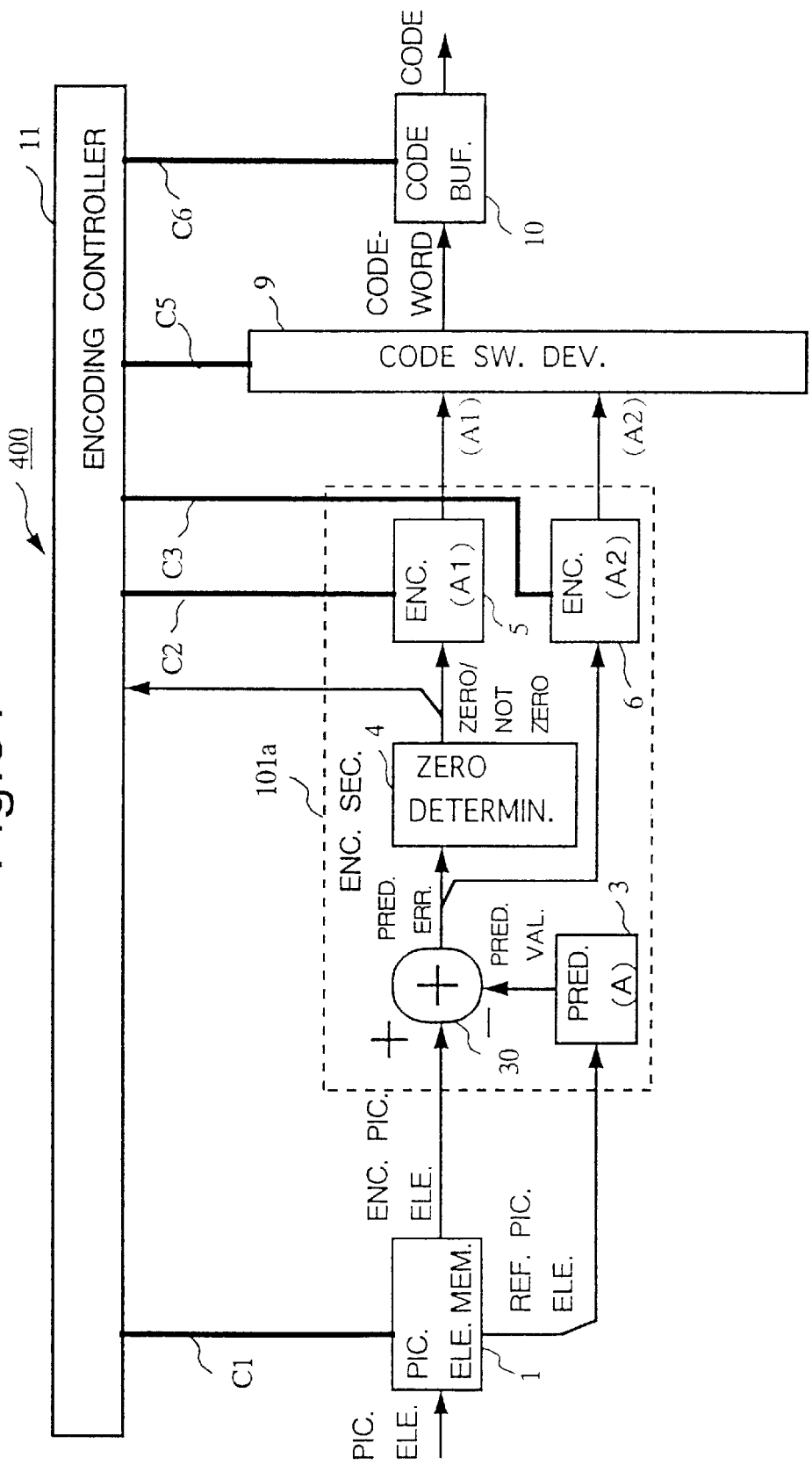
FIG. 51 is a block diagram showing a configuration of an encoding apparatus according to the sixth embodiment of the present invention.

FIG. 51 is a block diagram showing another configuration of an encoding apparatus 400 according to this embodiment.

The encoding apparatus 400 shown in FIG. 51 does not have the mode determinator 2 and the second encoding section 102 provided in the encoding apparatus 400 illustrated in FIG. 4. Referring to FIG. 51, the result of a determination which is supplied from the zero determinator 4 to the mode determinator 2 is supplied to the encoding controller 11. Based on the result of the determination, the encoding controller 11 uses the control signals C2 and C3 to operate the first encoder 5 and the second encoder 6. In addition, the encoding controller 11 uses the control signal C5 to operate the code switching device 9 to select an appropriate codeword from the codewords supplied from the first encoder 5 and the second encoder 6 and supplies the appropriate codeword.

Figure 52:
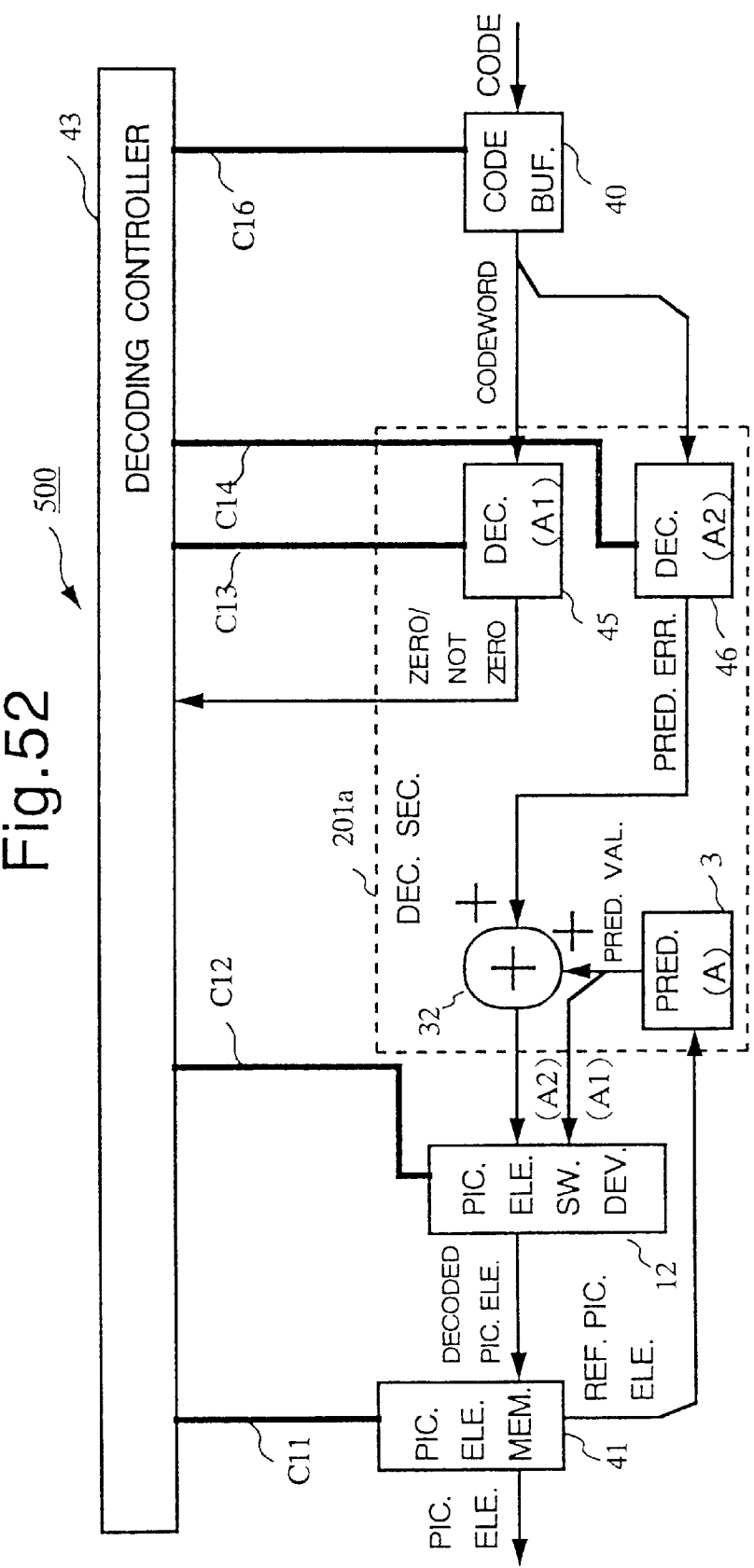
FIG. 52 is a block diagram showing a configuration of a decoding apparatus according to the sixth embodiment of the present invention.

FIG. 52 is a block diagram showing another configuration of a decoding apparatus 500 according to this embodiment.

The decoding apparatus 500 illustrated in FIG. 52 does not have the mode determinator 42 and the second decoding section 202 provided in the decoding apparatus 500 illustrated in FIG. 13. A codeword is decoded into a binary symbol representing a result of determination which indicates whether or not a prediction error is zero by the first decoder 45, and the result of the determination is supplied to the decoding controller 43. Based on the result of the determination received, the decoding controller 43 uses the control signal C12 to control the picture element switching device 12.

The feature of the encoding apparatus 400 illustrated in FIG. 51 is that an encoding picture element is encoded based on the result of a determination as to whether the prediction for the encoding picture element has been correct or incorrect. The feature of the decoding apparatus 500 illustrated in FIG. 52 is that a codeword is decoded into a decoding picture element corresponding thereto based on the result of a determination as to whether the prediction for the value of the decoding picture element has been correct or incorrect. By making a determination as to whether a prediction for an encoding or decoding picture element has been correct or incorrect and implementing encoding or decoding of each message composed of at least one binary symbol representing the result of the determination in this way, in the case having a high percentage of correct prediction, more efficient encoding or decoding can be implemented than in the case where a prediction error is always encoded or a decoded.

In the above-mentioned embodiments, the predictor 3 and the predictor 7 calculates a prediction value of an encoding picture element from the value(s) of reference picture element(s). If necessary, a prediction value may also be calculated based on the mode discrimination signal CM, which can be supplied to the predictor 3 and the predictor 7 from the mode determinator, and the value(s) of reference picture element(s).

Although reference picture elements are assumed to be three picture elements a, b, and c in the above-mentioned embodiments, no less than one picture element may constitute reference picture element.

In the above-mentioned embodiments, the mode A is assumed to be selected when reference picture elements a, b, and c satisfy the condition "a=b=c". This condition may be changed according to a change in the number of reference picture elements. For example, when picture elements a, b, c, and d satisfy the condition "a=b=d", the mode A may be selected.

Although a description has not been made specifically about using computer hardware or software in the above-mentioned embodiments, all or a part of the functions of the aforementioned configured elements may be implemented by computer hardware. Alternatively, the functions of the configured elements may be implemented by software, or by firmware. Alternatively, by the combination of the computer hardware and software, the functions of the configured elements may be implemented. Alternatively, all or a part of the functions of the configured elements may be stored and implemented in a semiconductor chip.

In the above-mentioned embodiments, a description has been directed to the case where all of the first, second, and third encoders and the first, second, and third decoders use the encoding method shown in FIG. 67. However, when implementing encoding and decoding, the encoders and the decoders may not use the encoding method shown in FIG. 67.

In the above-mentioned embodiments, a description has been directed to the case where picture information is encoded or decoded. However, when encoding or decoding audio information, optical information, or other information, such encoding or decoding can be implemented in accordance with the aforementioned embodiments. Especially when input information tends to take a specific value, efficient encoding can be implemented. For example, when audio information or optical information contains data extracted from the similar background to that for a picture signal, or when audio information or optical information contains data extracted from a predetermined background, the audio information or the optical information can be regarded as the picture information described herein. Thus, efficient encoding can be implemented.

Embodiment 7.

Figure 53:
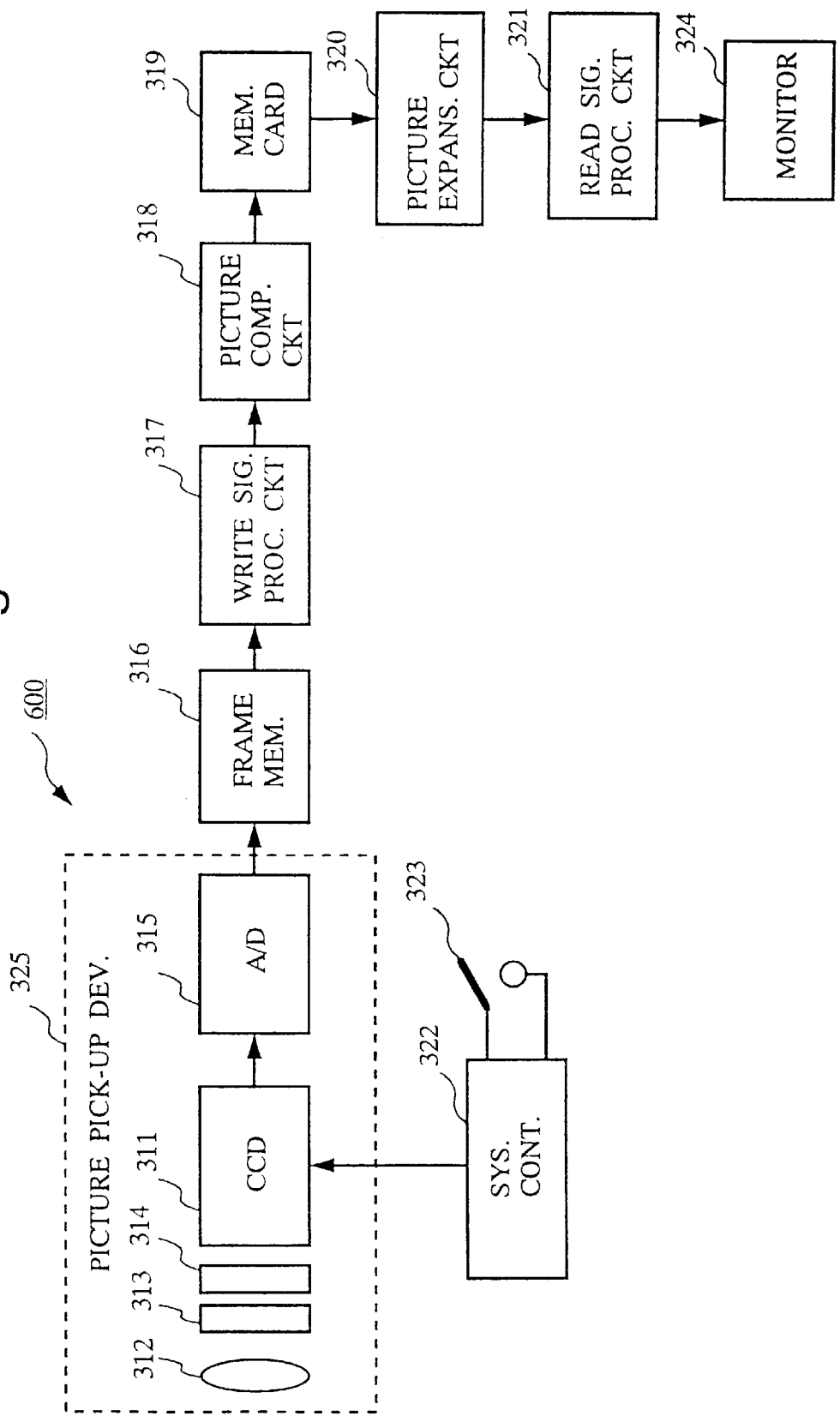
FIG. 53 shows an example of a configuration of a picture processing apparatus according to the seventh embodiment of the present invention.

FIG. 53 shows a picture processing apparatus (a digital camera) as an embodiment of the picture processing apparatus according to the present invention. The figure shows an example of a configuration of a digital camera 600, which writes a static picture on a memory card.

In FIG. 53, a picture pick-up device 325 picks up a picture composed of a plurality of picture elements, a charge coupled device (CCD) 311 is used for a sensor which converts an optical picture into an electric signal, and the optical picture is formed on the CCD 311 through a lens 312. A diaphragm 313 regulates incident dose, a shutter 314 adjusts an exposure time of the CCD 311, and an AD (Analog to Digital) converter 315 converts an output of the CCD 311 into a digital signal. A frame memory 316, being a semiconductor memory, temporarily stores one frame of digital signals converted from the CCD 311. A write signal processing circuit 317 selects at least two adjacent lines of data from the output signals of the CCD 311 stored in the frame memory 316. The write signal processing circuit 317 generates a luminance signal Y, color-difference signals U and V by an operation of signals of each picture elements and outputs them. A picture compression circuit 318 encodes and compresses the data of the luminance signal Y, the color-difference signals U, and V generated by the write signal processing circuit 317. A memory card 319 is configured by a semiconductor memory and stores the picture. A picture expansion circuit 320 expands the encoded picture data read from the memory card 319. A read signal processing circuit (or display circuit) 321 displays the extended luminance signal Y, and the extended color-difference signals U, V on a monitor 324. A system controller 322 controls an operation of the CCD 311. A trigger switch 323 starts picking up a picture.

Figure 54:
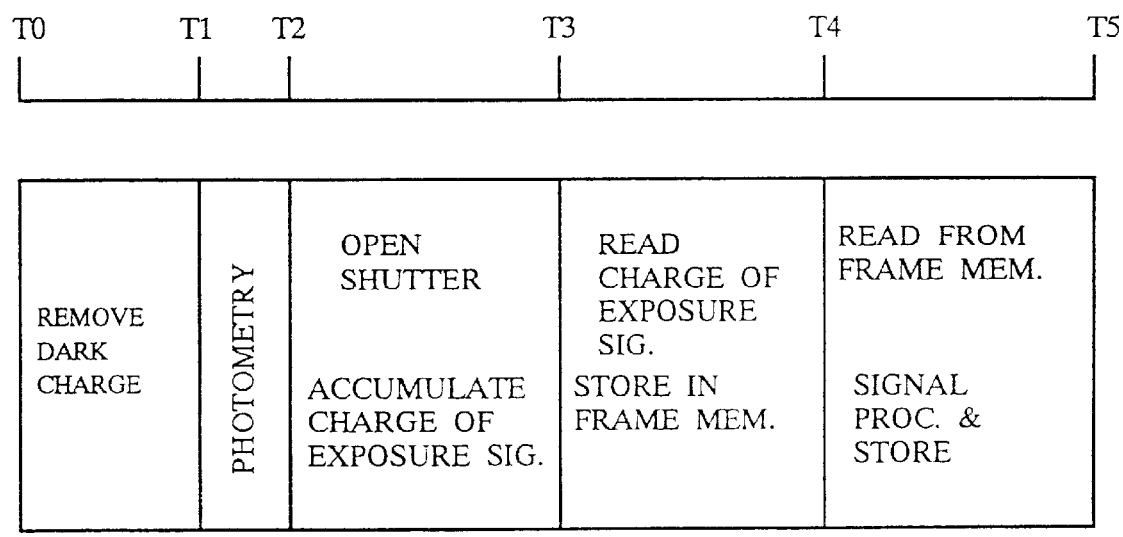
FIG. 54 shows a sequence of writing procedure of a static picture by the picture processing apparatus according to the seventh embodiment of the present invention.

FIG. 54 shows a sequence of writing procedure of a static picture by the digital camera 600 shown in FIG. 53.

At time T0, the trigger switch 323 is turned ON and a static picture writing sequence is started as will be described hereinafter. During a period from time T0 to time T1, dark charge accumulated in the CCD 311 is removed. Next, a photometric operation is performed by a photometric element (not shown) to set an appropriate exposure time and an appropriate exposure diaphragm. During a period from time T2 to time T3, the shutter 314 is opened and an exposure operation is performed to the CCD 311. At time T3, the shutter 314 is closed and charge of the exposure signal is read from the CCD 311. The signal read from the CCD 311 is converted by the AD converter 315 into digital signal. One frame of the digital signals is temporarily stored in the frame memory 316. At time T4, the reading operation of the exposure signal is finished. During a period from time T4 to time T5, the signal temporarily stored in the frame memory 316 is read. The luminance signal Y and the color-difference signals U, V are obtained from the operation of a plurality of adjacent picture elements of the CCD 311 by the write signal processing circuit 317. The data of the luminance signal Y and the color-difference signals U, V are encoded, compressed and stored in the memory card 319.

Figure 55:
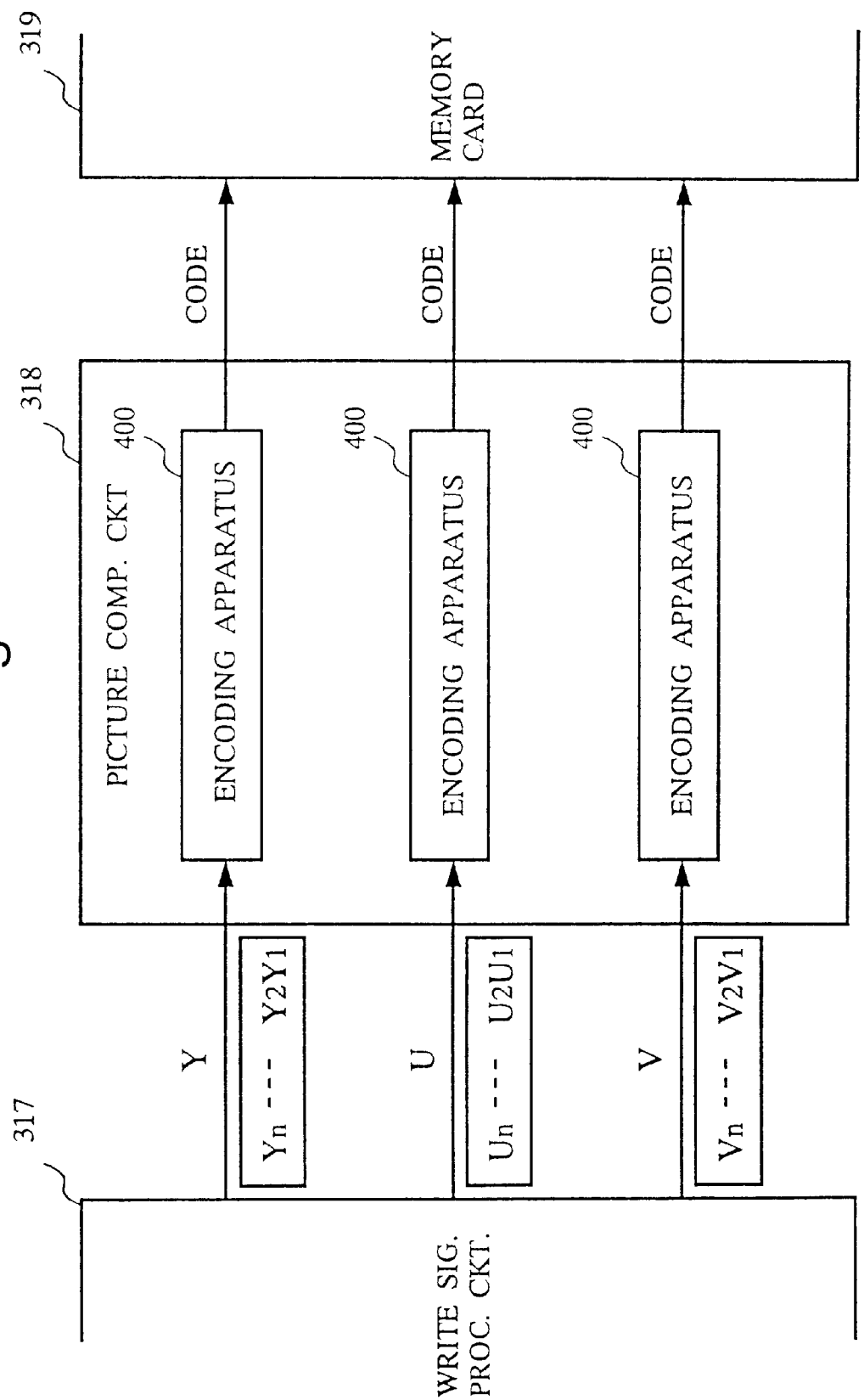
FIG. 55 shows a configuration of a picture compression circuit 318 of the invention.

FIG. 55 shows a configuration of the picture compression circuit 318.

Three encoding apparatuses 400 are provided to the picture compression circuit 318. The encoding apparatuses described in the above first through sixth embodiments may be used for the encoding apparatuses 400. For example, the encoding apparatus 400 shown in FIG. 4 can be applied. The encoding apparatuses 400 input the luminance signal Y and the color-difference signals U, V in parallel from the write signal processing circuit 317. Each encoding apparatus implements encoding by using the aforementioned encoding method. The encoded result is output to the memory card 319 and stored there. As shown in FIG. 55, the luminance signal Y is one frame of luminance signals Y, having Y1, Y2, ..., Yn. The encoding apparatus 400 inputs one frame of the luminance signals Y and encode Y1, Y2, ..., Yn. The color-difference signals U and V are encoded by each encoding apparatus as well.

Figure 56:
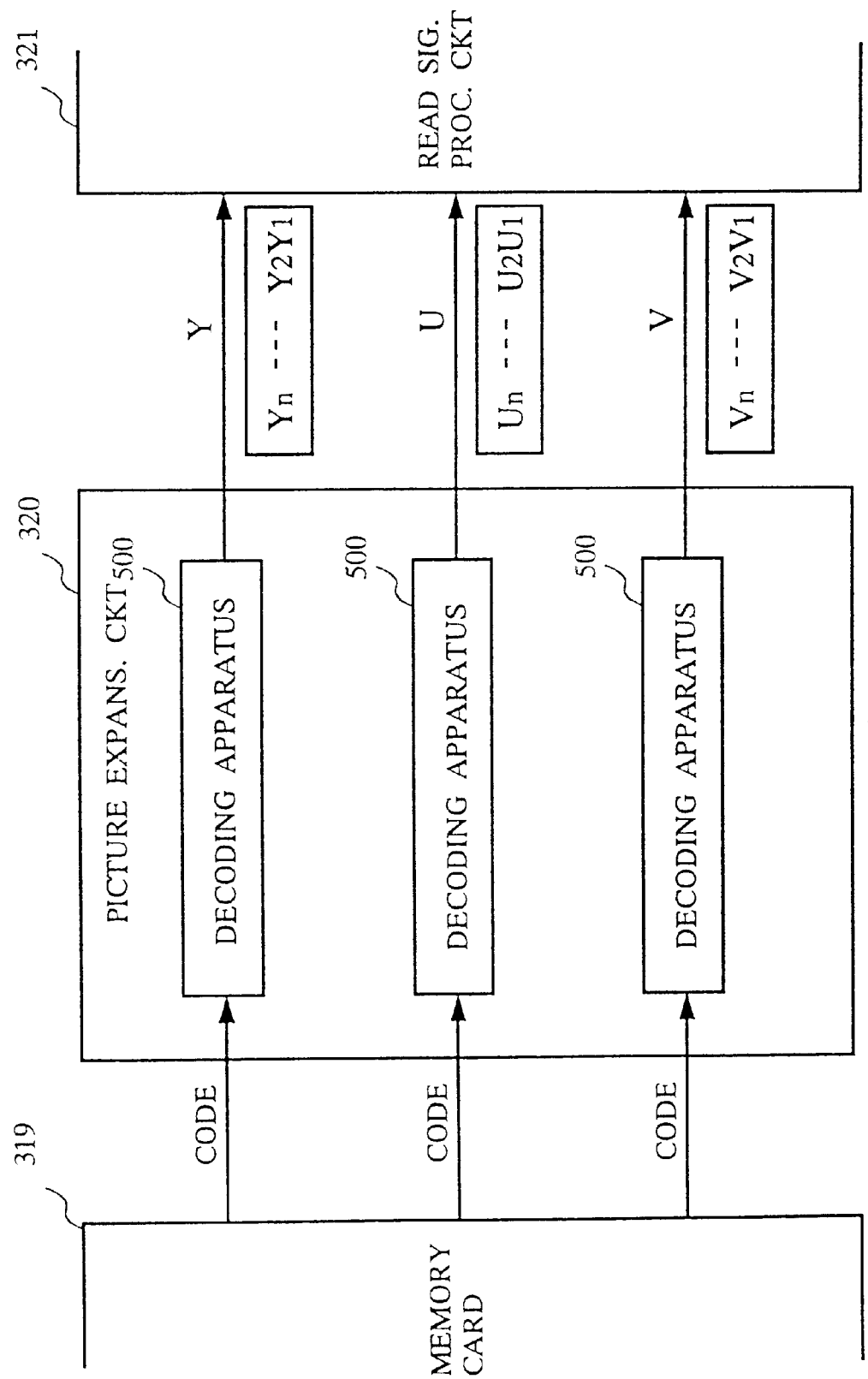
FIG. 56 shows a configuration of a picture expansion circuit 320 of the invention.

FIG. 56 shows a configuration of the picture expansion circuit 320.

Three decoding apparatuses 500 are provided to the picture expansion circuit 320. The decoding apparatuses described in the above first through sixth embodiments may be used for the decoding apparatuses 500. For example, the decoding apparatus 500 shown in FIG. 13 can be applied. The picture expansion circuit 320 inputs the luminance signal Y and the color-difference signals U, V in parallel from the memory card 319. The luminance signal Y and the color-difference signals U, V are decoded by each decoding apparatus 500, respectively, and output to the read signal processing circuit 321.

Figure 57:
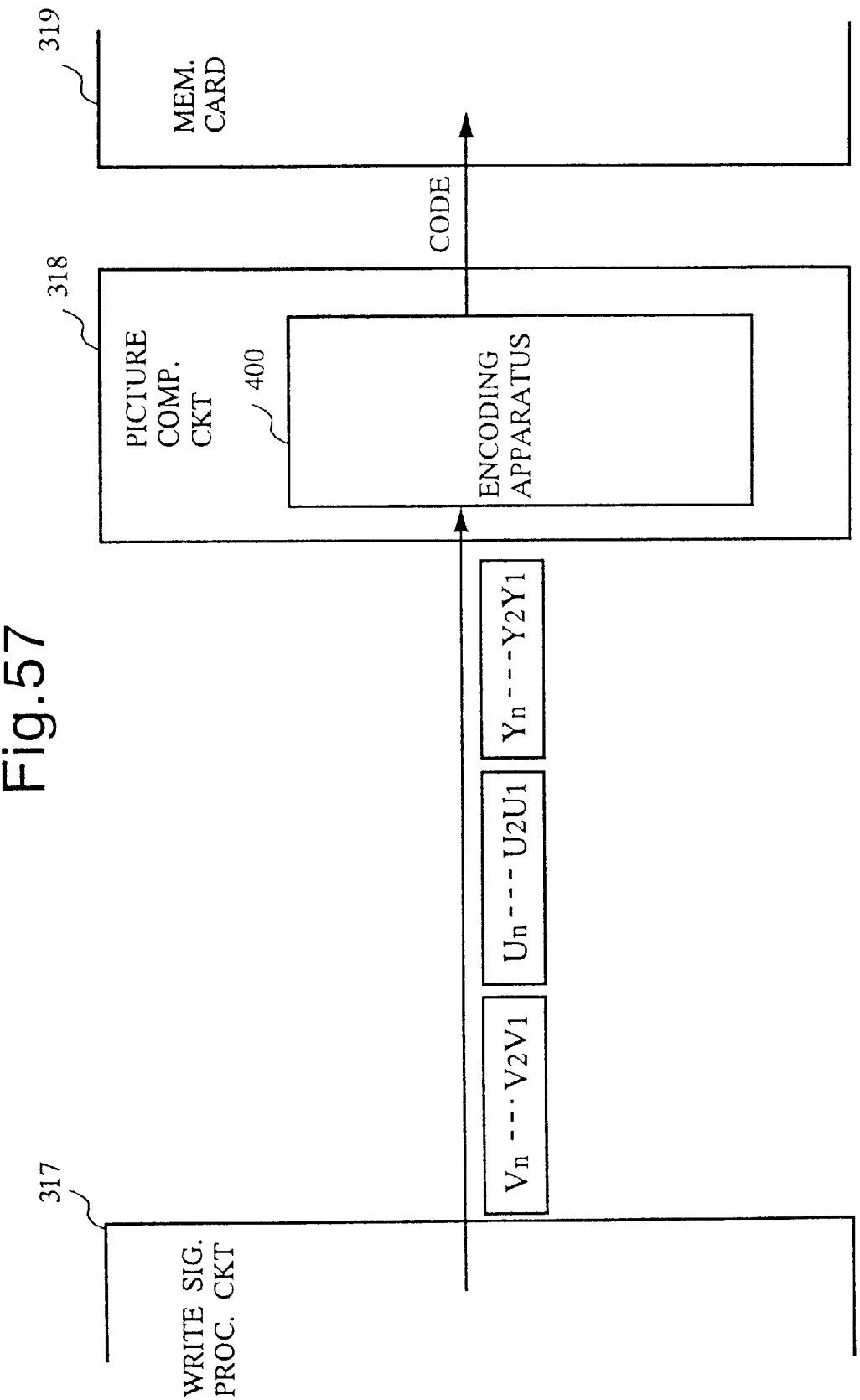
FIG. 57 shows another configuration of the picture compression circuit 318 of the invention.

FIG. 57 shows another example of the picture compression circuit 318.

In FIG. 57, one encoding apparatus 400 is provided to the picture compression circuit 318. The encoding apparatus 400 inputs the luminance signal Y and the color-difference signals U, V serially frame by frame from the write signal processing circuit 317. That is, one frame of the luminance signals Y, having Y1, Y2, ..., Yn is input, and one frame of the color-difference signals U, having U1, U2, ..., Un is input, and then, one frame of the difference signals V, having V1, V2, Vn, is input. In case of FIG. 57, one encoding apparatus 400 suffices for the above operation, consequently, a configuration of the picture compression circuit 318 is simplified.

Figure 58:
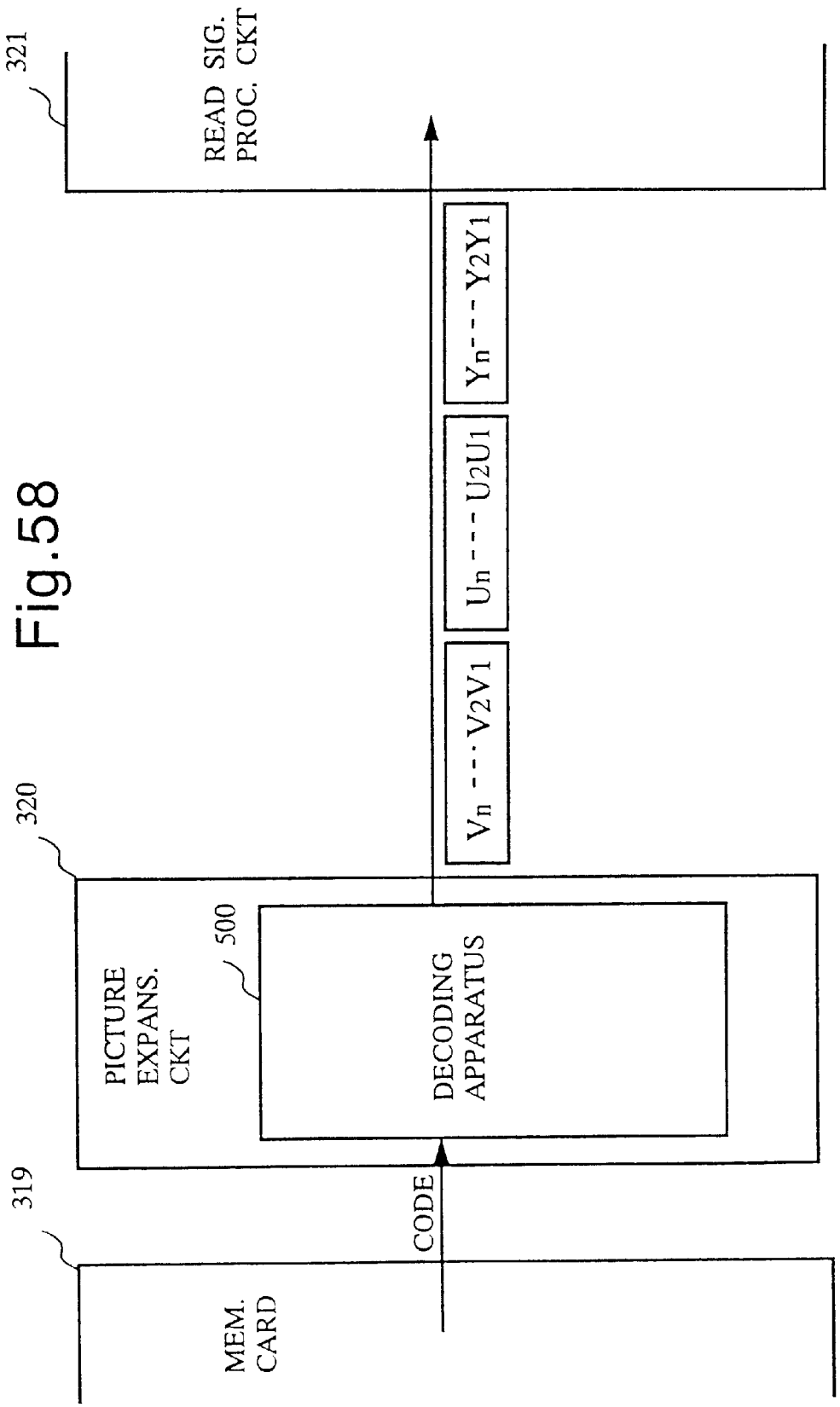
FIG. 58 shows another configuration of the picture expansion circuit 320 of the invention.

FIG. 58 shows another configuration of the picture expansion circuit 320.

One decoding apparatus is provided to the picture expansion circuit 320. The picture expansion circuit 320 receives codes encoded by a frame unit from the memory card 319 serially. The picture expansion circuit 320 decodes the luminance signal Y and the color-difference signals U, V by a frame unit to output to the read signal processing circuit 321.

In cases of FIGS. 57 and 58, signals are encoded or decoded by a frame unit. Signals can be encoded or decoded by a certain size of block other than a frame unit. Further, it is possible to encode or decode by a plurality of lines.

Figure 59:
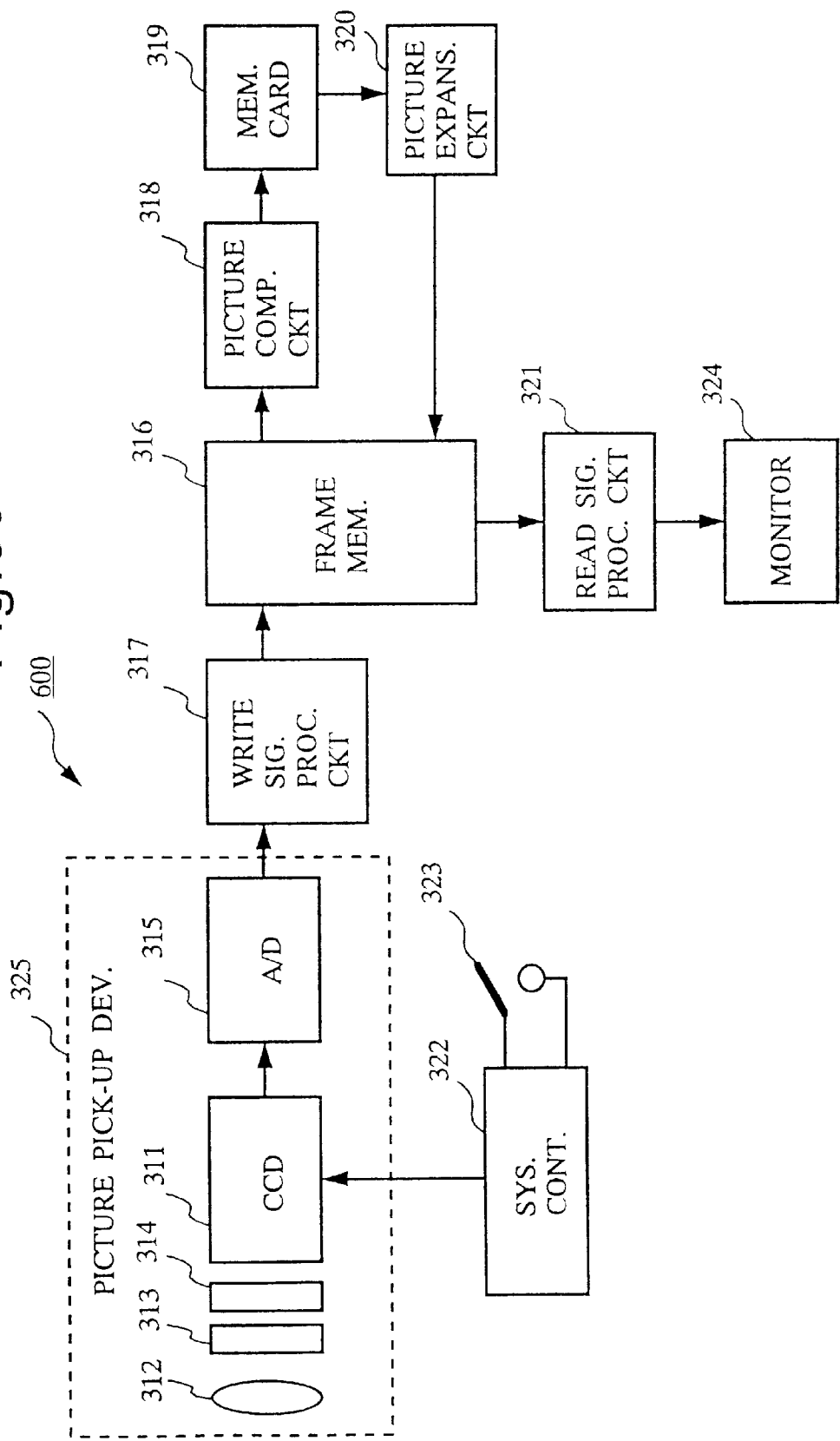
FIG. 59 shows another configuration of the picture processing apparatus of the invention.

FIG. 59 shows another configuration of the digital camera 600.

Different from FIG. 53, the digital camera shown in FIG. 59 displays the picture on the monitor 324 through the frame memory 316.

Figure 60:
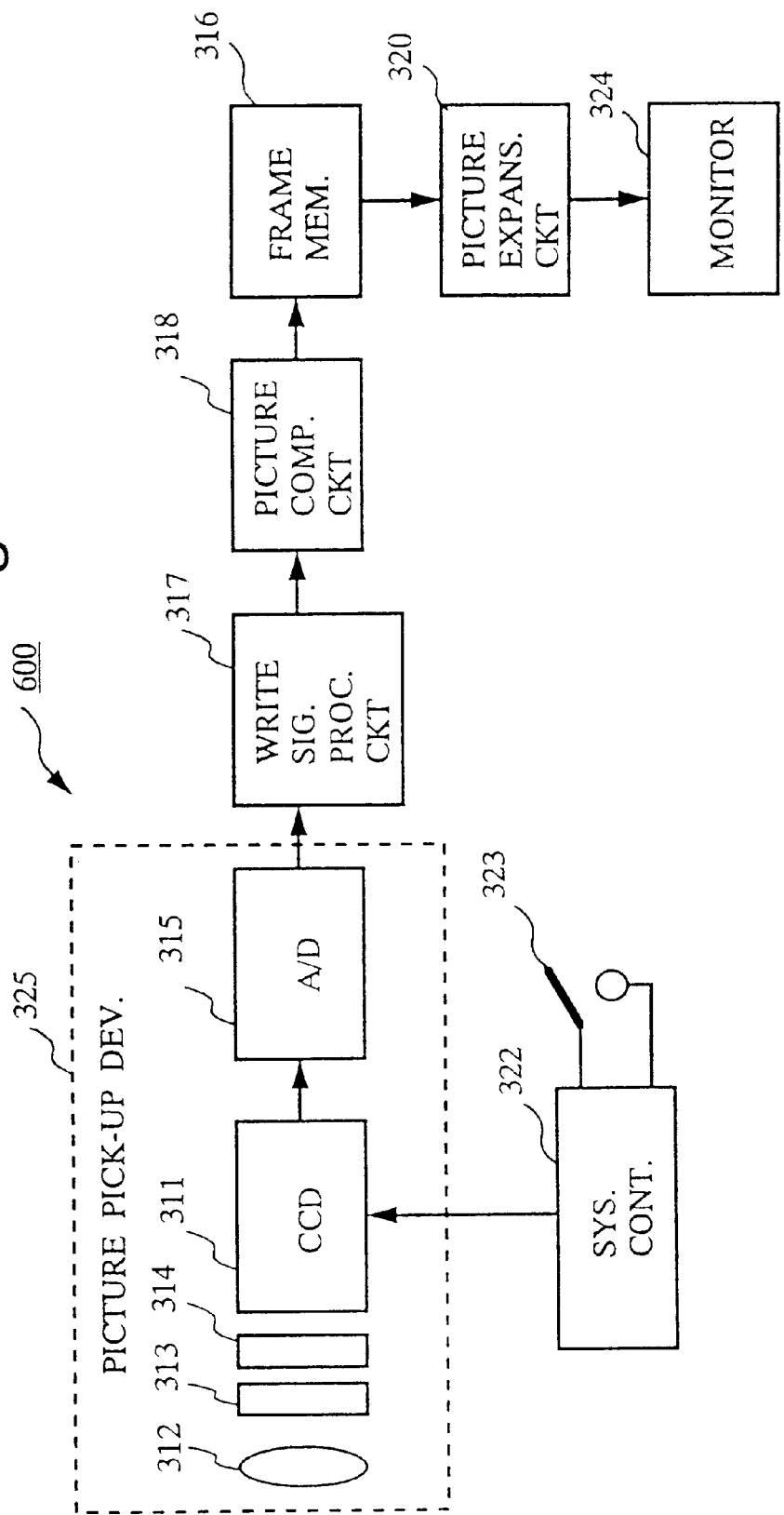
FIG. 60 shows another configuration of the picture processing apparatus of the invention.

FIG. 60 shows yet another configuration of the digital camera 600.

Different from FIG. 53, the digital camera shown in FIG. 60 does not include the memory card 319 and the picture compression circuit 318 and the picture expansion circuit 320 are located before and after the frame memory 316, respectively in the digital camera.

In both cases of FIGS. 59 and 60, the picture compression circuit 318 and the picture expansion circuit 320 shown in FIGS. 55 through 58 can be used.

Figure 61:
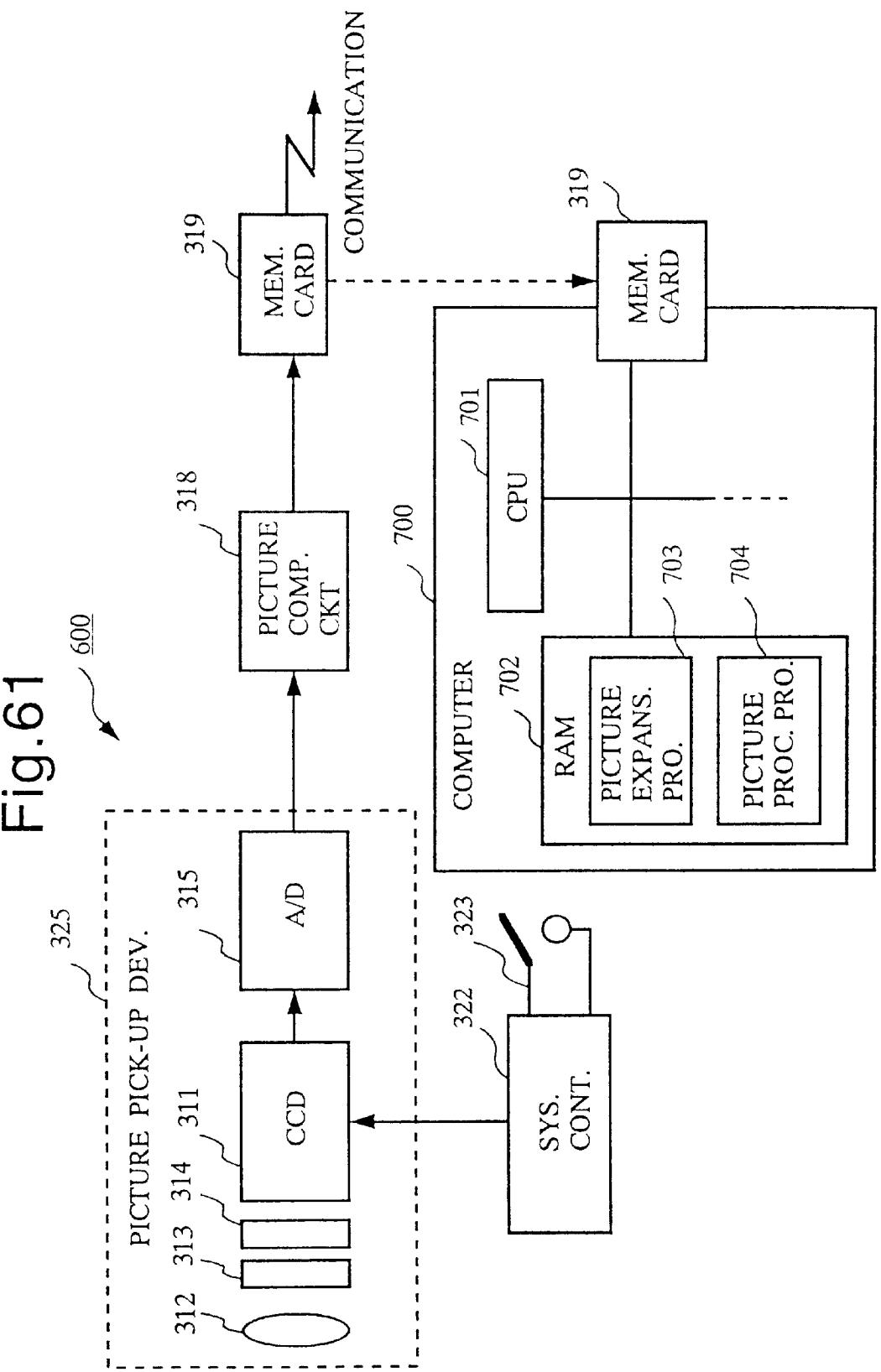
FIG. 61 shows the picture processing apparatus of the invention and the computer 700.

FIG. 61 shows another configuration of the digital camera 600 and the computer 700.

It is characteristic point of the configuration shown in FIG. 61 that the picture compression circuit 318 of the digital camera 600 implements compression process and the computer 700 implements expansion process. In the digital camera 600, only compression is implemented and the compressed data is stored in the memory card 319. The memory card 319 is coupled to the computer 700 off-line. A CPU (Central Processing Unit) 701 and a picture expansion program 703 stored in a RAM (Random Access Memory) 702 read the code stored in the memory card 319 and expands the read code. Then, required processing of the picture is performed by a picture processing program 704 and the picture can be displayed or printed out. If communication function is provided to the digital camera 600, the code stored in the memory card 319 can be transmit to a distant place through wired communication or wireless communication.

Figure 62:
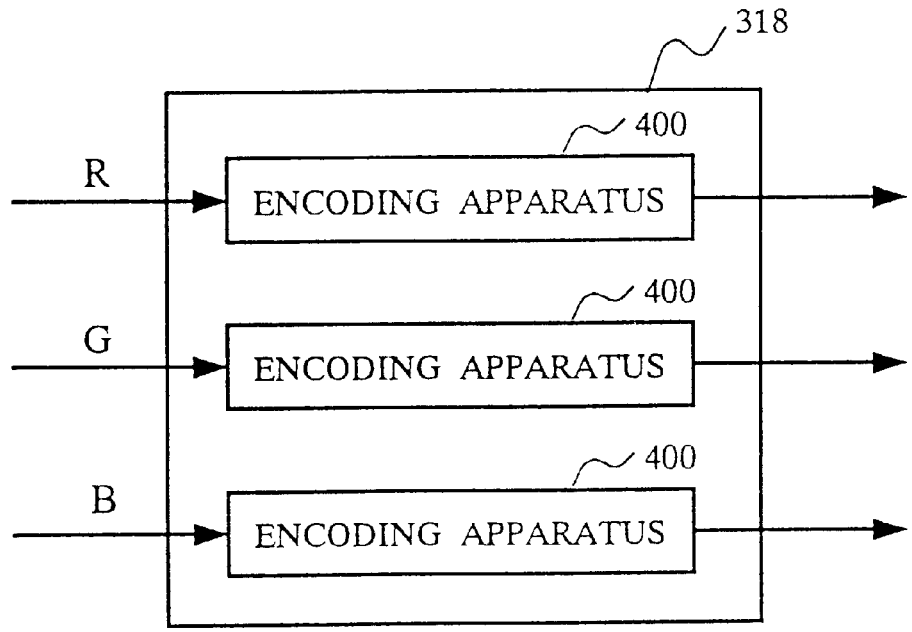
FIG. 62 shows another configuration of the picture compression circuit 318 of the invention.
Figure 63:
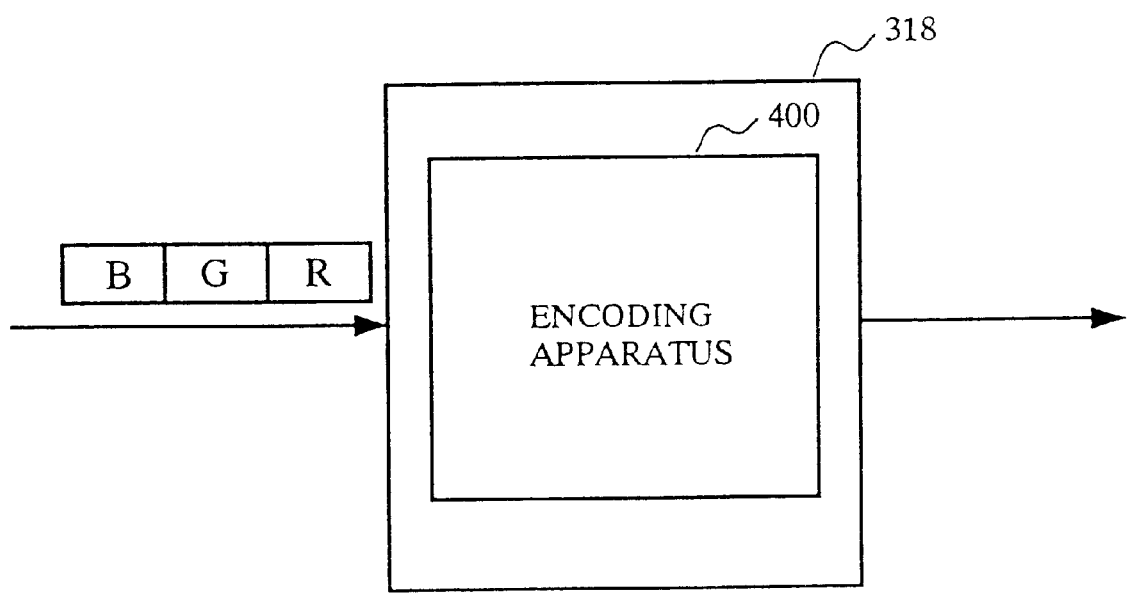
FIG. 63 shows another configuration of the picture compression circuit 318 of the invention.

FIGS. 62 and 63 show cases where the picture compression circuit 318 inputs the color signals R, G, and B.

Figure 64:
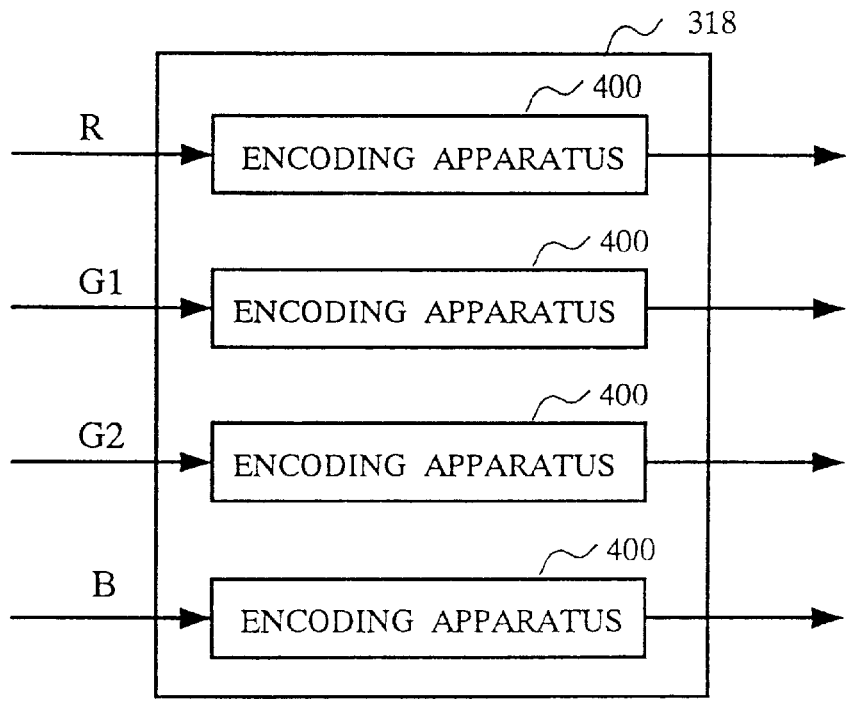
FIG. 64 shows another configuration of the picture compression circuit 318 of the invention.
Figure 65:
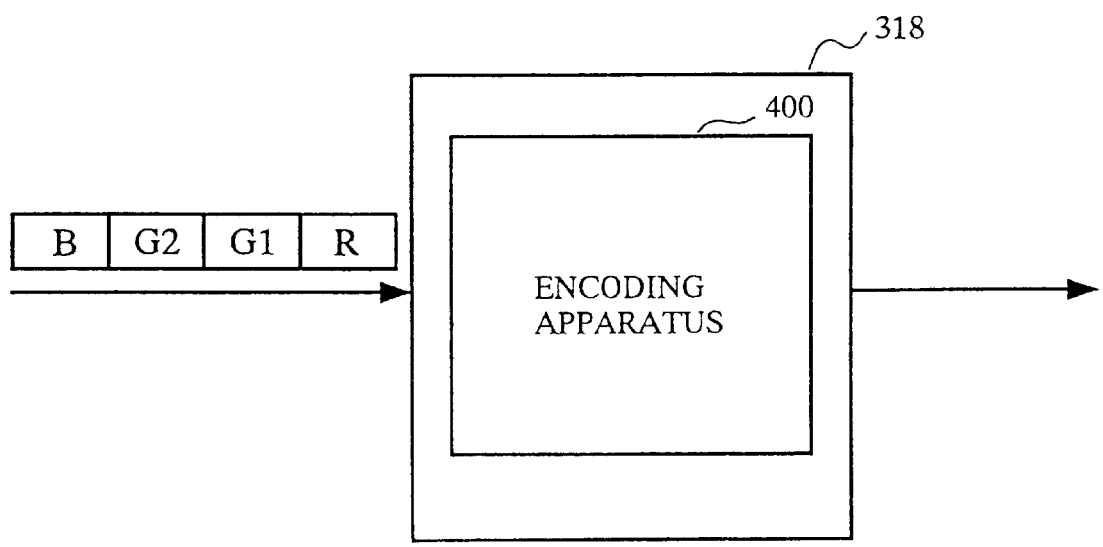
FIG. 65 shows another configuration of the picture compression circuit 318 of the invention.
Figure 66:
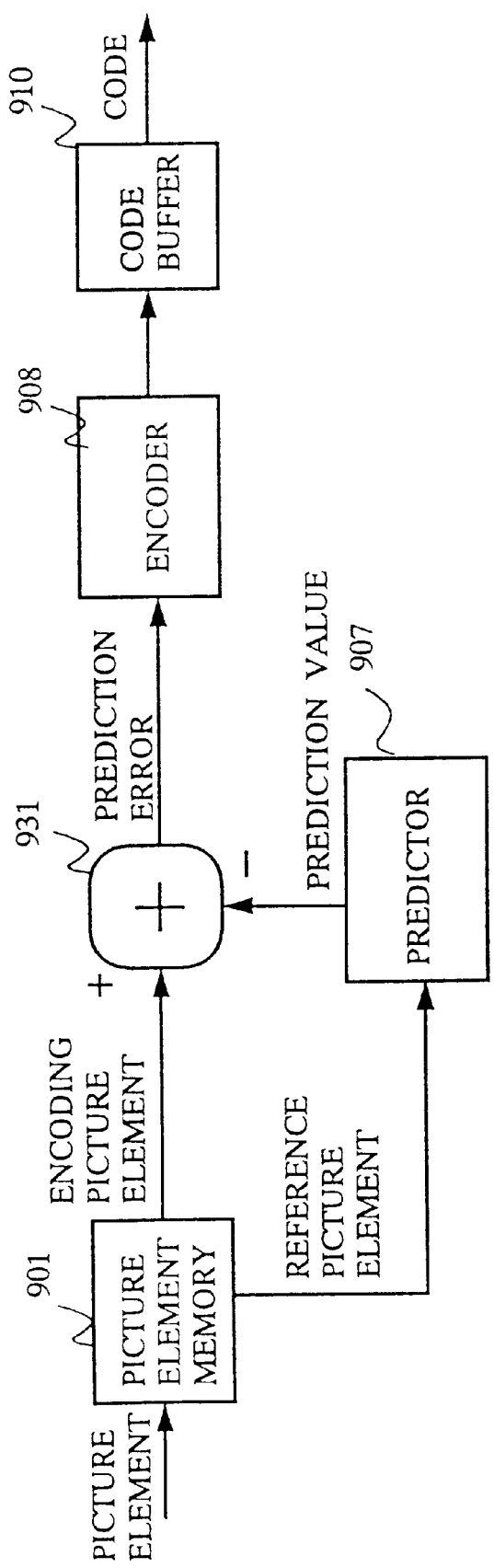
FIG. 66 is a block diagram showing a configuration of a conventional encoding apparatus.
Figures 68, 69:
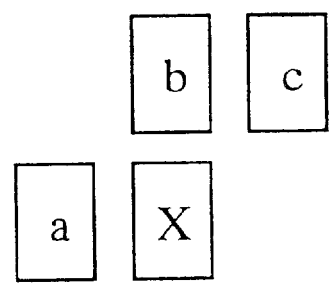
FIG. 68 is a table showing a conventional state transition method of determining the code order.
FIG. 69 is a diagram showing an encoding or decoding picture element and reference picture elements.

FIGS. 64 and 65 show cases where the picture compression circuit 318 inputs the color signals R, G1, G2 and B.

The picture expansion circuit 320 decodes the color signal by a configuration similar to the configurations of FIGS. 62 through 65, which is not shown in the figure.

In the aforementioned embodiments, the case where the codes are accumulated by the memory card 319 is explained. Secondary storage device such as a flexible disk, a harddisk, a flash memory can be applied instead of the memory card 319. In another way, the code is not stored in the storage device, but transmitted to the outside by a communication apparatus or cable and so on.

Industrial Applicability

As described above, the present invention provides an efficient encoding apparatus, an efficient decoding apparatus, an efficient encoding method, and an efficient decoding method. More specifically, according to the present invention, picture information is encoded or decoded efficiently in accordance with the encoding methods corresponding to a plurality of encoding modes.

According to the present invention, picture information can be appropriately encoded and correctly decoded even if a code is not determined at the time of switching between a plurality of encoding modes.

According to the present invention, even when the interpretation of the MPS and the LPS has been changed, appropriate encoding and correct decoding can be implemented.

According to the present invention, the encoding apparatus or the decoding apparatus can be constructed in a compact size.

Further, according to the invention, higher compressionability can be obtained than conventional picture compressionability, thus the picture with higher quality can be stored in smaller recording capacity of the recording medium.

Accordingly, a larger amount of picture information can be stored in the recording medium provided to the picture processing apparatus such as a digital camera than the conventional picture processing apparatus.

In view of these advantages, the present invention has sufficient industrial applicability.

The invention being thus described, it will be obvious that the same may be regarded as departure from the spirit and scope of the invention, and all such modifications as would be obvious to one skilled in the art are intended to be included within the scope of the following claims.

What is claimed is:

1. An encoding apparatus, comprising:

a picture element memory for receiving and storing a picture element having a value within a predetermined range as an encoding picture element, and for outputting a value of an encoded picture element adjacent to the encoding picture element as the value of a reference picture element;

an encoding section for predicting the value of the encoding picture element, determining whether the prediction is correct, encoding the value of the encoding picture element based on a result of the determination, and for outputting a codeword for the encoding picture element; and an encoding controller for controlling a codeword interpretation performed by said encoding section based on the result of the prediction made by said encoding section;

a predictor for calculating a prediction value of the encoding picture element based on the value of the reference picture element;

a prediction error calculator for calculating an error between the value of the encoding picture element and the prediction value calculated by said predictor as a prediction error;

a determinator for determining whether the prediction error calculated by said prediction error calculator is a predetermined value and for outputting a result of determination;

a first encoder for receiving the result of determination output from said determinator, encoding the result of determination, and for outputting the codeword; and a second encoder for encoding the prediction error calculated by said prediction error calculator when the prediction error is other than the predetermined value for the encoding picture element to be encoded and for outputting the codeword for the encoding picture element to be encoded.

2. A decoding apparatus comprising:

a picture element memory for storing decoded picture elements having values within a predetermined range and for outputting the value of one of the decoded picture elements adjacent to a decoding picture element as the value of a reference picture element;

a decoding section for receiving a codeword, predicting a value of the decoding picture element, determining whether the prediction is correct, and for decoding the codeword into the value of the decoding picture element based on a result of the determination; and a decoding controller for controlling a codeword interpretation performed by said decoding section based on the result of the determination made by said decoding section;

a predictor for calculating a prediction value for the decoding picture element based on the value of the reference picture element;

a first decoder for decoding a result of determination showing whether a prediction error is a predetermined value;

a second decoder for decoding the codeword for the decoding picture element whose prediction error is not the predetermined value into the prediction error;

a decoding picture element calculator for calculating the value of the decoding picture element based on the prediction value calculated by said predictor, the result of the determination, and the prediction error obtained by said second decoder.

3. An encoding method, comprising:

an outputting step of receiving and storing a picture element having a value within a predetermined range as an encoding picture element, and for outputting a value of an encoded picture element adjacent to the encoding picture element as the value of a reference picture element;

an encoding step of predicting the value of the encoding picture element, determining whether the prediction is correct, encoding the value of the encoding picture element based on a result of the determination, and for outputting a codeword for the encoding picture element; and an encoding controlling step of controlling a codeword interpretation performed by said encoding step based on the result of the prediction made by said encoding step;

a predicting step of calculating a prediction value of the encoding picture element based on the value of the reference picture element;

a prediction error calculating step of calculating an error between the value of the encoding picture element and the prediction value calculated by said predicting step as a prediction error;

a determinating step of determining whether the prediction error calculated by said prediction error calculating step is a predetermined value and for outputting a result of determination;

a first encoding step of receiving the result of determination output from said determinating step, encoding the result of determination, and of outputting the codeword; and a second encoding step of encoding the prediction error calculated by said prediction error calculating step when the prediction error is other than the predetermined value for the encoding picture element to be encoded and of outputting the codeword for the encoding picture element to be encoded.

4. A decoding method, comprising:

an outputting step of storing decoded picture elements having values within a predetermined range and of outputting the value of one of the decoded picture elements adjacent to a decoding picture element as the value of a reference picture element;

a decoding step of receiving a codeword, predicting a value of the decoding picture element, determining whether the prediction is correct, and of decoding the codeword into the value of the decoding picture element based on a result of the determination; and a decoding controlling step of controlling a codeword interpretation performed by said decoding step based on the result of the determination made by said decoding step;

a predicting step of calculating a prediction value for the decoding picture element based on the value of the reference picture element;

a first decoding step of decoding a result of determination showing whether a prediction error is a predetermined value;

a second decoding step of decoding the codeword for the decoding picture element whose prediction error is not the predetermined value into the prediction error; and a decoding picture element calculating step of calculating the value of the decoding picture element based on the prediction value calculated by said predicting step, the result of the determination, and the prediction error obtained by said second decoding step.

5. A picture processing apparatus comprising:

a picture pick-up device for picking up a picture composed of a plurality of picture elements;

a picture compression circuit for compressing the picked-up picture; and a memory for storing the compressed picture, wherein said picture compression circuit includes an encoding apparatus comprising:

a picture element memory for receiving and storing a picture element having a value within a predetermined range as an encoding picture element, and for outputting a value of an encoded picture element adjacent to the encoding picture element as the value of a reference picture element;

an encoding section for predicting the value of the encoding picture element, determining whether the prediction is correct, encoding the value of the encoding picture element based on a result of the determination, and for outputting a codeword for the encoding picture element; and an encoding controller for controlling a codeword interpretation performed by said encoding section based on the result of the prediction made by said encoding section;

a predictor for calculating a prediction value of the encoding picture element based on the value of the reference picture element;

a prediction error calculator for calculating an error between the value of the encoding picture element and the prediction value calculated by the predictor as a prediction error;

a determinator for determining whether the prediction error calculated by said prediction error calculator is a predetermined value and for outputting a result of determination;

a first encoder for receiving the result of determination output from said determinator, encoding the result of determination, and for outputting the codeword; and a second encoder for encoding the prediction error calculated by said prediction error calculator when the prediction error is other than the predetermined value for the encoding picture element to be encoded and for outputting the codeword for the encoding picture element to be encoded.

6. A picture processing apparatus, comprising:

a picture pick-up device for picking up a picture composed of a plurality of picture elements;

a picture compression circuit for compressing the picked-up picture;

a memory for storing the compressed picture; and a picture expansion circuit for expanding the stored picture, wherein said picture expansion circuit includes a decoding apparatus comprising:

a picture element memory for storing decoded picture elements having values within a predetermined range and for outputting the value of one of the decoded picture elements adjacent to a decoding picture element as the value of a reference picture element;

an decoding section for receiving a codeword, predicting a value of the decoding picture element, determining whether the prediction is correct, and for decoding the codeword into the value of the decoding picture element based on a result of the determination; and a decoding controller for controlling a codeword interpretation performed by said decoding section based on the result of the determination made by said decoding section;

a predictor for calculating a prediction value for the decoding picture element based on the value of the reference picture element;

a first decoder for decoding a result of determination showing whether a prediction error is a predetermined value;

a second decoder for decoding the codeword for the decoding picture element whose prediction error is not the predetermined value into the prediction error; and a decoding picture element calculator for calculating the value of the decoding picture element based on the prediction value calculated by said predictor, the result of the determination, and the prediction error obtained by said second decoder.

* * * * *